United States Patent
Takagi et al.

(10) Patent No.: US 6,438,945 B1
(45) Date of Patent: Aug. 27, 2002

(54) EVAPORATED FUEL TREATMENT DEVICE OF AN ENGINE

(75) Inventors: Naoya Takagi, Susono; Yoshihiko Hyodo, Gotenba; Toshimi Murai, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/762,333

(22) PCT Filed: Aug. 4, 1999

(86) PCT No.: PCT/JP99/04218

§ 371 (c)(1),
(2), (4) Date: Feb. 27, 2001

(87) PCT Pub. No.: WO00/09881

PCT Pub. Date: Feb. 24, 2000

(30) Foreign Application Priority Data

Aug. 10, 1998 (JP) .......................... 10-226017
Dec. 21, 1998 (JP) .......................... 10-363092
Dec. 21, 1998 (JP) .......................... 10-363131

(51) Int. Cl.$^7$ ................................ F01N 3/00
(52) U.S. Cl. ..................... 60/283; 60/285; 60/286; 60/284; 123/520
(58) Field of Search .................... 60/283, 285, 286, 60/278, 297, 301, 284, 295; 123/518, 519, 520, 521

(56) References Cited

U.S. PATENT DOCUMENTS 5,090,388 A   2/1992  Hamburg et al.
5,245,975 A * 9/1993  Ito ............................... 123/520
5,351,193 A   9/1994  Poirier et al.
5,609,135 A * 3/1997  Ogawa et al. ............... 123/325
5,613,481 A * 3/1997  Kitagawa et al. ........... 123/698
5,806,304 A * 9/1998  Price et al. .................... 60/274
5,968,870 A * 10/1999 Iizuka et al. ................ 502/325
6,122,908 A * 9/2000  Wimark ......................... 60/274
6,145,306 A * 11/2000 Takagi et al. ................. 60/283

FOREIGN PATENT DOCUMENTS

| JP | 3-83331    | 8/1991  |
| JP | 4-262047   | 9/1992  |
| JP | 4-365939   | 12/1992 |
| JP | 5-52139    | 3/1993  |
| JP | 6-257491   | 9/1994  |
| JP | 7-103021   | 4/1995  |
| JP | 7-269420   | 10/1995 |
| JP | 8-61052    | 3/1996  |
| JP | 8-128363   | 5/1996  |
| JP | 8-312405   | 11/1996 |
| JP | 9-72253    | 3/1997  |
| JP | 9-88737    | 3/1997  |
| JP | 9-329044   | 12/1997 |
| JP | 10-54311   | 2/1998  |
| JP | 10-141114  | 5/1998  |

* cited by examiner

Primary Examiner—Thomas Denion
Assistant Examiner—Binh Tran
(74) Attorney, Agent, or Firm—Oliff & Berridge, PLC

(57) ABSTRACT

An internal combustion engine, wherein fuel vapor adsorbed in a canister (22) is purged into a surge tank (13) through a purge control valve (28). A target value of the fuel vapor rate showing the ratio of the amount of fuel vapor in the purge gas to the amount of fuel injection is stored in advance. At least one of the amount of purge gas or the amount of fuel injection is controlled so that the fuel vapor rate becomes the target value.

35 Claims, 40 Drawing Sheets

LIST OF REFERENCE NUMERALS

5... combustion chamber
6... fuel injector
7... spark plug
13... surge tank
17... throttle valve
18... exhaust manifold
20... EGR control valve
22... canister
26... fuel tank
27... conduit
28... purge control valve
30... pressure sensor
32... air-fuel ratio sensor

EVAPORATED FUEL TREATMENT DEVICE OF AN ENGINE

TECHNICAL FIELD

The present invention relates to an evaporated fuel treatment device of an engine.

BACKGROUND ART

Known in the art is an internal combustion engine, provided with a canister for temporarily storing evaporated fuel, a purge control valve for controlling the amount of purge gas to be purged from the canister to the inside of an intake passage downstream of a throttle valve, and an air-fuel sensor arranged in the engine exhaust passage, which controls an opening degree of the purge control valve so that the ratio between the amount of purge gas and the amount of intake air, that is, the purge rate (=amount of purge gas/amount of intake air), becomes a target purge rate, finds an amount of fuel vapor purged from an amount of deviation of the air-fuel ratio from a stoichiometric air-fuel ratio based on an output signal of the air-fuel ratio sensor, and corrects downward the amount of fuel injection by exactly an amount corresponding to the amount of fuel vapor so that the air-fuel ratio becomes the stoichiometric air-fuel ratio (see Japanese Unexamined Patent Publication (Kokai) No. 5-52139). In that internal combustion engine, when the purge action was started, the target purge rate was made to gradually increase. The target purge rate was held at a constant value after the elapse of a predetermined time from the start of the purge action.

In this way, this internal combustion engine corrects downward the amount of fuel injection by exactly an amount corresponding to the amount of fuel vapor so that the air-fuel ratio becomes the stoichiometric air-fuel ratio. That is, the amount of fuel injection is corrected downward so that the ratio of the intake air and the sum of the amount of fuel vapor and amount of fuel injection becomes the stoichiometric air-fuel ratio. The amount of fuel adsorbed in the activated carbon in the canister, however, changes according with the operating state of the engine. Therefore, even if the purge rate is held constant, the amount of fuel vapor to be purged changes in accordance with the operating state of the engine. If the amount of fuel vapor to be purged changes, the ratio of reduction of the amount of fuel injection changes along with this and as a result the ratio of the amount of fuel vapor to the amount of fuel injection changes.

If the ratio of the amount of fuel vapor with respect to the amount of fuel injection changes in this way, however, there is the problem that the downward correction of the amount of fuel injection will not be fast enough right after the change occurs and therefore the air-fuel ratio will end up deviating from the stoichiometric air-fuel ratio temporarily.

Further, depending on the internal combustion engine, sometimes the amount of fuel vapor as compared with the amount of fuel injection has a large effect on the combustion. In such a case, it becomes necessary to maintain the ratio of the amount of fuel vapor to the amount of fuel injection at a predetermined ratio. Therefore, in such an internal combustion engine, the problem arises that the combustion will end up deteriorating even if the purge rate is maintained constant.

For example, when designed to form an air-fuel mixture in a limited region in the combustion chamber, as explained later, there is an optimal value to the ratio of the amount of fuel vapor to the amount of fuel injection. If the ratio of the amount of fuel vapor to the amount of fuel injection deviates from this optimal value, problems such as misfire will arise. Therefore, if the ratio of the amount of fuel vapor with respect to the amount of fuel injection ends up changing, the ratio of the amount of fuel vapor to the amount of fuel injection will deviate from the optimal value and therefore problems such as misfires will occur.

In this way, in the above known internal combustion engine, problems like the above arose when looking at the ratio of the amount of fuel vapor to the amount of fuel injection, but the following problems also arose when changing the perspective a bit and looking at the ratio of the amount of purge gas to the amount of fuel injection.

That is, the purge rate is held constant as in the above mentioned known internal combustion engine so as to prevent the air-fuel ratio from fluctuating when the amount of intake air changes. That is, if the purge rate changes when the amount of intake air changes, the ratio of the amount of purge gas in the intake air changes and as a result the air-fuel ratio changes. Therefore, the purge rate is made to be maintained constant so that the ratio of the amount of purge gas in the intake air does not change even if the amount of intake air changes. In this way, not limited to the above known internal combustion engine, in internal combustion engines in general designed for purge control, the purge operation is controlled so that the purge rate becomes constant, that is, so that the amount of purge gas increases in proportion to the amount of intake air.

In an internal combustion engine designed for purge control in the past, however, the amount of fuel injection was increased along with the increase of the amount of intake air and therefore the output of the engine was increased. That is, in this internal combustion engine, the output of the engine was controlled by adjusting the amount of intake air. In such an internal combustion engine, the amount of fuel injection is increased along with an increase of the amount of intake air and therefore if increasing the amount of purge gas along with an increase of the amount of intake air, it becomes possible to maintain the air-fuel ratio constant without accompanying fluctuation of the engine output.

Depending on the internal combustion engine, however, if the purge rate is maintained constant, the output will fluctuate and the exhaust emission will deteriorate. A typical example of such an internal combustion engine is a stratified combustion type internal combustion engine designed to form an air-fuel mixture inside a limited region of a combustion chamber. In such an internal combustion engine, the air-fuel mixture is burned under an excess of air, so even if the amount of intake air is increased, the output of the engine will not increase. Increasing the output of the engine requires an increase in the amount of fuel injection. That is, in this type of internal combustion engine, the output of the engine is controlled by adjusting the amount of fuel injection. In such an internal combustion engine, generally speaking, the ratio of the amount of intake air to the amount of fuel injection becomes larger or smaller in accordance with the operating state.

In such an internal combustion engine, however, if the purge rate is maintained constant in the same way as a conventional internal combustion engine, that is, if the amount of purge gas is increased along with an increase of the amount of intake air, the ratio of the amount of purge gas to the amount of fuel injection will become larger or smaller in accordance with the operating state of the engine. If the ratio of the amount of purge gas to the amount of fuel injection becomes larger or smaller in this way, the output of the engine will increase or decrease along with this. Further, if the ratio of the amount of purge gas to the amount of fuel injection increases, the exhaust emission will deteriorate. Therefore, the problem arises that if the amount of purge gas is changed in proportion to the amount of air intake as in the conventional internal combustion engines, the output of the engine will fluctuate and the exhaust emission will deteriorate.

DISCLOSURE OF THE INVENTION

An object of the present invention is to provide an evaporated fuel treatment device of an internal combustion engine capable of ensuring good engine operation even if feeding purge gas.

According to the present invention, there is provided an evaporated fuel treatment device of an internal combustion engine provided with a purge passage for purging fuel vapor generated in a fuel tank into an intake passage; a purge control valve for controlling the amount of purge gas to be purged from the purge passage to the inside of the intake passage; an injection calculating means for calculating an amount of fuel injection; a setting means for setting a target value of a fuel vapor rate showing a ratio of the amount of fuel vapor in the purge gas to the amount of fuel injection; and a control means for controlling at least one of the amount of purge gas and the amount of fuel injection so that the fuel vapor rate become the target value.

Further, according to the present invention, there is provided an evaporated fuel treatment device of an internal combustion engine provided with a purge passage for purging fuel vapor generated in a fuel tank into an intake passage; a purge control valve for controlling the amount of purge gas to be purged from the purge passage to the inside of the intake passage; an injection calculating means for calculating an amount of fuel injection; a setting means for setting a target value of a purge gas rate showing a ratio of the amount of purge gas to the amount of fuel injection; and a control means for controlling at least one of the amount of purge gas and the amount of fuel injection so that the purge gas rate become the target value.

DESCRIPTION OF THE PREFERRED EMBODIMENTS

Figure 1:
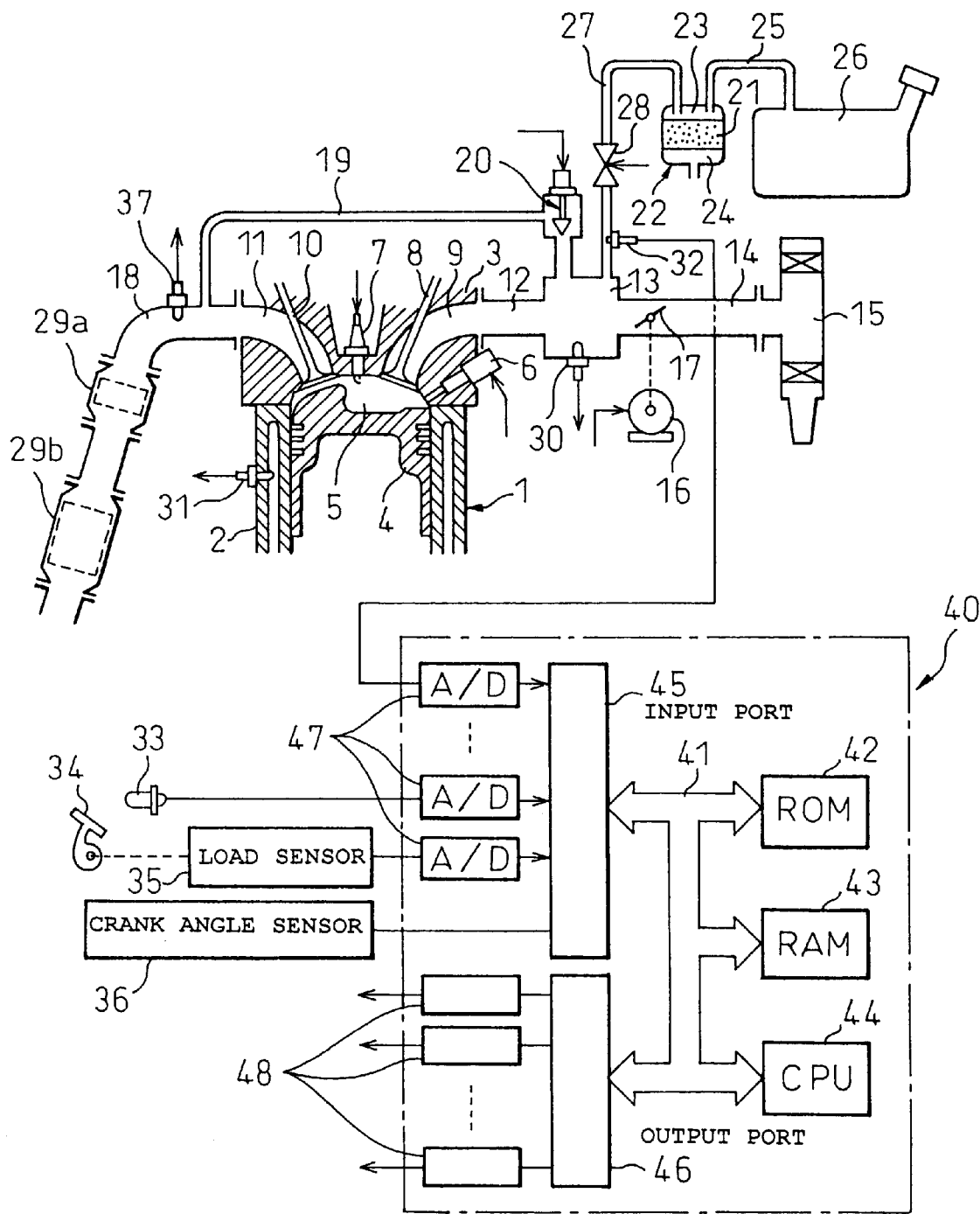
FIG. 1 is an overall view of an internal combustion engine.

Referring to FIG. 1, 1 is an engine body of a stratified combustion type internal combustion engine, 2 a cylinder block, 3 a cylinder head, 4 a piston, 5 a combustion chamber, 6 a fuel injector arranged at a periphery of an inner wall of the cylinder head 3, 7 a spark plug arranged at a center of the inner wall of the cylinder head 3, 8 an intake valve, 9 an intake port, 10 an exhaust valve, and 11 an exhaust port. The intake port 9 is connected through a corresponding intake tube 12 to a surge tank 13, while the surge tank 13 is connected through an intake duct 14 to an air cleaner 15. Inside the intake duct 14 is arranged a throttle valve 17 driven by a step motor 16. On the other hand, the exhaust port 11 is connected to an exhaust manifold 18. The exhaust manifold 18 and the surge tank 13 are connected to each other through an exhaust gas recirculation (EGR) passage 19. Inside the EGR passage 19 is arranged an electronically controlled EGR control valve 20.

As shown in FIG. 1, the internal combustion engine is provided with a canister 22 housing activated carbon 21. The canister 22 has a fuel vapor chamber 23 and an atmospheric chamber 24 on the two sides of the activated carbon 21. The fuel vapor chamber 23 on the one hand is connected through a conduit 25 to the fuel tank 26 and on the other hand through a conduit 27 to the inside of the surge tank 13. In the conduit 27 is disposed a purge control valve 28 which is controlled by output signals from an electronic control unit 40. The fuel vapor which is generated in the fuel tank 26 is sent through the conduit 25 into the canister 22 where it is adsorbed by the activated carbon 21. When the purge control valve 28 opens, the air is sent from the atmospheric chamber 24 through the activated carbon 21 into the conduit 27. When the air passes through the activated carbon 21, the fuel vapor which is adsorbed at the activated carbon 21 is released from the activated carbon 21, therefore air containing the evaporated fuel, that is, the fuel vapor, is purged through the conduit 27 to the inside of the surge tank 13.

The exhaust manifold 18 is connected to a catalytic converter 29a housing for example a three-way catalyst. The catalytic converter 29a is connected to still another converter 29b. Inside the catalytic converter 29b is arranged an oxidation catalyst, a three-way catalyst, an NOx absorbing and storing type catalyst which absorbs NOx when the air-fuel ratio is lean and releases the absorbed NOx when the air-fuel ratio becomes rich, or an NOx selective reduction type catalyst which reduces the NOx under excess oxygen and in the presence of a large amount of unburned hydrocarbons.

The electronic control unit 40 is comprised of a digital computer and is provided with a ROM (read only memory) 42, a RAM (random access memory) 43, a CPU (microprocessor) 44, an input port 45, and an output port 46 connected to each other through a bidirectional bus 41. Inside the surge tank 13 is arranged a pressure sensor 30 for generating an output voltage proportional to the absolute pressure in the surge tank 13. The output voltage of the pressure sensor 30 is input through a corresponding AD converter 47 to the input port 45. The engine body 1 mounts a water temperature sensor 31 for generating an optimal value proportional to the engine coolant water temperature. The optimal value of the water temperature sensor 31 is input through a corresponding AD converter 47 to an input port 45.

On the other hand, inside the conduit 27 is arranged a fuel vapor concentration sensor 32 for detecting the concentration of the fuel vapor in the purge gas. In the embodiment shown in FIG. 1, the fuel vapor concentration sensor 32 is comprised of an air-fuel ratio sensor for detecting the air-fuel ratio of the purge gas. The output signal of the air-fuel ratio sensor 32 is input through a corresponding AD converter 47 to the input port 45.

Further, the input port 45 receives as input an output signal of an atmospheric pressure sensor 33 for detecting atmospheric pressure through a corresponding AD converter 47. An accelerator pedal 34 has connected to it a load sensor 35 for generating an optimal value proportional to an amount of depression L of the accelerator pedal 34. The output voltage of the load sensor 35 is input through a corresponding AD converter 47 to the input port 45. Further, the input port 45 has connected to it a crank angle sensor 36 for generating an output pulse each time the crank angle sensor 36 rotates by for example 30°. Further, inside the exhaust manifold 18 is arranged an air-fuel ratio sensor 37. The output signal of the air-fuel ratio sensor 37 is input through a corresponding AD converter 47 to the input port 45. On the other hand, the output port 46 is connected through a corresponding drive circuit 48 to the fuel injector 6, the spark plug 7, the step motor 16, the EGR control valve 20, and the purge control valve 28.

Figure 2:
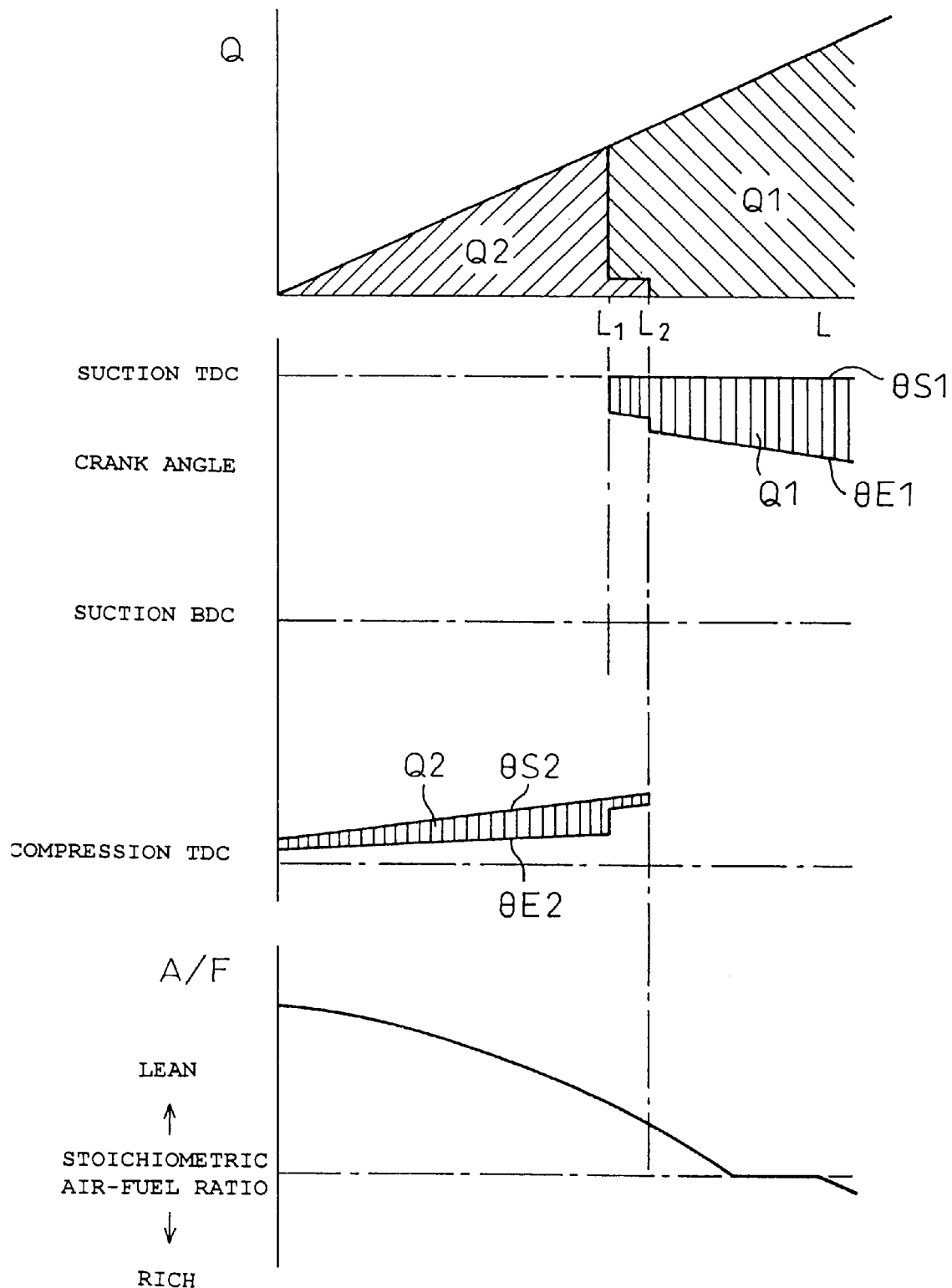
FIG. 2 is a view of an amount of injection, injection timing, and air-fuel ratio.

FIG. 2 shows the amounts of fuel injection Q1, Q2, Q (=Q1+Q2), injection start timings $\theta S1$, $\theta S2$, injection end timings $\theta E1$, $\theta E2$, and mean air-fuel ratio A/F in the combustion chamber 5. Note that the abscissa L in FIG. 2 shows the amount of depression of the accelerator pedal 34, that is, the requested load.

As will be understood from FIG. 2, when the requested load L is lower than L1, fuel injection Q2 is performed between $\theta S2$ and $\theta E2$ of the end of the compression stroke. At this time, the mean air-fuel ratio A/F is considerably lean. When the requested load L is between L1 and L2, the first fuel injection Q1 is performed between $\theta S1$ and $\theta E1$ of the start of the suction stroke, then the second fuel injection Q2 is performed between $\theta S2$ and $\theta E2$ of the end of the compression stroke. At this time as well, the air-fuel ratio A/F becomes lean. When the requested load L is larger than L2, the fuel injection Q1 is performed between $\theta S1$ and $\theta E1$ of the start of the suction stroke. At this time, in the region of a low requested load L, the mean air-fuel ratio A/F is made lean. When the requested load L becomes high, the mean air-fuel ratio A/F is made the stoichiometric air-fuel ratio, while when the requested load L becomes further higher, the mean air-fuel ratio A/F is made rich. Note that the operating region where the fuel injection Q2 is performed at only the end of the compression stroke, the operating region where the fuel injections Q1 and Q2 are performed twice, and the operating region where the fuel injection Q1 is performed only at the start of the suction stroke are not determined by only the requested load, but are determined in practice by the requested load L and engine speed.

Figure 3A:
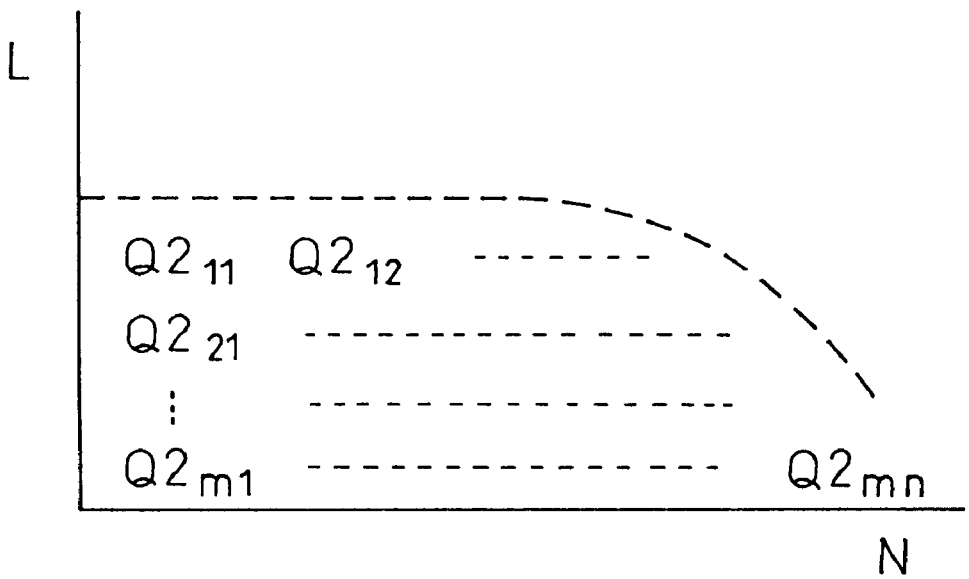
FIGS. 3A and 3B are views of maps of injection.
Figure 3B:
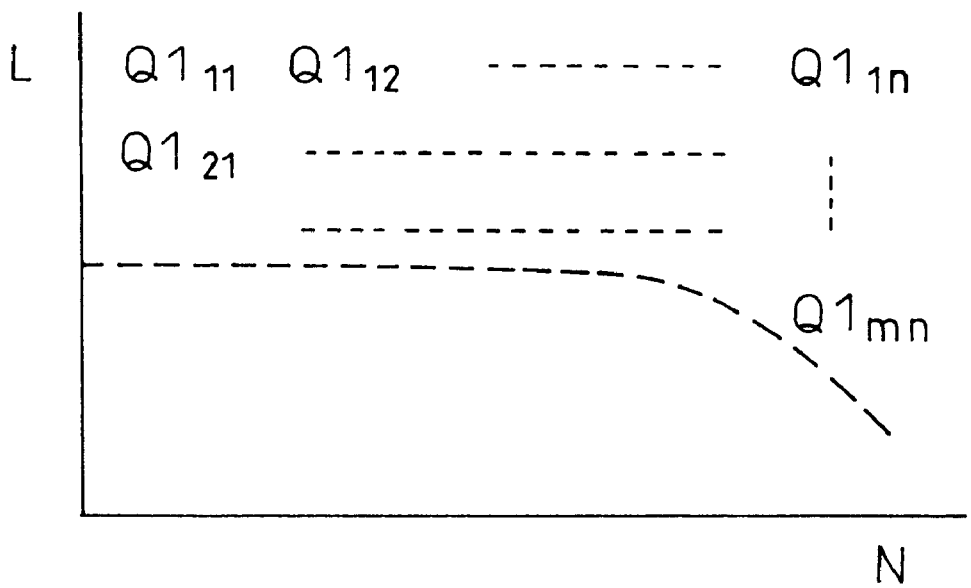

The basic amount of injection Q2 of the fuel injection at the end of the compression stroke is stored in advance in the ROM 42 in the form of the map as a function of the amount of depression L of the accelerator pedal 34 and the engine speed N as shown in FIG. 3A. The basic amount of injection Q1 of the fuel injection at the start of the compression stroke is also stored in advance in the ROM 42 in the form of the map as a function of the amount of depression L of the accelerator pedal 34 and the engine speed N as shown in FIG. 3B.

Figure 4A:
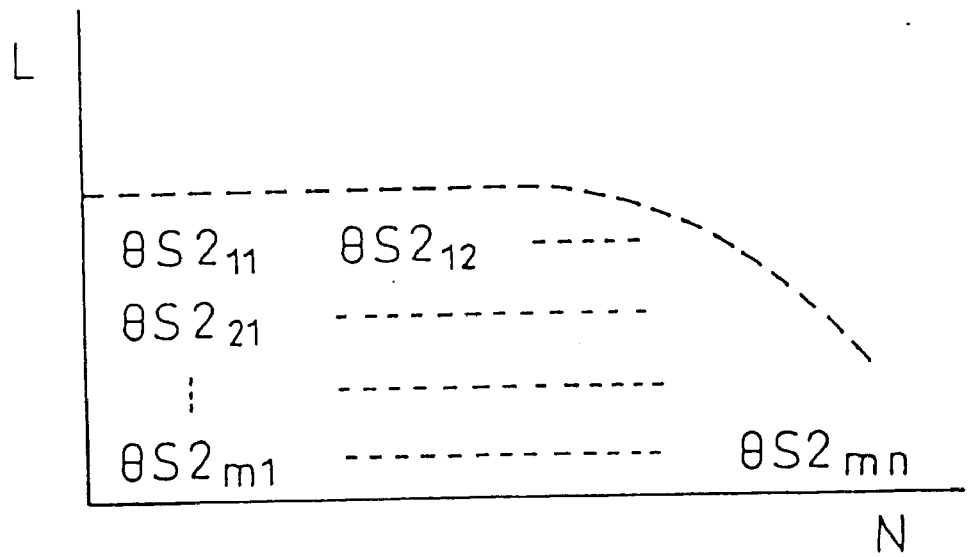
FIG. 4A and FIG. 4B are views of maps of injection start timings.
Figure 4B:
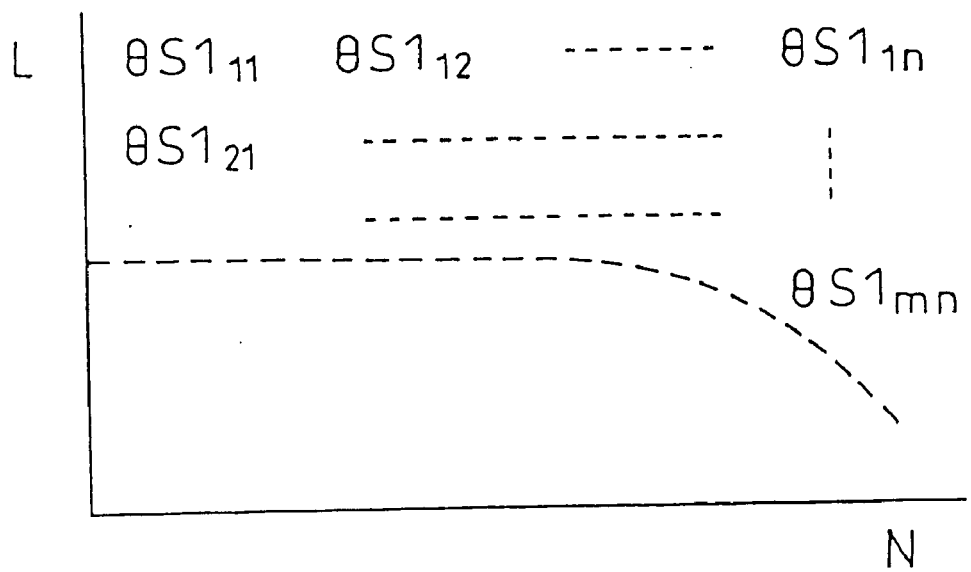

Further, the injection start timing $\theta S2$ of the fuel injection at the end of the compression stroke is also stored in advance in the ROM 42 in the form of the map as a function of the amount of depression L of the accelerator pedal 34 and the engine speed N as shown in FIG. 4A, while the injection start timing $\theta S1$ of the fuel injection at the start of the suction stroke is stored in advance in the ROM 42 in the form of the map as a function of the amount of depression L of the accelerator pedal 34 and the engine speed N as shown in FIG. 4B.

Figure 5A:
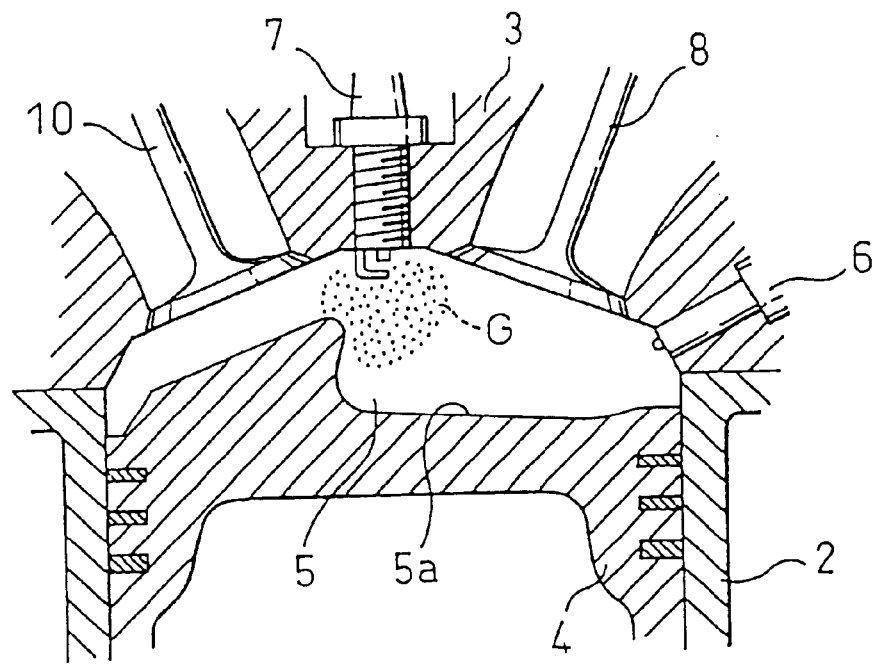
FIG. 5A and FIG. 5B are side sectional views of an internal combustion engine.
Figure 5B:
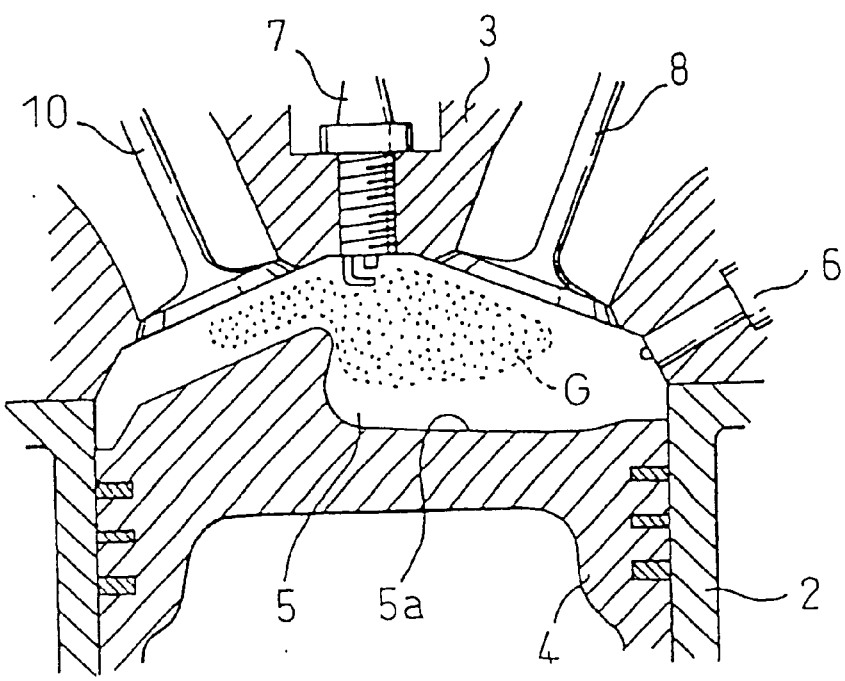

FIG. 5A and FIG. 5B show the case where fuel injection Q2 is performed only when the requested load L is smaller than L1 (FIG. 2), that is, at the end of the compression stroke. Note that FIG. 5B shows when the requested load L is higher, that is, the amount of injection is greater, compared with FIG. 5A.

As shown in FIG. 5A and FIG. 5B, a cavity 5a is formed at the top surface of the piston 4. Fuel is injected from the fuel injector 6 toward the bottom surface of the cavity 5a at the end of the compression stroke. The fuel is guided by the peripheral wall of the cavity 5a toward the spark plug 7, whereby an air-fuel mixture G is formed around the spark plug 7. In this embodiment of the present invention, the space inside the combustion chamber 5 around the air-fuel mixture G is filled with air or a mixed gas of air and the EGR gas. Therefore, when the requested load L is smaller than L1 (FIG. 2), the air-fuel mixture G is formed in a limited region in the combustion chamber 5.

The air-fuel mixture G formed around the spark plug 7 is ignited by the spark plug 7. In this case, if the air-fuel mixture G is too thin, the air-fuel mixture G will not ignite and therefore a misfire will occur. As opposed to this, if the air-fuel mixture G is too thick, carbon will deposit on the electrode of the spark plug 7 and ignition current will leak through the carbon. As a result, the ignition energy will become small and therefore in this case as well a misfire will occur. That is, to ensure a good ignition by the spark plug 7, it is necessary to form an air-fuel mixture G of a suitable concentration around the spark plug 7.

When the volume occupied by the air-fuel mixture G is the same, the greater the amount of fuel injection, the higher the concentration of the air-fuel mixture G. Therefore, to form an air-fuel mixture G of a suitable concentration around the spark plug 7, it is necessary to increase the volume occupied by the air-fuel mixture G the greater the amount of fuel injection. In other words, it is necessary to make the air-fuel mixture G disperse the greater the amount of fuel injection. In this case, the air-fuel mixture disperses the earlier the injection timing. Therefore, in this embodiment of the present invention, as shown in FIG. 2, the injection start timing θS2 is made earlier the higher the requested load L, that is, the greater the amount of injection. As a result, when the amount of injection is large as shown in FIG. 5B, the volume occupied by the air-fuel mixture G becomes larger compared with when the amount of injection is small as shown in FIG. 5A.

On the other hand, time is required in order for the air-fuel mixture G is disperse, so it is necessary to advance the injection timing the higher the engine speed N. Therefore, in this embodiment according to the present invention, the injection start timing θS2 is advanced the higher the engine speed N. That is, in this embodiment of the present invention, the injection start timing θS2 is determined so that an air-fuel mixture G of the optimal concentration is formed around the spark plug 7.

On the other hand, as explained above, when the requested load L is between L1 and L2, fuel injection is performed divided into two. In this case, a thin air-fuel mixture is formed in the combustion chamber 5 due to the first fuel injection Q1 performed at the start of the suction stroke. Next, an air-fuel mixture of an optimal concentration is formed around the spark plug 7 due to the second fuel injection Q2 performed at the end of the combustion stroke. This air-fuel mixture is ignited by the spark plug 7, whereby the thin air-fuel mixture is burned by the flame of ignition.

On the other hand, when the requested load L is larger than L2, as shown in FIG. 2, a homogeneous air-fuel mixture of a lean, stoichiometric, or rich air-fuel ratio is formed in the combustion chamber 5. This homogeneous air-fuel mixture is ignited by the spark plug 7.

Next, an explanation will be given of the case of purging purge gas from the conduit 27 to the inside of the surge tank 13.

In this embodiment of the present invention, when the requested load L is smaller than L1, the basic amount of fuel is determined from the map shown in FIG. 3A. On the other hand, the purge gas purged into the surge tank 13 becomes a mixed gas of air and the fuel vapor. The fuel vapor in the purge gas is burned in the combustion chamber 5. That is, the fuel vapor is also used for generating engine output in the same way as the injected fuel. Therefore, in this embodiment of the present invention, the basic amount of fuel Q2 calculated from the map shown in FIG. 3A minus the amount of fuel vapor is made the amount of fuel to actually be injected.

If the amount of purge of the purge gas is made small, however, the adsorption ability of the activated carbon 21 ends up becoming saturated. Therefore, the amount of purge of the purge gas is preferably made as large as possible. However, this purge gas, that is, the fuel vapor, disperses through the entire inside of the combustion chamber 5. Therefore, if the amount of injection is reduced along with the increase of the amount of fuel vapor as explained above, the concentration of the air-fuel mixture G formed around the spark plug 7 will become lower the greater the amount of the purge gas. In this case, if the concentration of the air-fuel mixture G becomes too low, a misfire will occur, so the concentration of the air-fuel mixture G can only be made thinner up to a certain fixed limit.

Therefore, in this embodiment of the present invention, the amount of fuel vapor to be purged is made smaller when the amount of injection is small, while the amount of fuel vapor to be purged is made greater when the amount of injection becomes greater. That is, the amount of fuel vapor to be purged is made to increase along with an increase in the amount of injection.

In this case, it is also possible to increase the amount of fuel vapor in proportion to the amount of injection. That is, it is also possible to make the fuel vapor rate, showing the ratio of the amount of fuel vapor to the amount of injection, constant. Particularly when designed to form an air-fuel mixture in a limited region in the combustion chamber 5, however, it is preferable to change the fuel vapor rate in accordance with the amount of injection. Next, this will be explained with reference to FIGS. 6A and 6B.

Figure 6A:
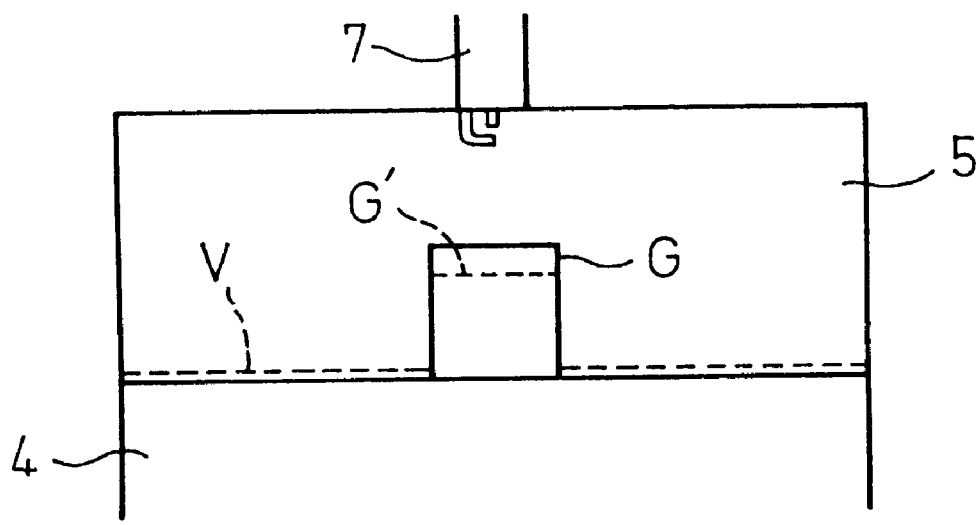
FIG. 6A and FIG. 6B are views for explaining a change in the amount of an air-fuel mixture.
Figure 6B:
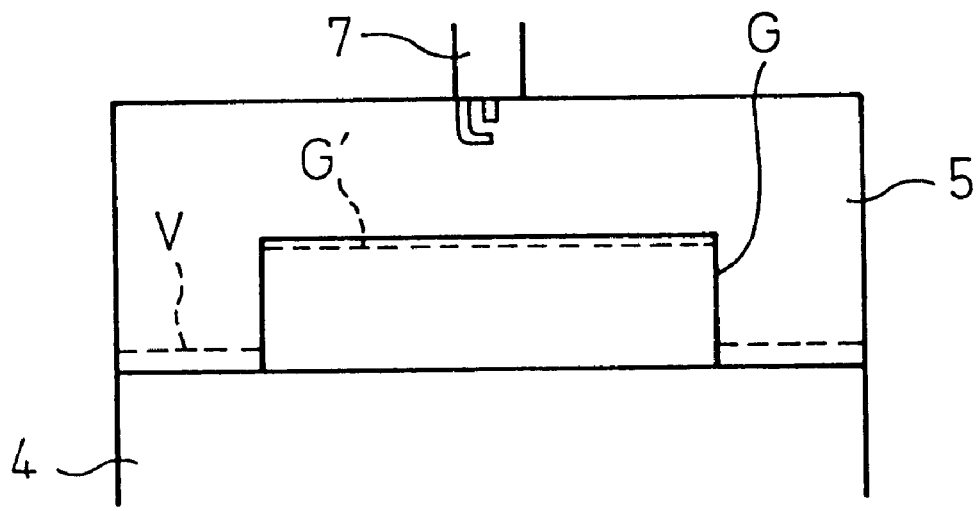

FIGS. 6A and 6B schematically show the amount of air-fuel mixture in a combustion chamber 5. Note that FIG. 6A corresponds to FIG. 5A, while FIG. 6B corresponds to FIG. 5B. That is, FIG. 6A shows the case of a small amount of injection and therefore the formation of an air-fuel mixture only near the spark plug 7, while FIG. 6B shows the case of a large amount of injection and dispersion of the air-fuel mixture.

Further, in FIGS. 6A and 6B, the solid line G shows the amount of air-fuel mixture when not performing a purge action, the broken line G' shows the amount of air-fuel mixture collected around the spark plug 7 when the fuel vapor is purged by the same fuel vapor rate, and the broken line V shows the amount of fuel vapor dispersed in the combustion chamber 5 as a whole. When the fuel vapor is purged, the amount of air-fuel mixture G' collected around the spark plug 7 becomes the sum of the amount of air-fuel mixture formed by the injected fuel and the amount of fuel vapor V.

In the case shown in FIG. 6A, only a very small amount of the total amount of fuel vapor V is superposed over the amount of air-fuel mixture formed by the injected fuel, so the amount of air-fuel mixture G' becomes considerably smaller than the amount of air-fuel mixture G. As opposed to this, in the case shown in FIG. 6B, the majority of the total amount of fuel vapor V is superposed over the amount of air-fuel mixture formed by the injected fuel, so the amount of air-fuel mixture G' becomes not that much less than the amount of air-fuel mixture G.

That is, in the case shown in FIG. 6B, even if the fuel vapor rate is made large, the concentration of the air-fuel mixture around the spark plug 7 does not drop that much and therefore in this case no misfire occurs even if the fuel vapor rate is made large. As opposed to this, in the case shown in FIG. 6A, if the fuel vapor rate is made large, the concentration of the air-fuel mixture around the spark plug 7 falls considerably and therefore a misfire occurs. Therefore, in the case shown in FIG. 6A, the fuel vapor rate must be made smaller than the case shown in FIG. 6B.

Figure 7:
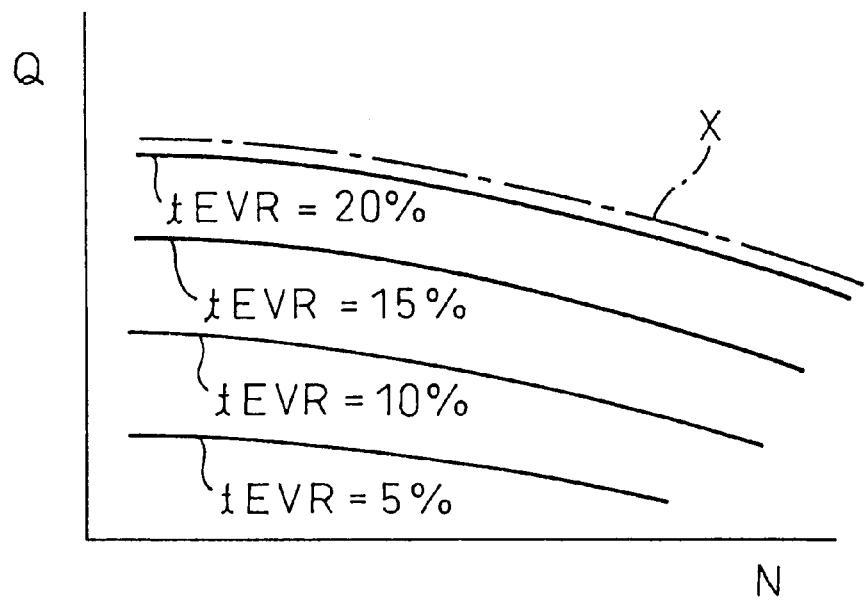
FIG. 7 is a view of a target fuel vapor rate tEVR.

Therefore, in this embodiment according to the present invention, as shown in FIG. 7, the target fuel vapor rate tEVR is made to become higher along with an increase in the basic amount of injection Q. Note that in FIG. 7, the abscissa N indicates the engine speed. The broken line X shows the boundary between the region where the mean air-fuel ratio A/F is lean and the region where the mean air-fuel ratio A/F is the stoichiometric air-fuel ratio. As shown in FIG. 7, in this embodiment of the present invention, in the region where the mean air-fuel ratio A/F is lean, that is, the region where the amount of injection Q is less than the boundary X, the target fuel vapor rate tEVR is made to gradually increase up to 20 percent along with an increase in the amount of injection Q and, in the region where the amount of injection Q is larger than the boundary X, the target fuel vapor rate tEVR is set to the constant value of 20 percent. The target fuel vapor rate tEVR shown in FIG. 7 is stored in advance in the ROM 42 in the form of a map as a function of the amount of injection Q and the engine speed N. Note that the target fuel vapor rate tEVR shown in FIG. 7 is just one example. The target fuel vapor rate tEVR may also be made more than 40 percent.

Figure 8:
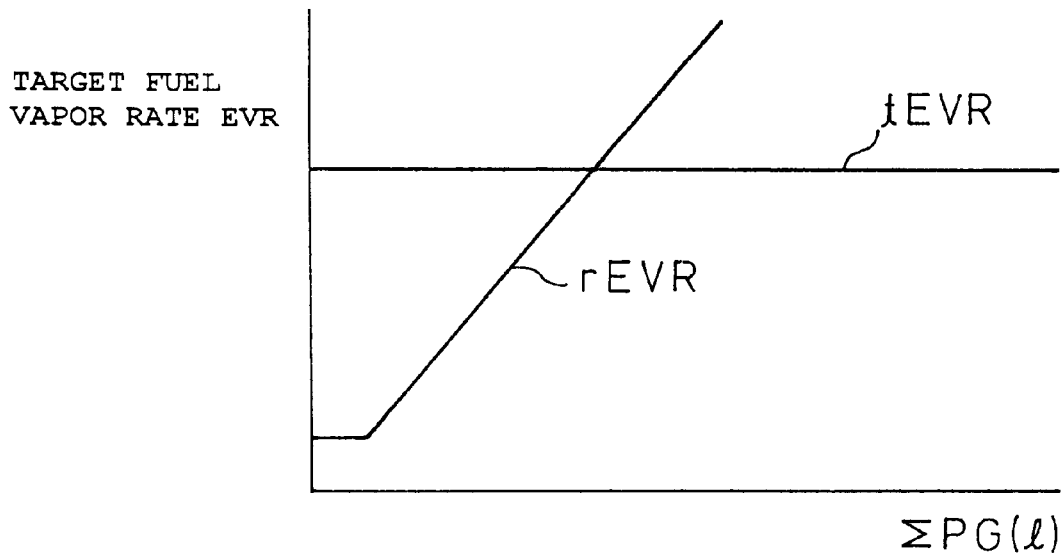
FIG. 8 is a view of a target fuel vapor rate rEVR and tEVR.

Note that the target fuel vapor rate tEVR shown in FIG. 7 shows the target fuel vapor rate a little while after the purge action is started. The target fuel vapor rate rEVR immediately after the start of the purge action is made to gradually increase as shown in FIG. 8. Note that in FIG. 8, the abscissa $\Sigma PG(l)$ shows the cumulative value of the amount of flow of the purge gas purged in the surge tank 13 after the start of the purge action. In this embodiment of the present invention, the smaller of the rEVR and tEVR shown in FIG. 8 is made the target fuel vapor rate EVR. Therefore, it is learned that when the purge action is started, the target fuel vapor rate EVR is made to gradually increase along with rEVR until tEVR is reached.

Figure 9:
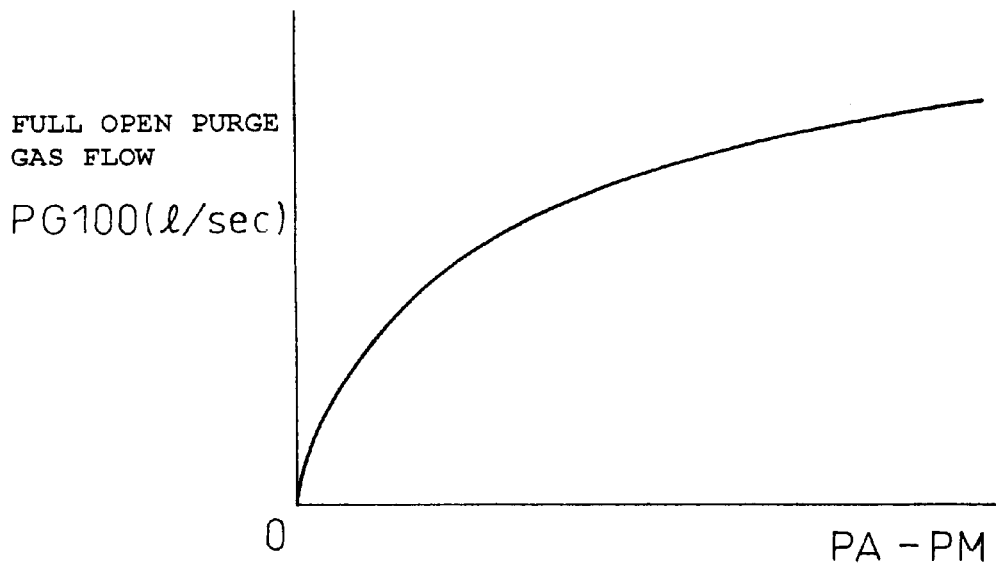
FIG. 9 is a view of the full open purge gas flow rate.
Figure 10:
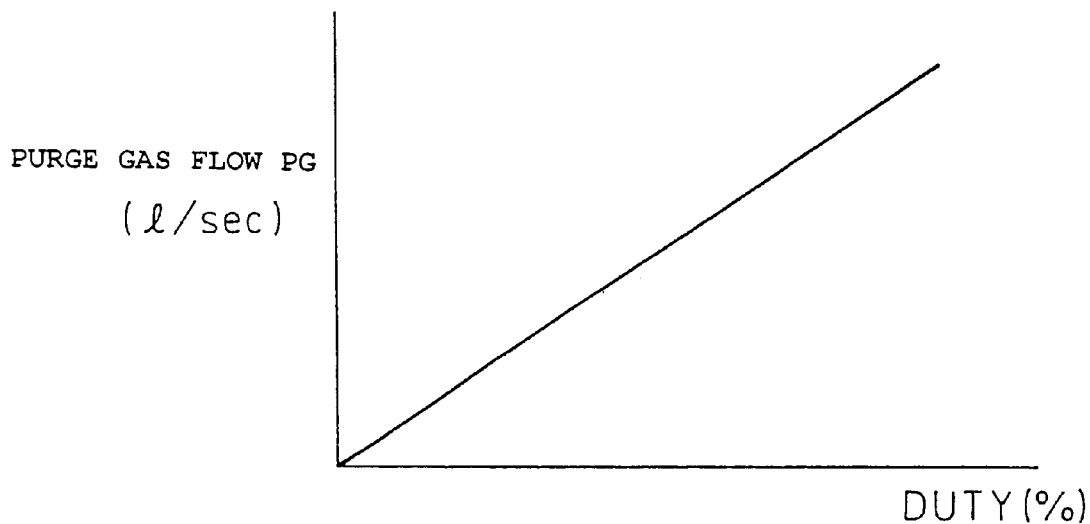
FIG. 10 is a view of a purge gas flow rate.

Next, an explanation will be given of the method of calculation of the cumulative value $\Sigma PG(l)$ of the amount of flow of purge gas with reference to FIG. 9 and FIG. 10. FIG. 9 shows the amount of flow of purge gas per unit time when the purge control valve 28 is fully opened, that is, the full open purge gas flow rate PG100 (l/sec). This full open purge gas flow rate PG100 (l/sec), as shown in FIG. 9, becomes a function of the pressure difference (PA−PM) between the atmospheric pressure PA and the absolute pressure PM in the surge tank 13. On the other hand, the purge control valve 28 is controlled based on the ratio of the time for which the purge control valve 28 should be opened in a predetermined time, that is, the duty ratio DUTY. As shown in FIG. 10, the amount of flow of purge gas per unit time (l/sec) is proportional to the duty ratio DUTY (%). Therefore, by multiplying the DUTY (%)/100% with the full open purge gas flow rate (l/sec) shown in FIG. 9, the actual amount of flow of purge gas per unit time (l/sec) can be calculated. By cumulatively adding the amount of flow of purge gas (l/sec), the cumulative value $\Sigma PG(l)$ of the amount of flow of purge gas can be obtained. Note that the relation shown in FIG. 9 is stored in advance in the ROM 42.

Next, the method of finding the duty ratio DUTY of the purge control valve 28 necessary for making the fuel vapor rate the target fuel vapor rate will be explained. When making the ratio of the target amount of fuel vapor to the basic amount of injection, that is, the target fuel vapor rate, EVR and making the engine speed N, the basic amount of injection per unit time is expressed as Q·N/60 (g/sec), so the amount of purge EVQ (g/sec) of the fuel vapor per unit time necessary for making the fuel vapor rate the target fuel vapor rate EVR is expressed by the following formula:

$$EVQ=EVR\cdot Q\cdot N/60$$

On the other hand, if multiplying the opening ratio of the purge control valve 28, that is, the DUTY/100, with the full open purge gas flow PG100 per unit time (l/sec), the result of the multiplication, PG100·DUTY/100, expresses the amount of flow of purge gas per unit time (l/sec) when the duty ratio of the purge control valve 28 is DUTY. Therefore, by multiplying the concentration of fuel vapor PV (g/l) in the purge gas with the purge gas flow rate (l/sec), the amount of fuel vapor purged per unit time (g/sec) is found. To make the fuel vapor rate the target fuel vapor rate EVR, the amount of fuel vapor (g/sec) must be made to match the above amount of fuel vapor EVQ. Therefore, to make the fuel vapor rate the target fuel vapor rate EVR, the following formula must be satisfied:

$$EVQ=PG100\cdot PV\cdot DUTY/100$$

Therefore, the duty ratio DUTY targeted becomes that expressed by the following formula:

$$DUTY=100\cdot EVQ/(PG100\cdot PV)$$

Here, as mentioned above, EVQ=EVR·Q·N/60. PG100 is found from the relation shown in FIG. 9, so by finding the concentration of fuel vapor PV (g/l) in the purge gas, the duty ratio DUTY is found.

In the first embodiment shown in FIG. 1, the concentration of fuel vapor PV (g/l) is found from the air-fuel ratio A/F detected by the air-fuel ratio sensor 32. That is, if the amount of purge gas purged per unit time is made PG (l/sec) and the amount of fuel vapor purged per unit time is made FUEL (g/sec), the concentration of fuel vapor PV is expressed by the following formula:

$$PV=FUEL(g/sec)/PG(l/sec)$$

Therefore, if the amount of flow of air in the amount of flow of purge gas PG (l/sec) is made AIR (l/sec) and the amount of flow of fuel vapor in the amount of flow of purge gas PG (l/sec) is made FUEL (l/sec), the concentration of fuel vapor PV is expressed by the following formula:

$$PV=FUEL(g/sec)/(AIR(l/sec)+FUEL(l/sec))$$

Here, if the density of air is made $\rho a$ (g/l) and the density of fuel is made $\rho f$ (g/l), the above formula becomes as follows:

$$PV=FUEL(g/sec)/(AIR(g/sec)/\rho a+FUEL(g/sec)/\rho f)$$

If the denominator and the numerator of the right side of the above formula are divided by FUEL (g/sec), the above formula becomes as follows:

$$PV=1/(AIR(g/sec)/FUEL(g/sec)/\rho a+1/\rho f)$$

Here, AIR (g/sec)/FUEL (g/sec) shows the air-fuel ratio of the purge gas. If this air-fuel ratio is made A/F, the above formula becomes as follows:

$$PV=1/((A/F)/\rho a+1/\rho f)$$

Therefore, if the air-fuel ratio A/F of the purge gas is known, the concentration of fuel vapor PV can be found. In the embodiment shown in FIG. 1, the air-fuel ratio A/F of the purge gas is made to be detected by the air-fuel ratio sensor 32. Therefore, the concentration of fuel vapor PV (g/l) can be found from the air-fuel ratio A/F detected by the air-fuel ratio sensor 32.

If the concentration of fuel vapor PV is found, the duty ratio DUTY is calculated based on the following formula:

$$DUTY=100 \cdot EVQ/(PG100 \cdot PV)$$

If the duty ratio DUTY of the purge control valve 28 is made the duty ratio DUTY calculated from the above formula, the fuel vapor rate becomes the target fuel vapor rate EVR.

On the other hand, the amount of fuel tQ to be injected is made the value of the basic amount of injection Q minus the amount of fuel vapor. In this case, the amount of injection to be reduced becomes Q·EVR. Therefore, the amount of fuel tQ to be injected is expressed by the following formula:

$$tQ=Q \cdot (1-EVR)$$

Now, as explained above, the target fuel vapor rate EVR is made the smaller of the rEVR and tEVR shown in FIG. 8. In this case, as the target fuel vapor rate EVR, it is possible to use the value of the smaller of the rEVR and tEVR shown in FIG. 8 as it is. When designed to form an air-fuel mixture in a limited region of the combustion chamber 5, however, if the fuel vapor is purged, the combustion will become unstable and the output torque of the engine will easily fluctuate. Therefore, it can be said to be preferable to determine the target fuel vapor rate EVR so that the fluctuation of the output torque of the engine does not become large.

Therefore, in this embodiment of the present invention, the target fuel vapor rate EVR is made to gradually increase toward the rEVR or tEVR so long as the fluctuation of the output torque of the engine does not exceed a predetermined amount of fluctuation, then the target fuel vapor rate EVR is maintained at rEVR or tEVR so long as the fluctuation of the output torque of the engine does not exceed the predetermined amount of fluctuation. In this case, if the fluctuation of the output torque of the engine becomes larger than the predetermined amount of fluctuation, the target fuel vapor rate EVR is made to be lowered.

In this way, in this embodiment of the present invention, the target fuel vapor rate EVR is controlled based on the amount of torque fluctuation of the engine output. Therefore, one example of the method of calculation of the amount of torque fluctuation will be briefly explained.

For example, if the angular speed of the crank shaft during the period when the crankshaft rotates from top dead center of the compression stroke (hereinafter referred to as "TDC") to 30° after top dead center of the compression stroke (hereinafter referred to as "ATDC") is referred to as the first angular speed $\omega a$ and the angular speed of the crankshaft during the period when the crankshaft rotates from ATDC60° to ATDC90° is referred to as the second angular speed $\omega b$, the angular speed of the crankshaft due to the combustion pressure when combustion is occurring in a cylinder is made to rise from the first angular speed $\omega a$ to the second angular speed $\omega b$. At this time, if the moment of rotational inertia of the engine is made I, the kinetic energy due to the compression pressure is made to rise from $(1/2) \cdot I \omega a^2$ to $(1/2) \cdot I \omega b^2$. Briefly speaking, a torque is generated due to the rise of the kinetic energy $(1/2) \cdot I \cdot (\omega b^2 - \omega a^2)$, so the generated torque becomes proportional to $(\omega b^2 - \omega a^2)$. Therefore, the generated torque is found from the difference of the square of the first angular speed $\omega b$ and the square of the second angular speed $\omega a$.

Next, the method of calculating the torque generated by each cylinder will be explained with reference to FIG. 11. As explained above, the crank angle sensor 36 generates an output pulse each time the crankshaft rotates by a crank angle of 30°. Further, the crank angle sensor 36 is arranged so as to generate an output pulse at the top dead center of the compression stroke TDC of each of the cylinders #1, #2, #3, and #4. Therefore, the crank angle sensor 36 generates an output pulse every 30° crank angle from each of the cylinders #1, #2, #3, and #4. Note that the firing order of the internal combustion engine used in the present invention is 1-3-4-2.

Figure 11:
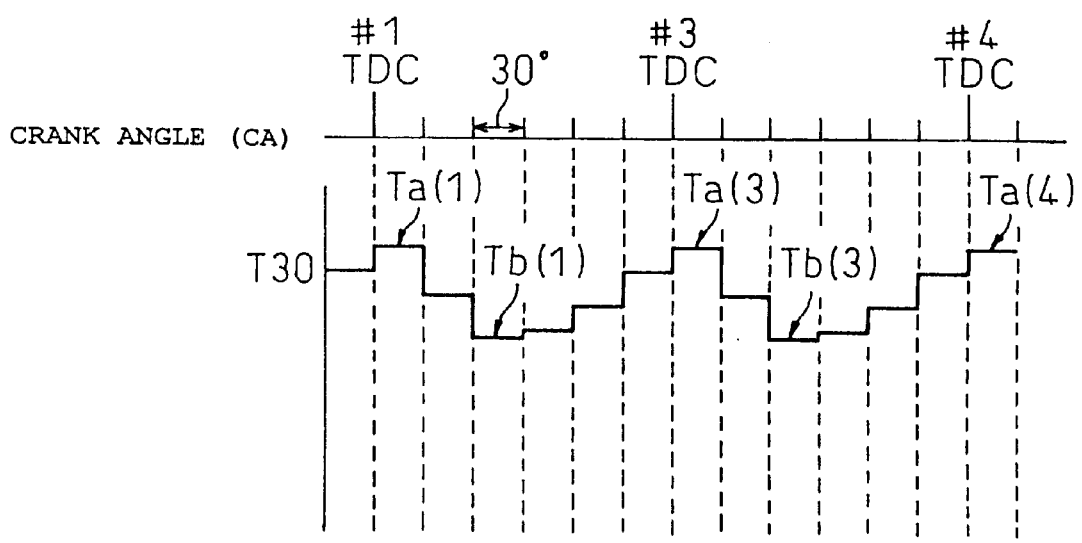
FIG. 11 is a view of changes of an elapsed time Ta(i), Tb(i)

In FIG. 11, the ordinate T30 shows the elapsed time of 30° crank angle from when the crank angle sensor 36 generates an output pulse to when it generates a next output pulse. Further, Ta(i) shows the elapsed time from the TDC of an i-th cylinder to ATDC30°, while Tb(i) shows the elapsed time from the ATDC60° of an i-th cylinder to ATDC90°. Therefore, for example Ta(1) shows the elapsed time from TDC to ATDC30° of the i-th cylinder, while Tb(1) shows the elapsed time from ATDC60° to ATDC90° of the i-th cylinder. On the other hand, if the crank angle is divided by the elapsed time T30, the result of division expresses the angular speed $\omega$. Therefore, the 30° crank angle/Ta(i) expresses the first angular speed $\omega a$ in the i-th cylinder, while 30° crank angle/Tb(i) expresses the second angular speed $\omega b$ in the i-th cylinder.

Figure 12:
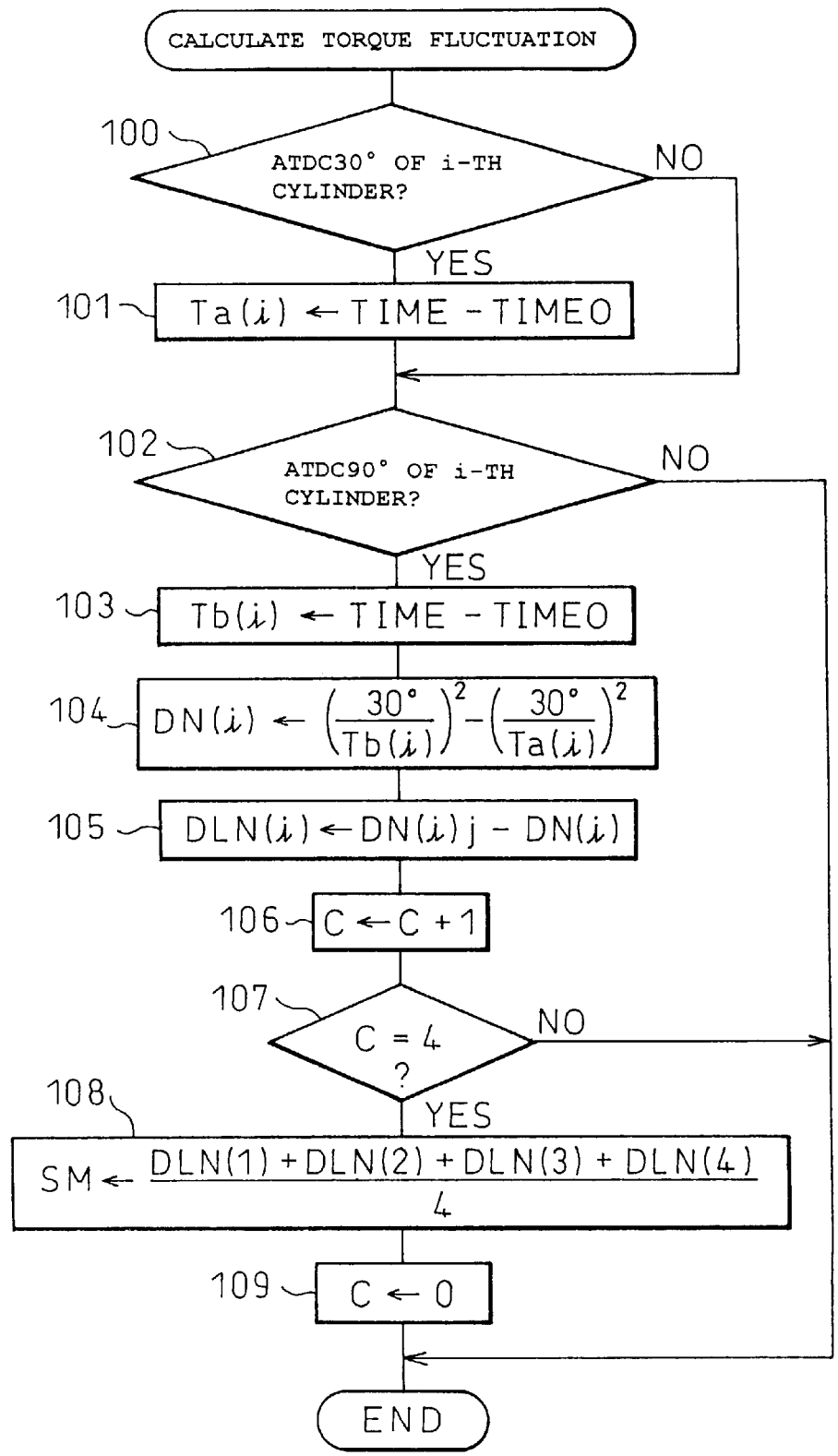
FIG. 12 is a flow chart for calculating an amount of torque fluctuation.

FIG. 12 shows a routine for calculating the amount of torque fluctuation. This routine is executed by interruption every 30° crank angle.

Referring to FIG. 12, first, at step 100, it is judged if the i-th cylinder is currently at ATDC30°. If the i-th cylinder is not currently at ATDC30°, the routine jumps to step 102, where it is judged if the i-th cylinder is currently at ATDC90°. If the i-th cylinder is not currently at ATDC90°, the processing cycle is ended.

As opposed to this, when it is judged at step 100 that the i-th cylinder is currently at ATDC30°, the routine proceeds to step 101, where the elapsed time Ta(i) from the TDC to ATDC30° of the i-th cylinder is calculated from the difference between the current time TIME and the time TIME0 of 30° crank angle before. Next, when it is judged at step 102 that the i-th cylinder is currently at ATDC90°, the routine proceeds to step 103, where the elapsed time Tb(i) from ATDC60° to ATDC90° of the i-th cylinder is calculated from the difference between the current time TIME and the time TIME0 of 30° crank angle before.

Next, at step 104, the generated torque DN(i) of the i-th cylinder is calculated based on the following formula:

$$DN(i)=\omega b^2 - \omega b^2 = (30°/Tb(i))^2 - (30°/Ta(i))^2$$

Next, at step 105, the torque fluctuation DLN(i) during one cycle of the same cylinder is calculated based on the following formula:

$$DLN(i)=DN(i)j-DN(i)$$

Here, DN(i)j expresses the generated torque of the same cylinder one cycle (720° crank angle) before.

Next, at step 106, the count C is incremented by exactly 1. Next, at step 107, it is judged if the count C has become 4, that is, if the torque fluctuation DLN(i) has been calculated for all cylinders. When C=4, the routine proceeds to step 108, where the mean value of the torque fluctuation DLN(i) of all of the cylinders shown by the following formula is made the final torque fluctuation SM.

$$SM=(DLN(1)+DLN(2)+DLN(3)+DLN(4))/4$$

Next, at step 109, the count C is made zero.

Next, an explanation will be given of the control of the purge action while referring to FIG. 13 and FIG. 14. Note that the routine shown in FIG. 13 and FIG. 14 is executed by interruption every predetermined time interval.

Figure 13:
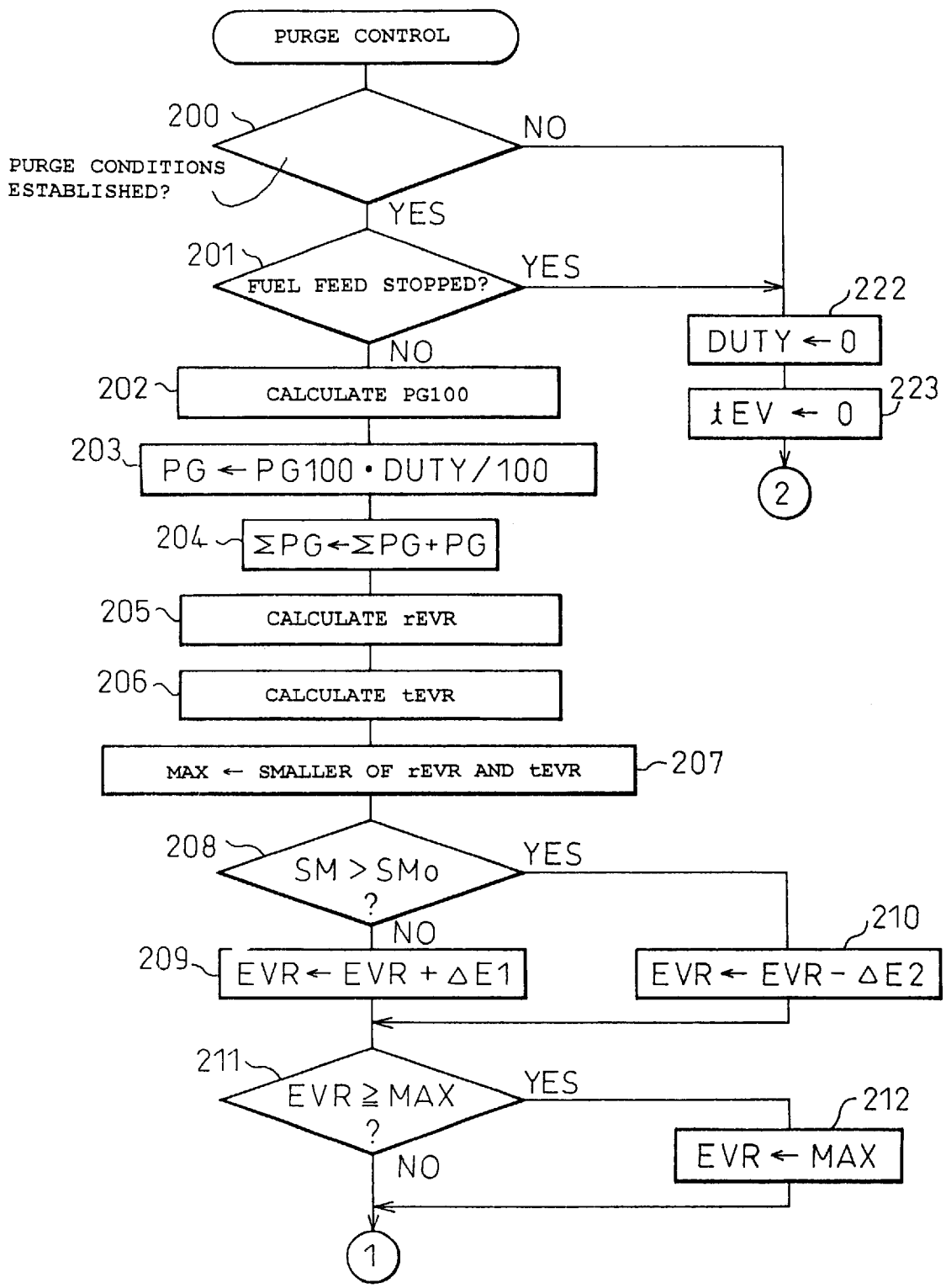
FIG. 13 and FIG. 14 are flow charts for execution of purge control in a first embodiment.
Figure 14:
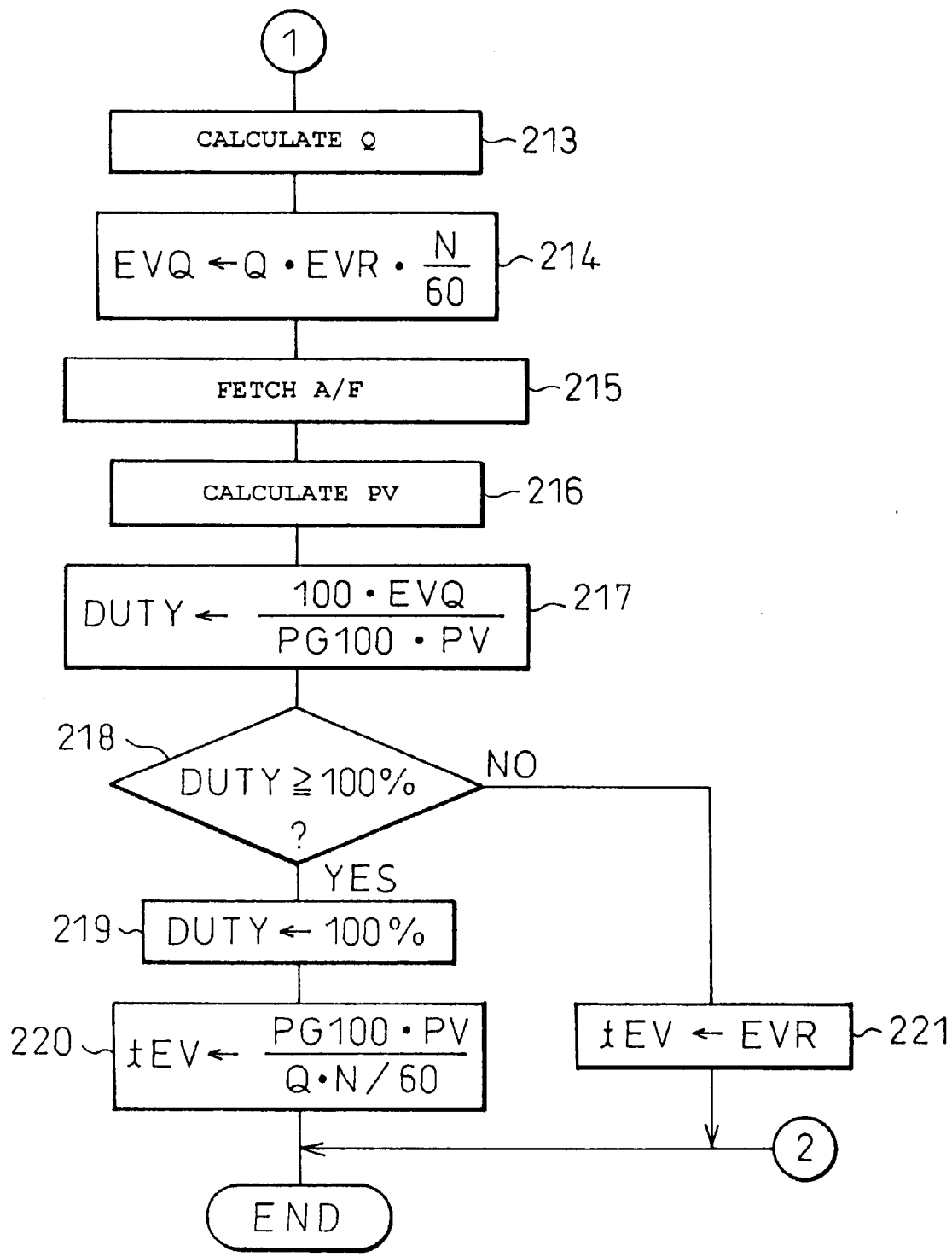

Referring to FIG. 13 and FIG. 14, first, at step 200, it is judged if the purge conditions have been established. For example, when the engine coolant water temperature is at least 80° C. and 30 seconds have elapsed after engine startup, it is judged that the purge conditions have been established. When the purge conditions have been established, the routine proceeds to step 201, where it is judged if the feed of fuel has been stopped. When the feed of fuel has not been stopped, the routine proceeds to step 202.

At step 202, the full open purge gas flow rate PG100 is calculated from the relation shown in FIG. 9 based on the atmospheric pressure PA detected by the atmospheric pressure sensor 33 and the absolute pressure PM detected by the pressure sensor 30. Next, at step 203, the flow of purge gas PG per unit time is calculated from the following formula using the current duty ratio DUTY:

$$PG=PG100 \cdot DUTY/100$$

Next, at step 204, the amount of flow of purge gas PG is added to the cumulative value ΣPG of the amount of flow of purge gas. Next, at step 205, the target fuel vapor rate rEVR is calculated from the relation shown in FIG. 8 based on the cumulative value ΣPG of the amount of flow of purge gas. Next, at step 206, the target fuel vapor rate tEVR is calculated from the relation shown in FIG. 7. Next, at step 207, the smaller of rEVR and tEVR is made the maximum permissible value MAX of the target fuel vapor rate.

Next, at step 208, it is judged if the amount of torque fluctuation SM is larger than a predetermined amount of fluctuation $SM_0$. When $SM \leq SM_0$, the routine proceeds to step 209, where a predetermined value ΔE1 is added to the target fuel vapor rate EVR. As opposed to this, when $SM>SM_0$, the routine proceeds to step 210, where a predetermined value ΔE2 is subtracted from the target fuel vapor rate EVR. Next, at step 211, it is judged if the target fuel vapor rate EVR is larger than the maximum permissible value MAX. When EVR≧MAX, the routine proceeds to step 212, where the maximum permissible value MAX is made the target fuel vapor rate EVR.

That is, when $SM>SM_0$, EVR is made smaller. As opposed to this, if $SM \leq SM_0$, EVR is increased. So long as $SM \leq SM_0$, EVR is made MAX.

Next, at step 213, the basic amount of injection Q is calculated from the maps shown in FIGS. 3A and 3B. This basic amount of injection Q is equal to Q2 in the region of $L<L_1$ in FIG. 2, is the sum of Q1 and Q2 in the region of $L_1 \leq L<L_2$, and is equal to Q1 in the region of $L \geq L_2$. Next, at step 214, the basic amount of injection Q, the target fuel vapor rate EVR, and the engine speed N are used to calculate the amount of fuel vapor EVQ to be purged per unit time from the following formula:

$$EVQ=Q \cdot EVR \cdot N/60$$

Next, at step 215, the air-fuel ratio A/F detected by the air-fuel ratio sensor 32 is read. Next, at step 216, the concentration of fuel vapor PV in the purge gas is calculated from the air-fuel ratio A/F based on the following formula:

$$PV=1/((A/F)/\rho a+1/\rho f)$$

Next, at step 217, the duty ratio DUTY necessary for making the fuel vapor rate the target fuel vapor rate EVR is calculated based on the following formula:

$$DUTY=100 \cdot EVQ/(PG100 \cdot PV)$$

Next, at step 218, it is judged if the duty ratio DUTY is more than 100%. When DUTY<100%, the routine proceeds to step 221, where EVR is made the final target fuel vapor rate tEV. As opposed to this, when DUTY≧100%, the routine proceeds to step 219, where the duty ratio DUTY is made 100%, then the routine proceeds to step 220, where the final target fuel vapor rate tEV is calculated based on the following formula:

$$tEV=PG100 \cdot PV/(Q \cdot N)/60)$$

That is, PG100·PV expresses the amount of fuel vapor to be purged when DUTY=100%, so the final target fuel vapor rate tEV is expressed as shown in the above formula.

On the other hand, when it is judged at step 200 that the purge conditions are not established or when it is judged at step 201 that the feed of fuel has stopped, the routine proceeds to step 222, where the duty ratio DUTY is made zero, then at step 223 the final target fuel vapor rate tEV is made zero. At this time, the purge action is stopped.

Figure 15:
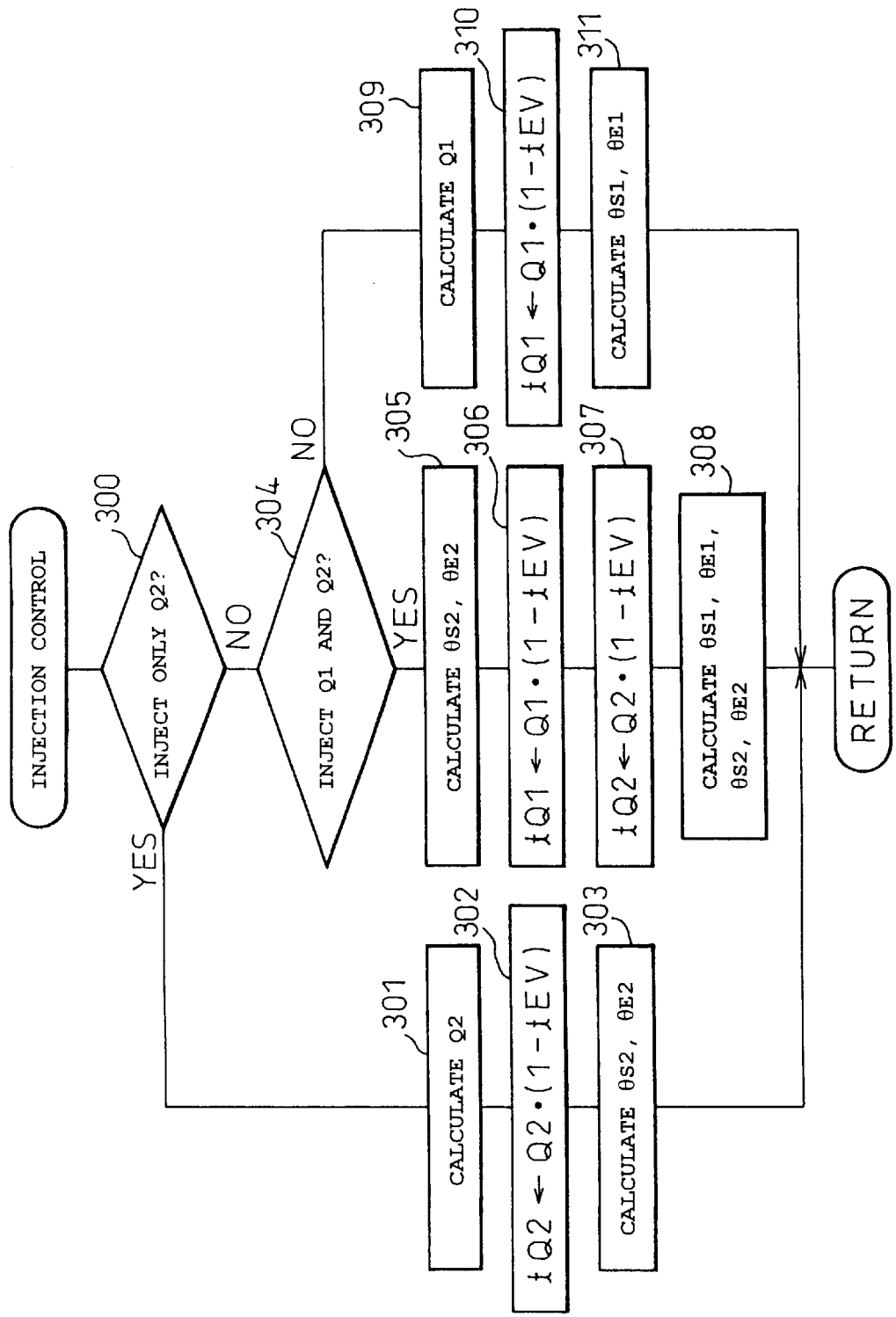
FIG. 15 is a flow chart for control of injection.

FIG. 15 shows the routine for control of fuel injection. This routine is repeatedly executed.

Referring to FIG. 15, first, at step 300, it is judged if only the fuel injection Q2 is to be performed. When only the fuel injection Q2 is to be performed, the routine proceeds to step 201, where the basic amount of injection Q2 is calculated from the map shown in FIG. 3A. Next, at step 302, the final amount of injection tQ2 is calculated based on the following formula:

$$tQ2=Q2 \cdot (1-tEV)$$

Next, at step 303, the injection start timing θS2 is calculated from the map shown in FIG. 4A and the injection end timing θE2 is calculated from θS2, the amount of injection Q2, and the engine speed N.

On the other hand, when it is judged at step 300 that not only the fuel injection Q2 is to be performed, the routine proceeds to step 304, where it is judged if the fuel injections Q1 and Q2 are to be performed. When the fuel injections Q1 and Q2 are to be performed, the routine proceeds to step 305, where the basic fuel amounts of injection Q1 and Q2 are calculated from the maps shown in FIGS. 3A and 3B. Next, at step 306, the final amount of injection tQ1 is calculated based on the following formula:

$$tQ1=Q1 \cdot (1-tEV)$$

Next, at step 307, the final amount of injection tQ2 is calculated based on the following formula:

$$tQ2=Q2 \cdot (1-tEV)$$

Next, at step 308, the injection start timings θS1 and θS2 are calculated from the maps shown in FIGS. 4A and 4B and the injection end timings θE1 and θE2 are calculated from these θS1 and θS2, the amounts of injection Q1 and Q2, and the engine speed N.

Note that in this case, it is also possible to find the total amount of injection tQ (=Q(1−tEV)) from the total basic amount of injection Q (=Q1+Q2), make the final amount of injection tQ1=tQ−Q2, and make the final amount of injection tQ2=Q1.

On the other hand, when it is judged at step 304 that the fuel injections Q1 and Q2 are not to be performed, the routine proceeds to step 309, where the basic amount of injection Q1 is calculated from the map shown in FIG. 3B. Next, at step 310, the final amount of injection tQ1 is calculated based on the following formula:

$$tQ1=Q1\cdot(1-tEV)$$

Next, at step 311, the injection start timing θS1 is calculated from the map shown in FIG. 4B and the injection end timing θE1 is calculated from this θS1, amount of injection Q1, and engine speed N.

Figure 16:
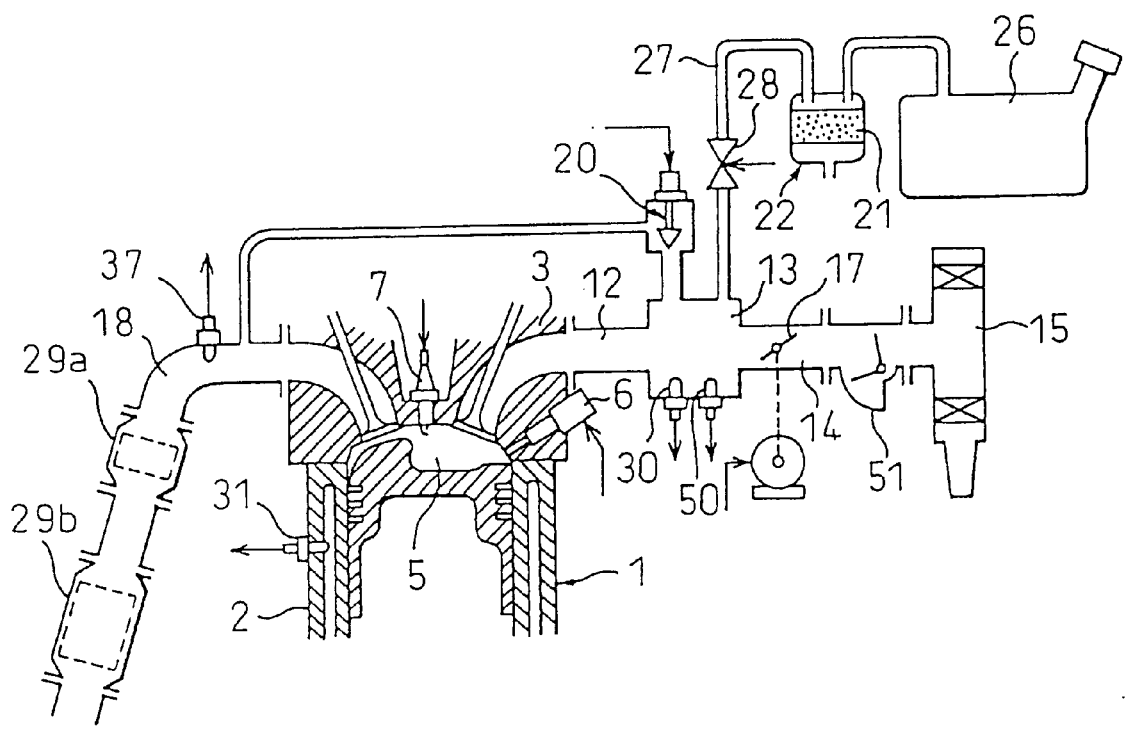
FIG. 16 is an overall view of another embodiment of an internal combustion engine.
Figure 17:
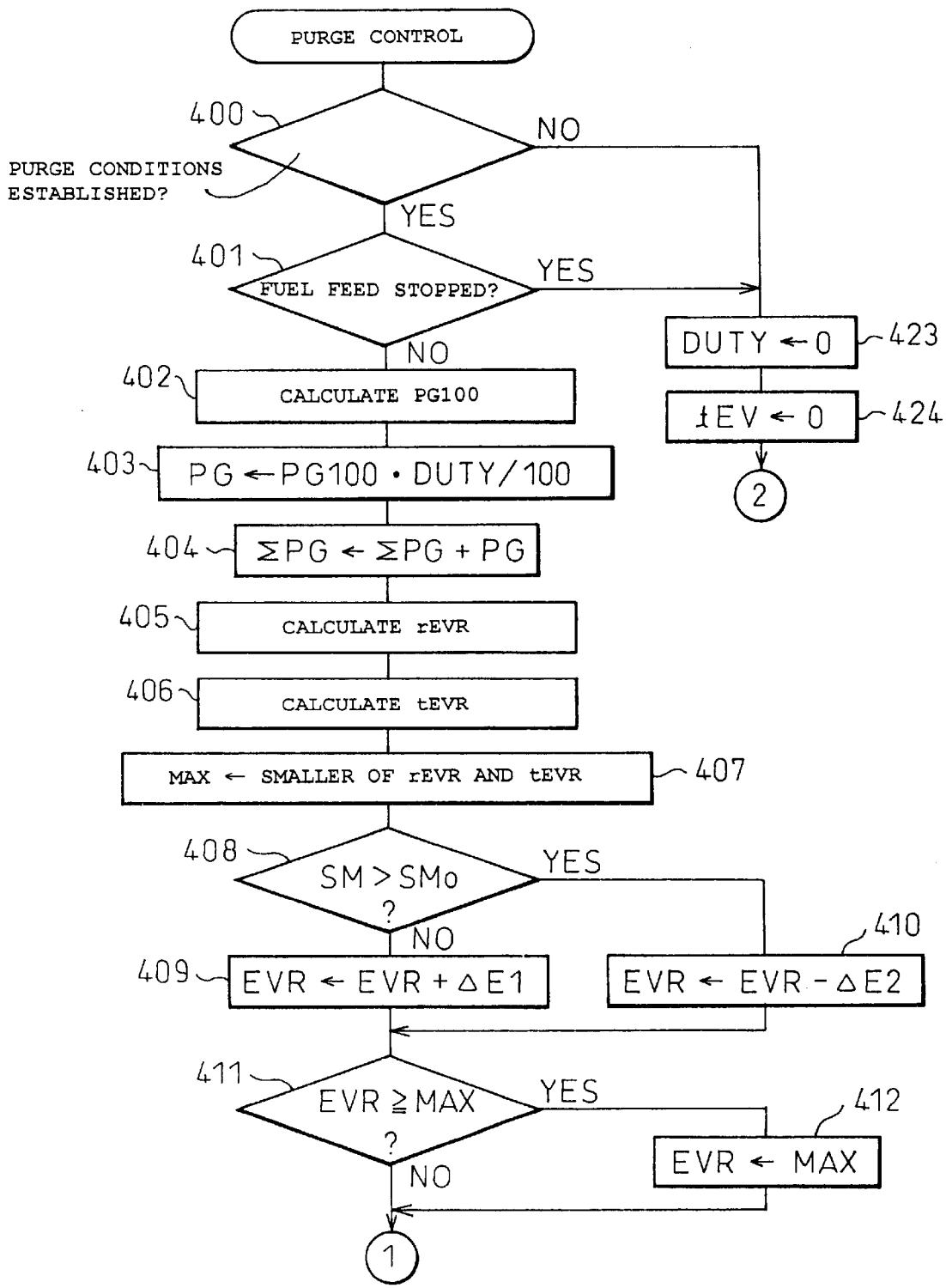
FIG. 17 and FIG. 18 are flow charts for execution of purge control in a second embodiment.
Figure 18:
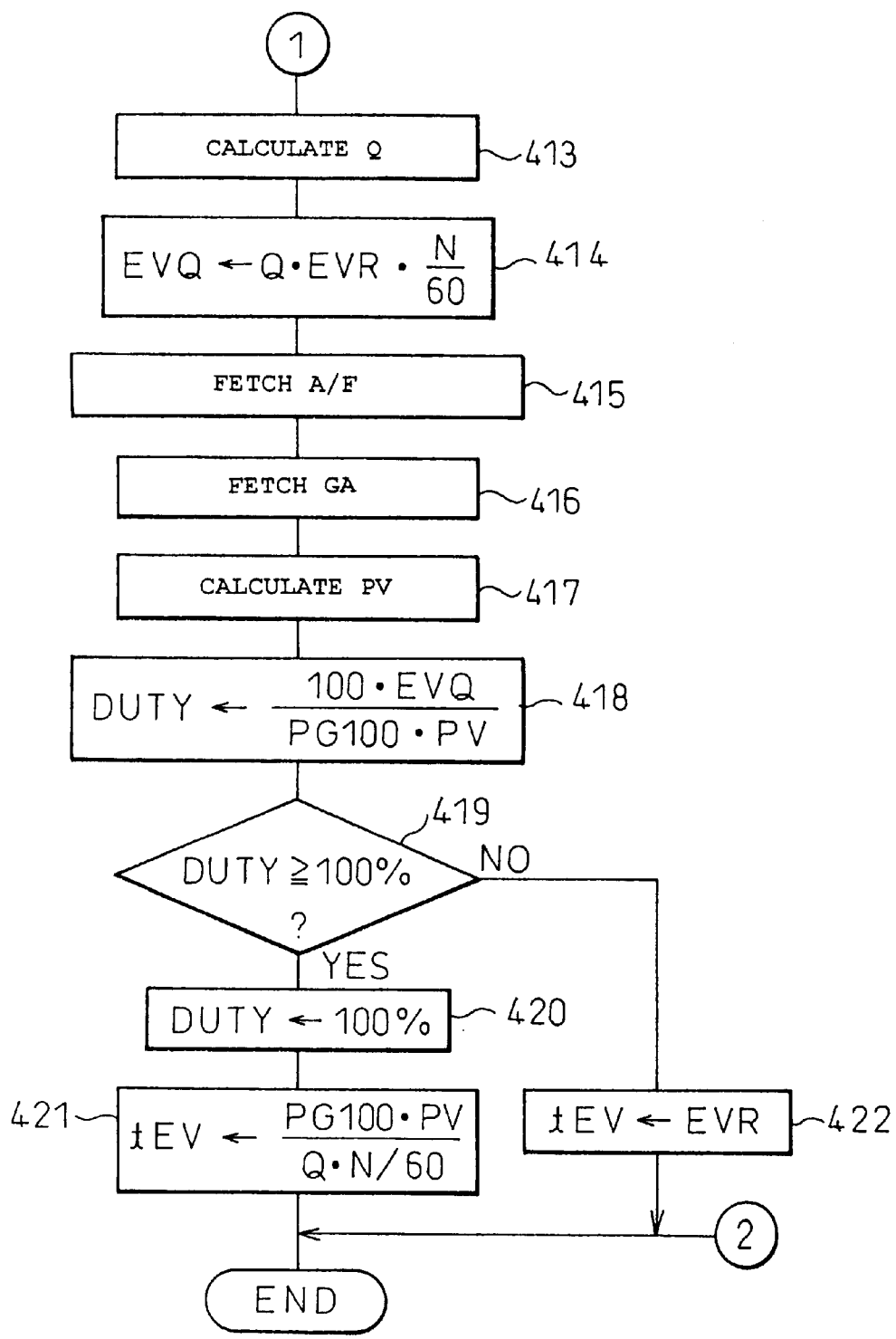

FIG. 16 to FIG. 18 show a second embodiment. As shown in FIG. 16, in this embodiment, an air-fuel ratio sensor 50 is arranged inside the surge tank 13 and an air flow meter 51 for detecting the amount of intake air is arranged in the intake duct 14. In this embodiment, the concentration of fuel vapor PV (g/l) of the purge gas is calculated from the amount of intake air GA (l/sec) and the air-fuel ratio A/F of the intake gas.

That is, in this embodiment as well, in the same way as the first embodiment, the targeted duty ratio DUTY of the purge control valve 28 is calculated based on the following formula:

$$DUTY=100\cdot EVQ/(PG100-PV)$$

Here, as explained above, EVQ=EVR·Q·N/60 and PG100 is found from the relation shown in FIG. 9. Therefore, by finding the concentration PV of fuel vapor (g/l) in the purge gas in the same way as in the first embodiment, the duty ratio DUTY is found.

In the second embodiment shown in FIG. 16, the concentration of fuel vapor PV (g/l) is found from the air-fuel ratio A/F of the intake gas detected by the air-fuel ratio sensor 50 and the amount of intake air GA (l/sec) detected by the air flow meter 51. That is, if the amount of purge gas purged per unit time is made PG (l/sec) and the amount of fuel vapor purged per unit time is made FUEL (g/sec), the concentration of fuel vapor is expressed by the following formula as explained above:

$$PV=FUEL(\text{g/sec})/PG(\text{l/sec})$$

Here, by replacing the denominator of the right side with GA (l/sec)+PG (l/sec), the following is obtained:

$$PV=[FUEL(\text{g/sec})/(GA(\text{l/sec})+PG(\text{l/sec}))]\cdot[(GA(\text{l/sec})+PG(\text{l/sec}))/PG(\text{l/sec})]=[FUEL(\text{g/sec})/(GA(\text{l/sec})+PG(\text{l/sec}))]\cdot[GA(\text{l/sec})/PG(\text{l/sec})+1]$$

Here, if the amount of flow of air in the amount of flow of purge gas PG (l/sec) is made AIR (l/sec) and the amount of flow of fuel vapor in the amount of flow of purge gas PG (l/sec) is made FUEL (l/sec), the first half FUEL (g/sec)/(GA (l/sec)+PG (l/sec)) of the right side of the above formula is expressed by the following formula:

$$FUEL(\text{g/sec})/(GA(\text{l/sec})+AIR(\text{l/sec})+FUEL(\text{l/sec}))$$

Here, if the density of air is made ρa (g/l) and the density of fuel is made ρf (g/l), the above formula becomes as follows:

$$FUEL(\text{g/sec})/[(GA(\text{g/sec})+AIR(\text{g/sec}))/\rho a+FUEL(\text{g/sec})/\rho f]$$

If the denominator and numerator of the above formula are divided by FUEL (g/sec), the above formula becomes the following:

$$1/[(GA(\text{g/sec})+AIR(\text{g/sec}))/FUEL(\text{g/sec})/\rho a+1/\rho f]$$

Here, (GA (g/sec)+AIR (g/sec))/FUEL (g/sec) expresses the air-fuel ratio of the intake gas. If this air-fuel ratio is made A/F, the above formula becomes as follows:

$$1/((A/F)/\rho a+1/\rho f)$$

Therefore, the concentration of fuel vapor PV becomes expressed by the following formula:

$$PV=[1/((A/F)/\rho a+1/\rho f)]\cdot[GA(\text{l/sec})/PG(\text{l/sec})+1]$$

Here, the amount of intake air GA (l/sec) is detected by the air flow meter 51. Further, the amount of flow of purge gas PG (l/sec) can be calculated from the following formula using the full open purge gas flow rate PG100 shown in FIG. 9 and the duty ratio DUTY.

$$PG=PG100\cdot DUTY/100$$

Therefore, if the air-fuel ratio A/F of the intake gas is known, the amount of fuel vapor PV can be found. In the embodiment shown in FIG. 16, the air-fuel ratio A/F of the intake gas is made to be detected by the air-fuel ratio sensor 50, therefore the concentration of fuel vapor PV (g/l) can be found from the air-fuel ratio A/F detected by the air-fuel ratio sensor 50.

If the concentration of the fuel vapor PV is found, the duty ratio DUTY is calculated based on the following formula as explained above:

$$DUTY=100\cdot EVQ/(PG100\cdot PV)$$

If the duty ratio DUTY of the purge control valve 28 is made the duty ratio DUTY calculated from the above formula, the fuel vapor rate becomes the target fuel vapor rate EVR.

Next, an explanation will be given of the routine for control of the purge action for working the second embodiment while referring to FIG. 17 and FIG. 18. Note that in the routine shown in FIG. 17 and FIG. 18, the steps different from the routine shown in FIG. 13 and FIG. 14 are step 415 and step 416. There other steps are the same as the steps in FIG. 13 and FIG. 14.

That is, referring to FIG. 17 and FIG. 18, first, at step 400, it is judged if the purge conditions have been established. For example, when the engine coolant water temperature is at least 80° C. and 30 seconds have elapsed after engine startup, it is judged that the purge conditions have been established. When the purge conditions have been established, the routine proceeds to step 401, where it is judged if the feed of fuel has been stopped. When the feed of fuel has not been stopped, the routine proceeds to step 402.

At step 402, the full open purge gas flow PG100 is calculated from the relation shown in FIG. 9 based on the atmospheric pressure PA detected by the atmospheric pressure sensor 33 and the absolute pressure PM detected by the pressure sensor 30. Next, at step 403, the amount of flow of purge gas PG per unit time is calculated from the following formula using the current duty ratio DUTY:

$$PG=PG100\cdot DUTY/100$$

Next, at step 404, the amount of flow of purge gas PG is added to the cumulative value ΣPG of the amount of flow of purge gas. Next, at step 405, the target fuel vapor rate rEVR is calculated from the relation shown in FIG. 8 based on the cumulative value ΣPG of the amount of flow of purge gas. Next, at step 406, the target fuel vapor rate tEVR is calculated from the relation shown in FIG. 7. Next, at step 407, the smaller of rEVR and tEVR is made the maximum permissible value MAX of the target fuel vapor rate.

Next, at step 408, it is judged if the amount of torque fluctuation SM is larger than a predetermined amount of fluctuation $SM_0$. When $SM \leq SM_0$, the routine proceeds to step 409, where a predetermined value ΔE1 is added to the target fuel vapor rate EVR. As opposed to this, when $SM>SM_0$, the routine proceeds to step 410, where a predetermined value ΔE2 is subtracted from the target fuel vapor rate EVR. Next, at step 411, it is judged if the target fuel vapor rate EVR is larger than the maximum permissible value MAX. When EVR≧MAX, the routine proceeds to step 412, where the maximum permissible value MAX is made the target fuel vapor rate EVR.

Next, at step 413, the basic amount of injection Q is calculated from the maps shown in FIGS. 3A and 3B. As explained above, this basic amount of injection Q is equal to Q2 in the region of $L<L_1$ in FIG. 2, is the sum of Q1 and Q2 in the region of $L_1 \leq L < L_2$, and is equal to Q1 in the region of $L \geq L_2$. Next, at step 414, the basic amount of injection Q, the target fuel vapor rate EVR, and the engine speed N are used to calculate the amount of fuel vapor EVQ to be purged per unit time from the following formula:

$$EVQ = Q \cdot EVR \cdot N/60$$

Next, at step 415, the air-fuel ratio A/F detected by the air-fuel ratio sensor 50 is read. Next, at step 416, the amount of intake air GA detected by the air flow meter 51 is read. Next, at step 417, the concentration of fuel vapor PV is calculated based on the following formula:

$$PV = [1/((A/F)/\rho a + 1/\rho f)] \cdot [GA/PG + 1]$$

Next, at step 418, the duty ratio DUTY necessary for making the fuel vapor rate the target fuel vapor rate EVR is calculated based on the following formula:

$$DUTY = 100 \cdot EVQ/(PG100 \cdot PV)$$

Next, at step 419, it is judged if the duty ratio DUTY is more than 100%. When DUTY<100%, the routine proceeds to step 422, where EVR is made the final target fuel vapor rate tEV. As opposed to this, when DUTY≧100%, the routine proceeds to step 420, where the duty ratio DUTY is made 100%, then the routine proceeds to step 421, where the final target fuel vapor rate tEV is calculated based on the following formula:

$$tEV = PG100 \cdot PV/((Q \cdot N)/60)$$

On the other hand, when it is judged at step 400 that the purge conditions are not established or when it is judged at step 401 that the feed of fuel has stopped, the routine proceeds to step 423, where the duty ratio DUTY is made zero, then at step 424 the final target fuel vapor rate tEV is made zero. At this time, the purge action is stopped.

Figure 19:
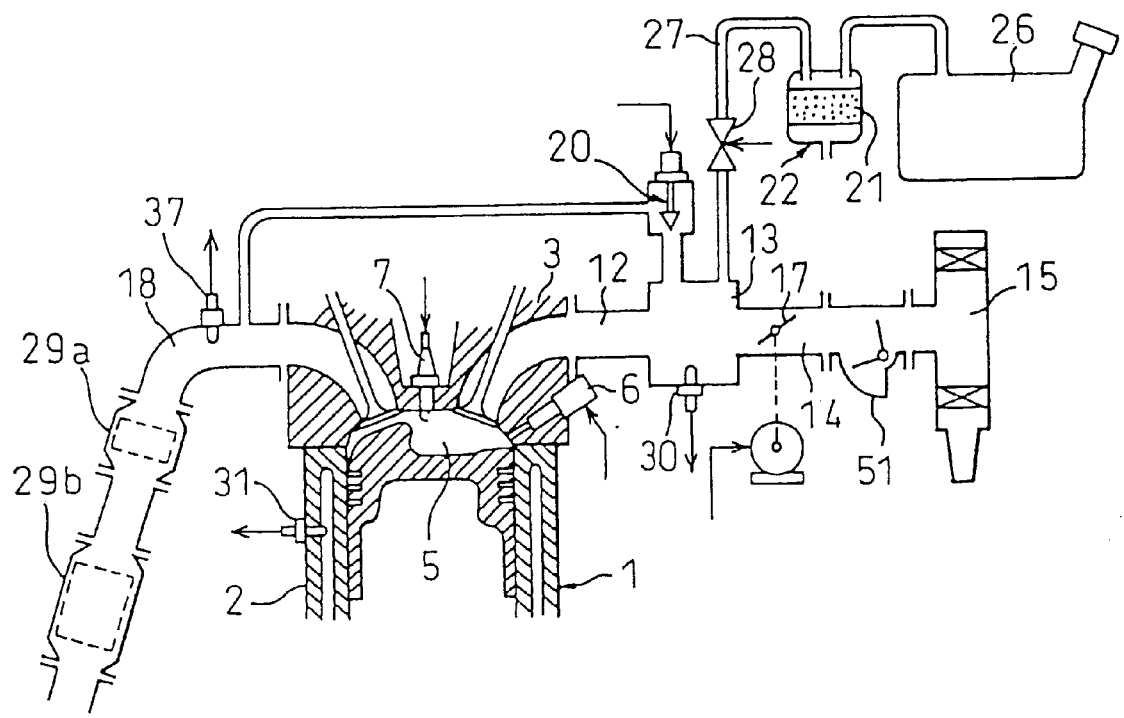
FIG. 19 is an overall view of still another embodiment of an internal combustion engine.
Figure 20:
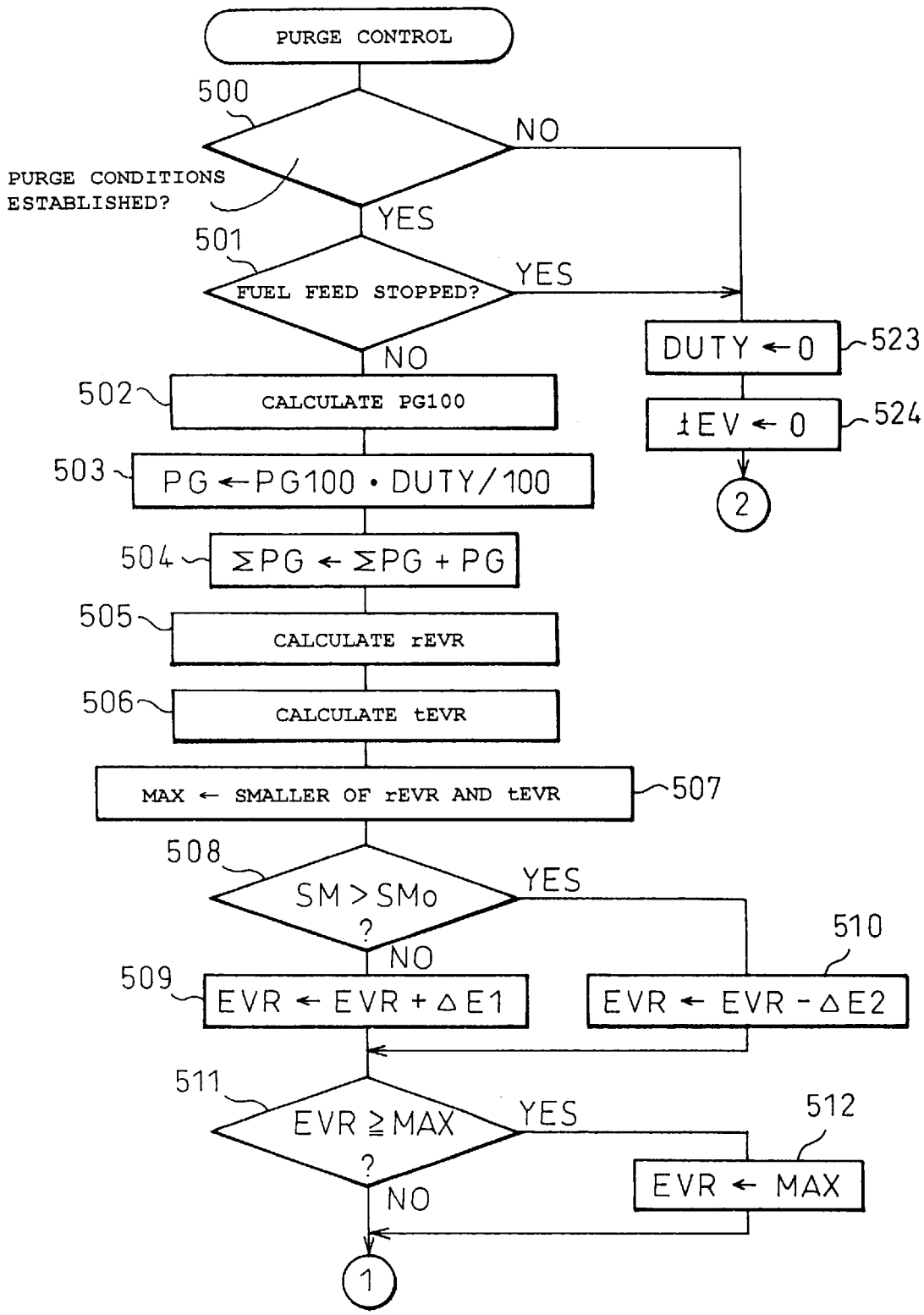
FIG. 20 and FIG. 21 are flow charts for execution of purge control in a third embodiment.
Figure 21:
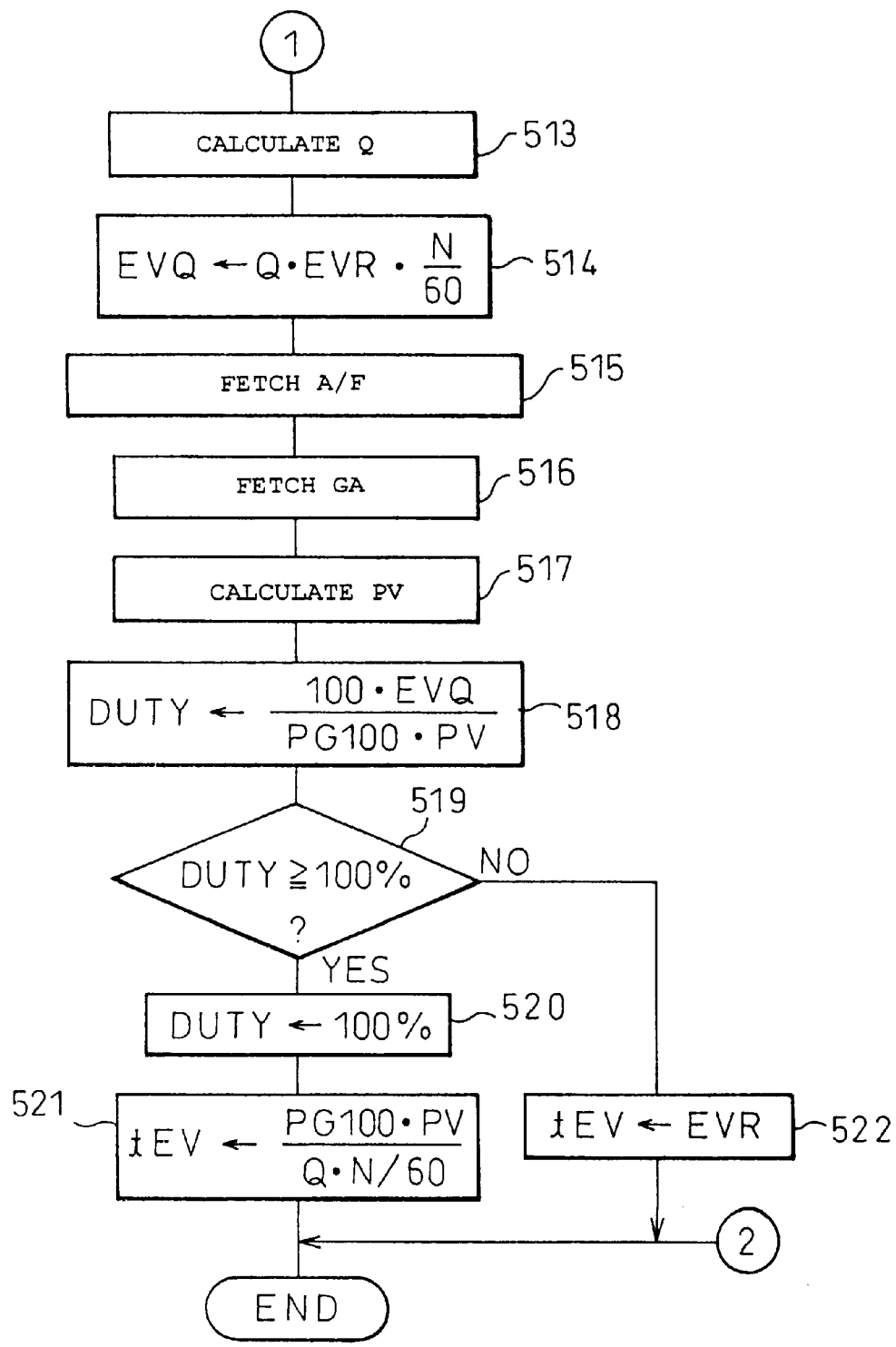

FIG. 19 to FIG. 21 show a third embodiment. As shown in FIG. 19, in this embodiment as well, an air flow meter 51 for detecting the amount of intake air is arranged in the intake duct 14. In this embodiment, the concentration of fuel vapor PV (g/l) of the purge gas is calculated from the amount of intake air GA (l/sec) and the air-fuel ratio A/F of the exhaust gas detected by the air-fuel ratio sensor 37.

That is, in this embodiment as well, in the same way as in the first embodiment, the targeted duty ratio DUTY of the purge control valve 28 is calculated based on the following formula:

$$DUTY = 100 \cdot EVQ/(PG100 \cdot PV)$$

Here, as explained above, $EVQ = EVR \cdot Q \cdot N/60$ and PG100 is found from the relation shown in FIG. 9, so in the same way as in the first embodiment, by finding the concentration of fuel vapor PV (g/l) in the purge gas, the duty ratio DUTY is found.

In the third embodiment shown in FIG. 19, the concentration of fuel vapor PV (g/l) is found from the air-fuel ratio A/F of the exhaust gas detected by the air-fuel ratio sensor 37 and the amount of intake air GA (l/sec) detected by the air flow meter 51. That is, if the amount of flow of purge gas purged per unit time is made PG (l/sec) and the amount of fuel vapor purged per unit time is made FUEL (g/l), the concentration of fuel vapor PV is expressed by the following formula as explained above:

$$PV = FUEL(g/sec)/PG(l/sec)$$

Here, by replacing the numerator FUEL (g/sec) of the right side with FUEL (g/sec)+Q·N/60 (g/sec) using the basic amount of injection per unit time Q·N/60 (g/sec), the above formula becomes as follows:

$$PV = [FUEL(g/sec) + Q \cdot N/60(g/sec))/PG(l/sec) - Q \cdot N/60(g/sec)/PG(l/sec)$$

Next, if replacing the denominator PG (l/sec) of the first term on the right side with GA (l/sec)+PG (l/sec)+Q·N/60 (g/sec)/ρf, the above formula becomes as follows. Here, ρf is the density (g/l) of fuel.

$$\begin{aligned}
PV &= [(FUEL\ (g/sec) + Q \cdot N/60\ (g/sec))/GA\ (l/sec) + \\
&\quad PG\ (l/sec) + Q \cdot N/60\ (g/sec)/\rho f] \cdot \\
&\quad [(GA\ (l/sec) + PG\ (l/sec) + Q \cdot N/60\ (g/sec)/ \\
&\quad \rho f)/PG\ (l/sec)] - Q \cdot N/60\ (g/sec)/PG\ (l/sec) \\
&= [(FUEL\ (g/sec) + Q \cdot N/60\ (g/sec))/(GA\ (l/ \\
&\quad sec) + PG\ (l/sec) + Q \cdot N/60\ (g/sec)/\rho f)] \cdot \\
&\quad [GA\ (l/sec)/PG\ (l/sec) + 1 + Q \cdot N/60\ (g/sec)/ \\
&\quad \rho f/PG\ (l/sec)] - Q \cdot N/60\ (g/sec)/PG\ (l/sec)
\end{aligned}$$

Here, if the amount of flow of air in the amount of flow of purge gas PG (l/sec) is made AIR (l/sec) and the amount of flow of fuel vapor in the amount of flow of purge gas PG (l/sec) is made FUEL (l/sec), the first part (FUEL (g/sec)+Q·N/60 (g/sec))/(GA (l/sec)+PG (l/sec)+Q·N/60 (g/sec)ρf) of the first term on the right side of the above formula is expressed by the following formula:

$$(FUEL(g/sec) + Q \cdot N/60(g/sec))/(GA(l/sec) + AIR(l/sec) + FUEL(l/sec) + Q \cdot N/60(g/sec)/\rho f)$$

Here, if the density of air is made ρa (g/l), the above formula becomes as follows:

$$(FUEL(g/sec) + Q \cdot N/60(g/sec))/[(GA(g/sec) + AIR(g/sec))/\rho a + FUEL(g/sec)/\rho f + Q \cdot N/60(g/sec)/\rho f]$$

If the denominator and numerator of the above formula are divided by FUEL (g/sec)+Q·N/60 (g/sec), the above formula becomes the following:

$$1/[(GA(g/sec) + AIR(g/sec))/FUEL(g/sec) + Q \cdot N/60(g/sec))/\rho a + 1/\rho f]$$

Here, (GA (g/sec)+AIR (g/sec))/FUEL (g/sec)+Q·N/60 (g/sec)) expresses the air-fuel ratio of the intake gas. If this air-fuel ratio is made A/F, the above formula becomes as follows:

$$1/((A/F)/\rho a + 1/\rho f)$$

Therefore, the concentration of fuel vapor PV becomes expressed by the following formula:

$$PV=[1/((A/F)/\rho a+1/\rho f)]\cdot[GA(l/sec)/PG(l/sec)+1+Q\cdot N/60(g/sec)/\rho f/PG(l/sec))]-Q\cdot N/60(g/sec)/PG(l/sec)$$

Here, the amount of intake air GA (l/sec) is detected by the air flow meter 51. The basic amount of injection Q is calculated. Further, the amount of flow of purge gas PG (l/sec) can be calculated from the following formula using the full open purge gas flow ratio PG100 shown in FIG. 9 and the duty ratio DUTY.

$$PG=PG100\cdot DUTY/100$$

Therefore, if the air-fuel ratio A/F of the exhaust gas is known, the amount of fuel vapor PV can be found. In the embodiment shown in FIG. 19, the air-fuel ratio A/F of the exhaust gas is made to be detected by the air-fuel ratio sensor 37, therefore the concentration of fuel vapor PV (g/l) can be found from the air-fuel ratio A/F detected by the air-fuel ratio sensor 37.

If the concentration of the fuel vapor PV is found, the duty ratio DUTY is calculated based on the following formula as explained above:

$$DUTY=100\cdot EVQ/(PG100\cdot PV)$$

If the duty ratio DUTY of the purge control valve 28 is made the duty ratio DUTY calculated from the above formula, the fuel vapor rate becomes the target fuel vapor rate EVR.

Next, an explanation will be given of the routine for control of the purge action for working the third embodiment while referring to FIG. 20 and FIG. 21. Note that the routine shown in FIG. 20 and FIG. 21 is the same as the routine shown in FIG. 17 and FIG. 18.

That is, referring to FIG. 20 and FIG. 21, first, at step 500, it is judged if the purge conditions have been established. For example, when the engine coolant water temperature is at least 80° C. and 30 seconds have elapsed after engine startup, it is judged that the purge conditions have been established. When the purge conditions have been established, the routine proceeds to step 501, where it is judged if the feed of fuel has been stopped. When the feed of fuel has not been stopped, the routine proceeds to step 502.

At step 502, the full open purge gas flow ratio PG100 is calculated from the relation shown in FIG. 9 based on the atmospheric pressure PA detected by the atmospheric pressure sensor 33 and the absolute pressure PM detected by the pressure sensor 30. Next, at step 503, the amount of flow of purge gas PG per unit time is calculated from the following formula using the current duty ratio DUTY:

$$PG=PG100\cdot DUTY/100$$

Next, at step 504, the amount flow of purge gas PG is added to the cumulative value $\Sigma PG$ of the amount of flow of purge gas. Next, at step 505, the target fuel vapor rate rEVR is calculated from the relation shown in FIG. 8 based on the cumulative value $\Sigma PG$ of the amount of flow of purge gas. Next, at step 506, the target fuel vapor rate tEVR is calculated from the relation shown in FIG. 7. Next, at step 507, the smaller of rEVR and tEVR is made the maximum permissible value MAX of the target fuel vapor rate.

Next, at step 508, it is judged if the amount of torque fluctuation SM is larger than a predetermined amount of fluctuation $SM_0$. When $SM \leq SM_0$, the routine proceeds to step 509, where a predetermined value $\Delta E1$ is added to the target fuel vapor rate EVR. As opposed to this, when $SM>SM_0$, the routine proceeds to step 510, where a predetermined value $\Delta E2$ is subtracted from the target fuel vapor rate EVR. Next, at step 511, it is judged if the target fuel vapor rate EVR is larger than the maximum permissible value MAX. When $EVR \geq MAX$, the routine proceeds to step 512, where the maximum permissible value MAX is made the target fuel vapor rate EVR.

Next, at step 513, the basic amount of injection Q is calculated from the maps shown in FIGS. 3A and 3B. As explained above, this basic amount of injection Q is equal to Q2 in the region of $L<L_1$ in FIG. 2, is the sum of Q1 and Q2 in the region of $L_1 \leq L<L_2$, and is equal to Q1 in the region of $L \geq L_2$. Next, at step 514, the basic amount of injection Q, the target fuel vapor rate EVR, and the engine speed N are used to calculate the amount of fuel vapor EVQ to be purged per unit time from the following formula:

$$EVQ=Q\cdot EVR\cdot N/60$$

Next, at step 515, the air-fuel ratio A/F detected by the air-fuel ratio sensor 50 is read. Next, at step 516, the amount of intake air GA detected by the air flow meter 51 is read. Next, at step 517, the concentration of fuel vapor PV is calculated based on the following formula:

$$PV=[1/((A/F)/\rho a+1/\rho f)]\cdot[GA/PG+1+Q\cdot N/60/\rho f/PG]-Q\cdot N/60/PG$$

Next, at step 518, the duty ratio DUTY necessary for making the fuel vapor rate the target fuel vapor rate EVR is calculated based on the following formula:

$$DUTY=100\cdot EVQ/(PG100\cdot PV)$$

Next, at step 519, it is judged if the duty ratio DUTY is more than 100%. When DUTY<100%, the routine proceeds to step 522, where EVR is made the final target fuel vapor rate tEV. As opposed to this, when $DUTY \geq 100\%$, the routine proceeds to step 520, where the duty ratio DUTY is made 100%, then the routine proceeds to step 521, where the final target fuel vapor rate tEV is calculated based on the following formula:

$$tEV=PG100\cdot PV/(Q\cdot N)/60)$$

On the other hand, when it is judged at step 500 that the purge conditions are not established or when it is judged at step 501 that the feed of fuel has stopped, the routine proceeds to step 523, where the duty ratio DUTY is made zero, then at step 524 the final target fuel vapor rate tEV is made zero. At this time, the purge action is stopped.

Figure 22:
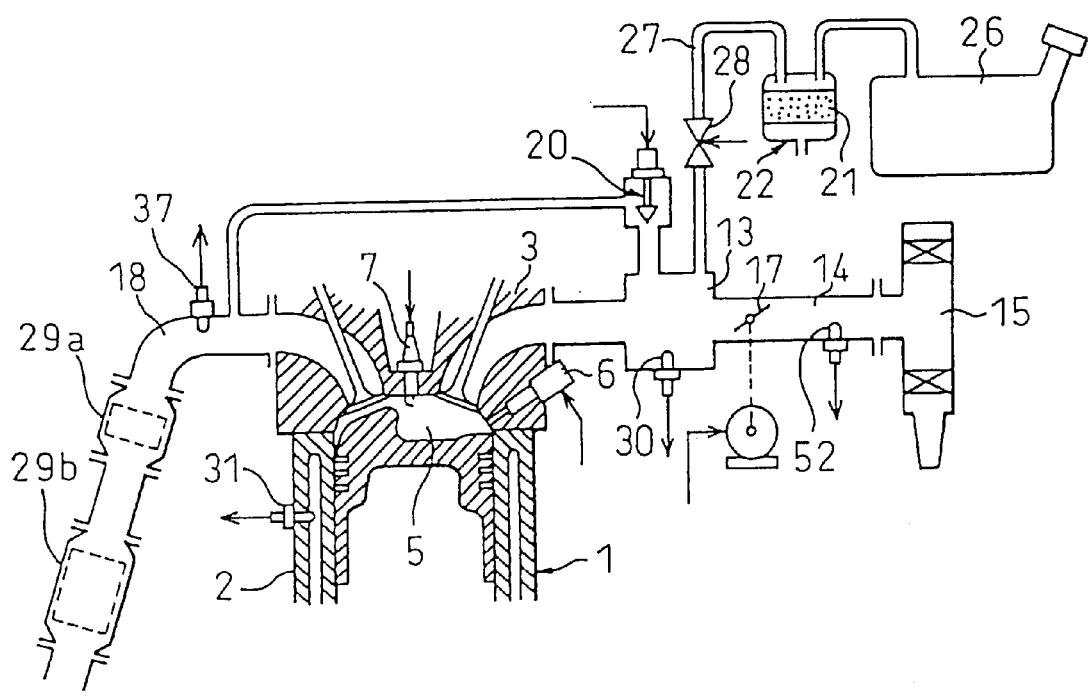
FIG. 22 is an overall view of still another embodiment of an internal combustion engine.

FIG. 22 to FIG. 25 show a fourth embodiment. As shown in FIG. 22, in this embodiment, a temperature sensor 52 for detecting the atmospheric temperature is mounted in the intake duct 14 and the concentration of fuel vapor PV (g/l) is estimated based on the atmospheric temperature. That is, when the purge action is started, the amount of fuel vapor adsorbed at the activated carbon 21 gradually falls, therefore, as shown in FIG. 23A, the concentration of fuel vapor PV in the purge gas decreases the greater the cumulative value $\Sigma PG$ of the amount of flow of purge gas. Therefore, in this embodiment, the relation shown in FIG. 23A is found in advance by experiments and the concentration of fuel vapor PV is estimated based on the relation shown in FIG. 23A.

Figure 23A:
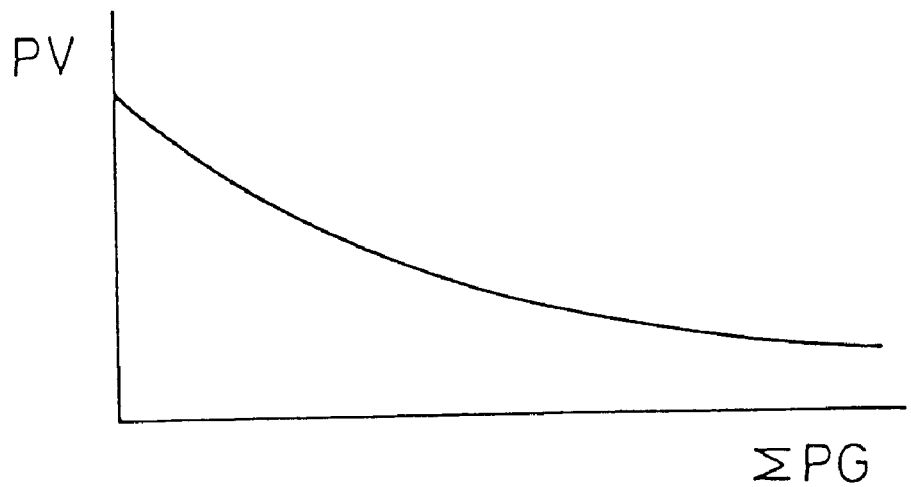
FIG. 23A and FIG. 23B are views of fuel vapor concentration etc.
Figure 23B:
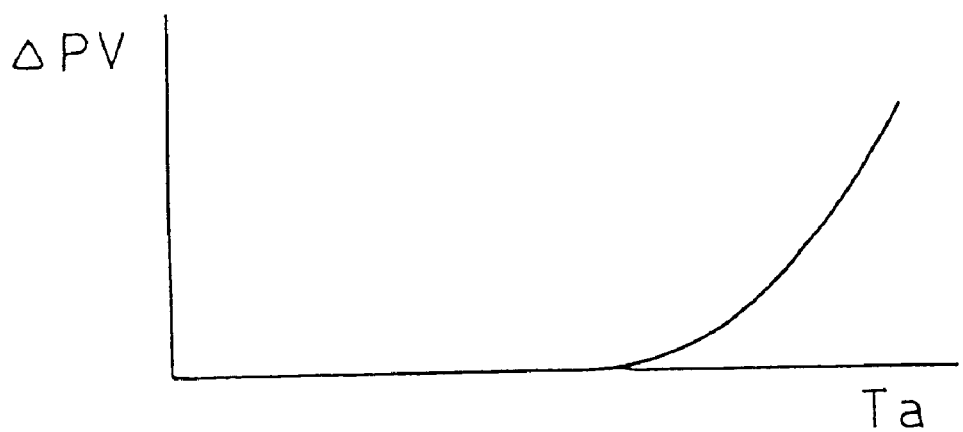

Further, when the atmospheric temperature becomes higher, the evaporative action of the fuel in the fuel tank 26 becomes more active and as a result, as shown in FIG. 23B, the increase ΔPV (g/l) of the concentration of fuel vapor per unit time becomes greater the higher the atmospheric temperature Ta. Therefore, in this embodiment, the relation shown in FIG. 23B is found in advance by experiments and the increase ΔPV in the concentration of fuel vapor per unit time is estimated based on the relation shown in FIG. 23B.

Next, an explanation will be given of the routine for control of the purge action for working the fourth embodiment while referring to FIG. 24 and FIG. 25. Note that the routine shown in FIG. 24 and FIG. 25 differs from the routine shown in FIG. 13 and FIG. 14 in step 615 to step 618. The rest of the steps are the same as the steps in FIG. 13 and FIG. 14.

Figure 24:
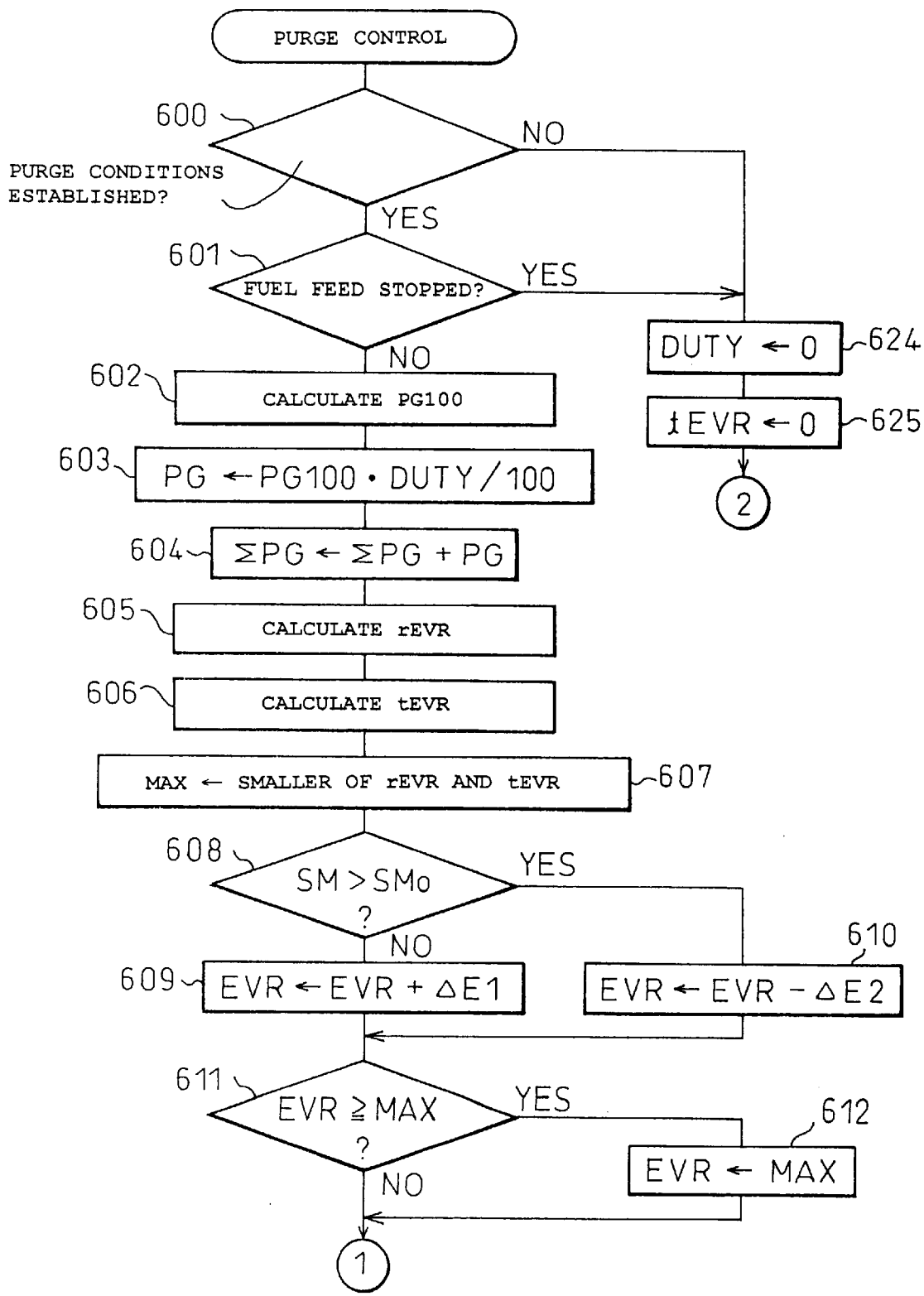
FIG. 24 and FIG. 25 are flow charts for execution of purge control in a fourth embodiment.
Figure 25:
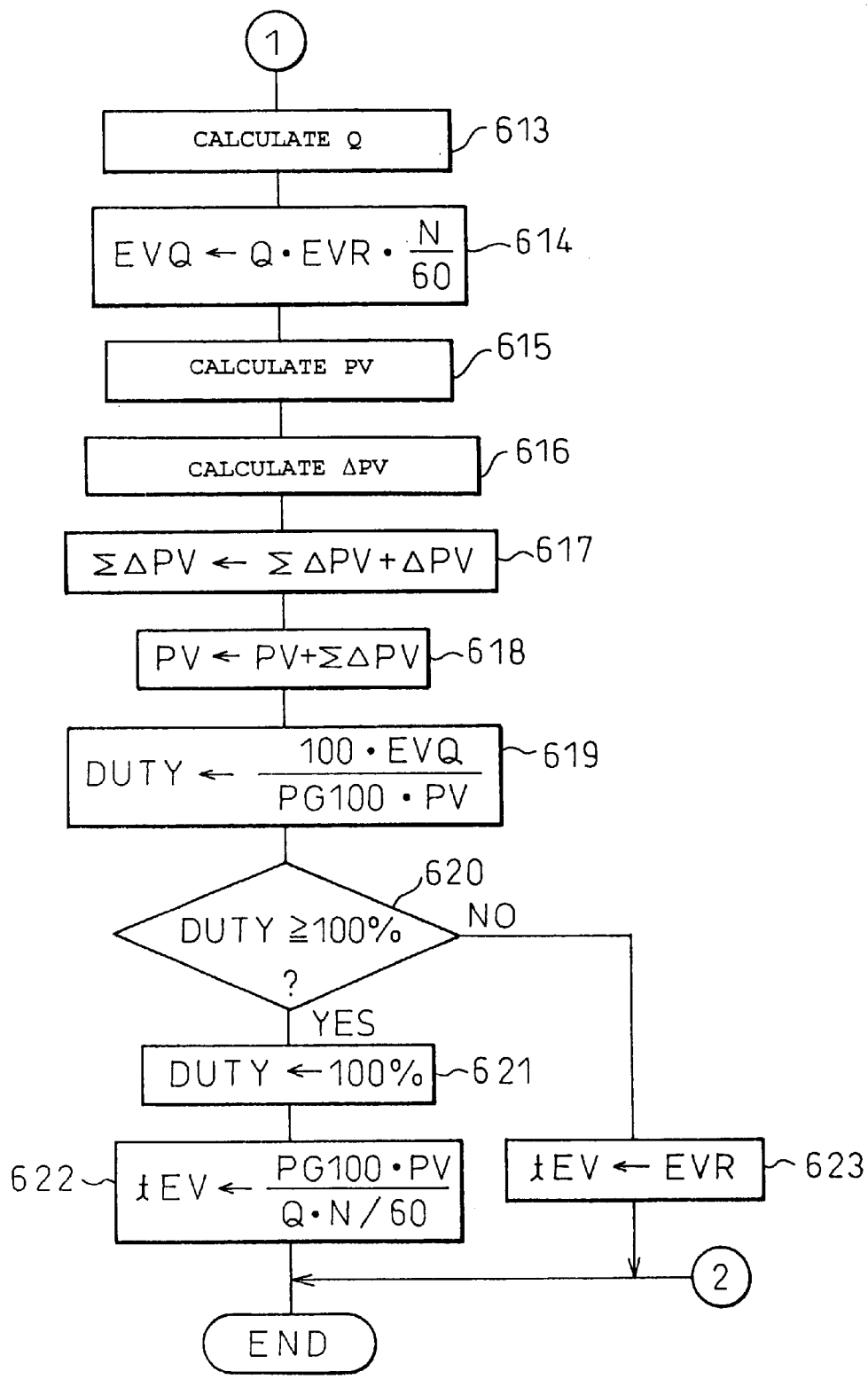

That is, referring to FIG. 24 and FIG. 25, first, at step 600, it is judged if the purge conditions have been established. For example, when the engine coolant water temperature is at least 80° C. and 30 seconds have elapsed after engine startup, it is judged that the purge conditions have been established. When the purge conditions have been established, the routine proceeds to step 601, where it is judged if the feed of fuel has been stopped. When the feed of fuel has not been stopped, the routine proceeds to step 602.

At step 602, the full open purge gas flow ratio PG100 is calculated from the relation shown in FIG. 9 based on the atmospheric pressure PA detected by the atmospheric pressure sensor 33 and the absolute pressure PM detected by the pressure sensor 30. Next, at step 603, the amount of flow of purge gas PG per unit time is calculated from the following formula using the current duty ratio DUTY:

$$PG=PG100 \cdot DUTY/100$$

Next, at step 604, the amount of flow of purge gas PG is added to the cumulative value ΣPG of the amount of flow of purge gas. Next, at step 605, the target fuel vapor rate rEVR is calculated from the relation shown in FIG. 8 based on the cumulative value ΣPG of the amount of flow of purge gas. Next, at step 606, the target fuel vapor rate tEVR is calculated from the relation shown in FIG. 7. Next, at step 607, the smaller of rEVR and tEVR is made the maximum permissible value MAX of the target fuel vapor rate.

Next, at step 608, it is judged if the amount of torque fluctuation SM is larger than a predetermined amount of fluctuation $SM_0$. When $SM \leq SM_0$, the routine proceeds to step 609, where a predetermined value ΔE1 is added to the target fuel vapor rate EVR. As opposed to this, when $SM>SM_0$, the routine proceeds to step 610, where a predetermined value ΔE2 is subtracted from the target fuel vapor rate EVR. Next, at step 611, it is judged if the target fuel vapor rate EVR is larger than the maximum permissible value MAX. When EVR≧MAX, the routine proceeds to step 612, where the maximum permissible value MAX is made the target fuel vapor rate EVR.

Next, at step 613, the basic amount of injection Q is calculated from the maps shown in FIGS. 3A and 3B. As explained above, this basic amount of injection Q is equal to Q2 in the region of $L<L_1$ in FIG. 2, is the sum of Q1 and Q2 in the region of $L_1 \leq L<L_2$, and is equal to Q1 in the region of $L \geq L_2$. Next, at step 614, the basic amount of injection Q, the target fuel vapor rate EVR, and the engine speed N are used to calculate the amount of fuel vapor EVQ to be purged per unit time from the following formula:

$$EVQ=Q \cdot EVR \cdot N/60$$

Next, at step 615, the concentration of fuel vapor PV is calculated from the relation shown in FIG. 23A. Next, at step 616, the increase ΔPV of the concentration of fuel vapor is calculated from the relation shown in FIG. 23B. Next, at step 617, the increase ΔPV is added to the cumulative value ΣΔPV of the increase of the concentration of fuel vapor. Next, at step 618, the cumulative value ΣΔPV is added to the concentration of fuel vapor PV. The result of the addition is made the final concentration of fuel vapor PV.

Next, at step 619, the duty ratio DUTY is calculated from the following formula using the concentration of fuel vapor PV:

$$DUTY=100 \cdot EVQ/(PG100 \cdot PV)$$

Next, at step 620, it is judged if the duty ratio DUTY is more than 100%. When DUTY<100%, the routine proceeds to step 623, where EVR is made the final target fuel vapor rate tEV. As opposed to this, when DUTY≧100%, the routine proceeds to step 621, where the duty ratio DUTY is made 100%, then the routine proceeds to step 622, where the final target fuel vapor rate tEV is calculated based on the following formula:

$$tEV=PG100 \cdot PV/(Q \cdot N)/60)$$

On the other hand, when it is judged at step 600 that the purge conditions are not established or when it is judged at step 601 that the feed of fuel has stopped, the routine proceeds to step 624, where the duty ratio DUTY is made zero, then at step 625 the final target fuel vapor rate tEV is made zero. At this time, the purge action is stopped.

Next, an explanation will be given of a modification of the first embodiment shown in FIG. 1 to FIG. 15 while referring to FIG. 26 to FIG. 33. Note that in FIG. 26 the same reference numerals are assigned to components the same as the components shown in FIG. 1.

Figure 26:
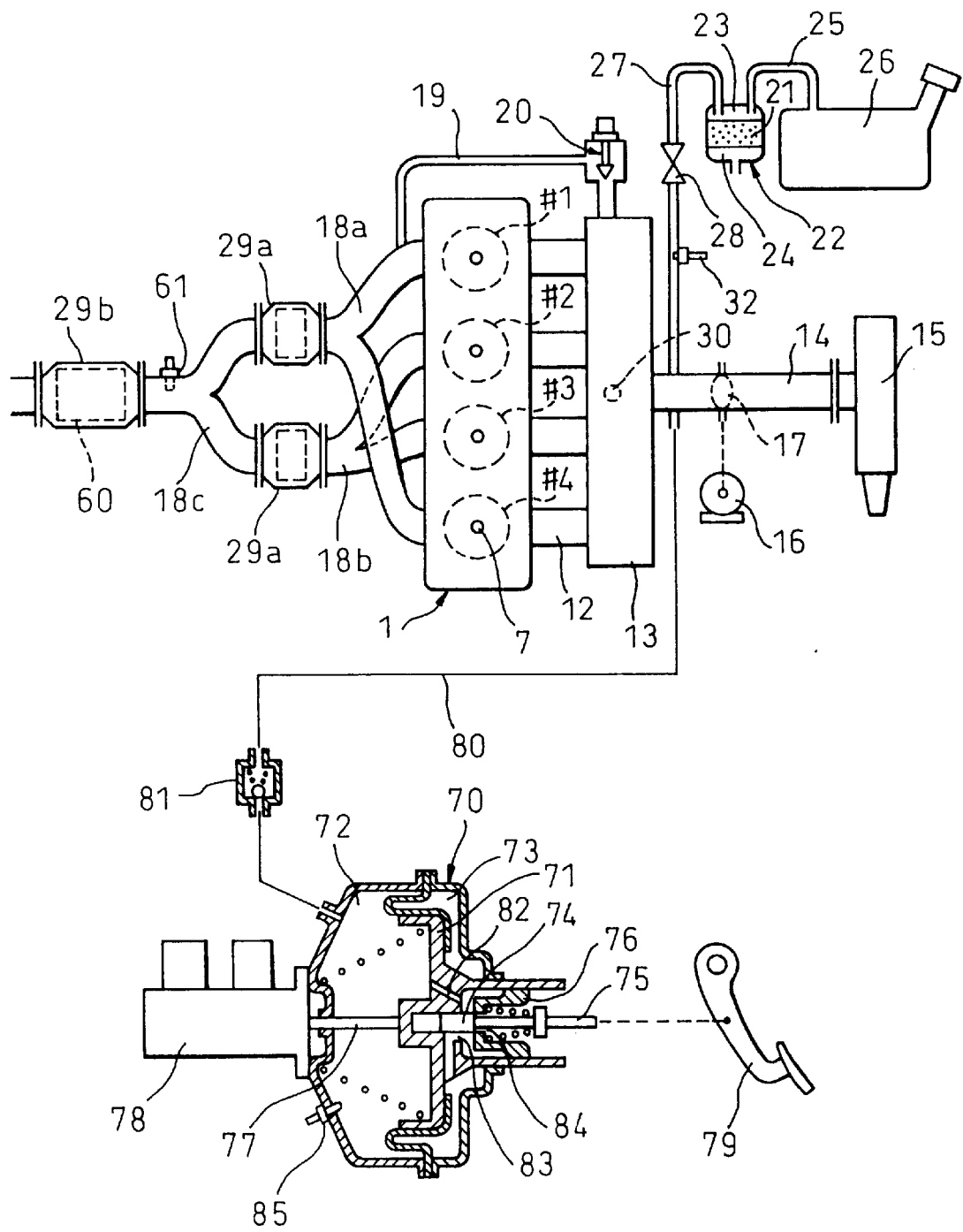
FIG. 26 is an overall view of a modification of an internal combustion engine.

Referring to FIG. 26, the internal combustion engine is comprised of a four-cylinder internal combustion engine provided with a no. 1 cylinder #1, no. 2 cylinder #2, no. 3 cylinder #3, and no. 4 cylinder #4. The firing order in this internal combustion engine is 1-3-4-2. In this modification, the two cylinders of every other position in the firing order, for example, the no. 1 cylinder #1 and the no. 4 cylinder #4, are connected to a common first exhaust manifold 18a. The remaining no. 2 cylinder #2 and no. 4 cylinder #4 of every other position in the firing order are connected to a common second exhaust manifold 18b. Each of the exhaust manifolds 18a and 18b is connected to a catalytic converter 29a housing a three-way catalyst or oxidation catalyst. The outlet of each catalytic converter 29a is connected to the inlet of a catalytic converter 29b. The catalytic converter 29b has arranged inside it a NOx absorbing and storing type catalyst (hereinafter referred to as a "NOx absorbent") 60. An air-fuel ratio sensor 61 is arranged at the head of the exhaust tubes 18c.

As shown in FIG. 26, in this modification, the conduit 27 of the canister is connected to the inside of the intake duct 14 downstream of the throttle valve 17. Further, the negative pressure generated in the intake duct 14 downstream of the throttle valve 17 is led to a brake booster.

The brake booster 70 is provided with a power piston 71, a first chamber 72 and second chamber 72 formed at the two sides of the power piston 71, an operating rod 75 provided with a plunger 74, and an operating valve 76. A push rod 77 is affixed to the power piston 71. A master cylinder 78 generating a brake pressure is driven by this push rod 77. Further, the operating rod 75 is connected to a brake pedal 79. The first chamber 72 is connected through a negative pressure conduit 80 to the intake duct 14 downstream of the throttle valve 17. Inside the negative pressure conduit 80 is arranged a check valve 81 able to communicate only from the first chamber 72 to the intake duct 14. When a negative pressure larger than the negative pressure in the first chamber 72 is generated inside the intake duct 14 downstream of the throttle valve 17, the check valve 81 opens, so the negative pressure in the first chamber 72 is maintained at the maximum negative pressure generated in the intake duct 14.

As shown in FIG. 26, when the brake pedal 79 is released, the first chamber 72 and the second chamber 73 are communicated with each other through a pair of communication paths 82 and 83. Therefore, the same negative pressure is generated in the first chamber 72 and the second chamber 73. Next, when the brake pedal 79 is depressed, the operating valve 76 moves to the left together with the operating rod 75. As a result, the communication path 82 is shut by the operating valve 76 and the plunger 74 moves away from the operating valve 76, so the second chamber 73 is opened to the atmosphere through the atmospheric communication path 84, whereby the second chamber 73 becomes the atmospheric pressure. Therefore, a pressure difference is generated between the first chamber 72 and the second chamber 73 and the power piston 71 is made to move to the left by the pressure difference.

On the other hand, when the brake pedal 79 is released, the atmospheric communication path 84 is closed by the plunger 74 and the communication paths 82 and 83 are opened, so the negative pressure in the first chamber 72 is led through the communication paths 82 and 83 to the second chamber 73. As a result, the negative pressure inside the second chamber 73 becomes the same as the negative pressure inside the first chamber 72 again. Note that as shown in FIG. 26, a pressure sensor 85 is arranged in the first chamber 72 for detecting the absolute pressure in the first chamber 72.

In the modification shown in FIG. 26 as well, normally the amount of torque fluctuation is calculated by the routine shown in FIG. 12, the purge action is controlled by the routine shown in FIG. 13 and FIG. 14, and the injection is controlled by the routine shown in FIG. 15. In this modification however, in addition to these controls, the release of NOx and SOx from the NOx absorbent 60 is controlled and the negative pressure inside the first chamber 72 of the brake booster 70 is controlled. Therefore, first, an explanation will be made of the control of the release of NOx from the NOx absorbent.

The NOx absorbent 60 contained in the catalytic converter 29b is for example comprised of a carrier of alumina on which are carried for example at least one element selected from the group of alkali metals such as potassium K, sodium Na, lithium Li, and cesium Cs, alkali earths such as barium Ba and calcium Ca, and rare earths such as lanthanum La and yttrium Y and a precious metal such as platinum Pt. If the ratio of the air and fuel (hydrocarbons) supplied into the engine intake passage, combustion chamber 3, and exhaust passage upstream of the $NO_x$ absorbent 60 is defined as the air-fuel ratio of the exhaust gas flowing into the NOx absorbent 60, the NOx absorbent 60 absorbs the NOx when the air-fuel ratio of the inflowing exhaust gas is lean and releases the absorbed NOx when air-fuel ratio of the inflowing exhaust gas becomes the stoichiometric air-fuel ratio or rich, that is, performs an NOx absorbing and releasing action. Note that when the fuel or air is not supplied in the exhaust passage upstream of the NOx absorbent 60, the air-fuel ratio of the inflowing exhaust gas matches with the air-fuel ratio in the combustion chamber 5 and therefore in this case the NOx absorbent 60 absorbs the NOx when the air-fuel ratio in the combustion chamber 5 is lean and releases the absorbed NOx when the air-fuel ratio in the combustion chamber 5 becomes the stoichiometric air-fuel ratio or rich.

Figure 27A:
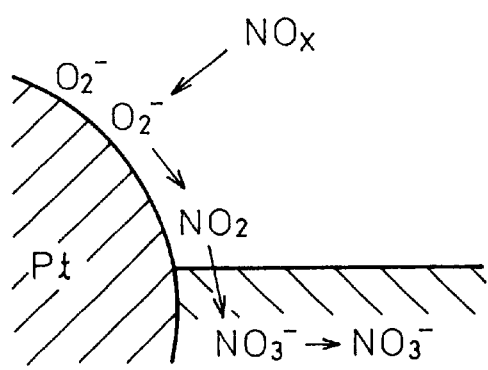
FIG. 27A and FIG. 27B are views for explaining an NOx absorption and release action.
Figure 27B:
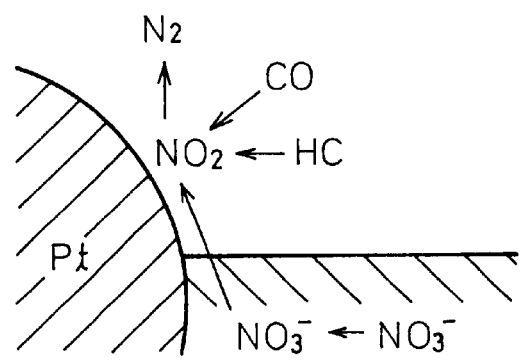

By placing the above NOx absorbent 60 in the engine exhaust passage, the NOx absorbent 60 does in actuality act to absorb and release NOx, but there are parts of the detailed mechanism of this absorbing and releasing action which are not clear. This absorbing and releasing action, however, is thought to be due to the mechanism as shown in FIGS. 27A and 27B. This mechanism will be explained next taking as an example the case of carrying platinum Pt and barium Ba on the carrier, but the same mechanism works when using other precious metals, alkali metals, alkali earths, and rare earths.

In the internal combustion engine shown in FIG. 26, the combustion is normally performed in a state of a lean air-fuel ratio in the combustion chamber 5. When performing combustion in the state of a lean air-fuel ratio in this way, the concentration of oxygen in the exhaust gas is high. Therefore, at this time, as shown in FIG. 27A, the oxygen $O_2$ is deposited on the surface of the platinum Pt in the form of $O_2^-$ or $O^{2-}$. On the other hand, the NO in the inflowing exhaust gas reacts with the $O_2^-$ or $O^{2-}$ on the surface of the platinum Pt to become $NO_2$ ($2NO+O_2 \rightarrow 2NO_2$). Next, part of the produced $NO_2$ is oxidized on the platinum Pt and absorbed in the absorbent where it is bonded with the barium oxide BaO and dispersed in the absorbent in the form of nitrate ions $NO_3^-$ as shown in FIG. 27A. In this way, the NOx is absorbed in the NOx absorbent 60. $NO_2$ is produced on the surface of the platinum Pt so long as the concentration of oxygen in the inflowing exhaust gas is high. $NO_2$ is absorbed in the absorbent and nitrate ions $NO_3^-$ are produced so long as the ability of the absorbent to absorb NOx does not become saturated.

On the other hand, when the air-fuel ratio of the inflowing exhaust gas becomes rich, the concentration of oxygen in the inflowing exhaust gas falls and the amount of $NO_2$ produced on the surface of the platinum Pt drops. When the amount of production of $NO_2$ drops, the reaction proceeds in the reverse direction ($NO_3^- \rightarrow NO_2$) and therefore nitrate ions $NO_3^-$ in the absorbent are released from the absorbent in the form of $NO_2$. The NOx released from the NOx absorbent 60 at this time is reduced by reaction with the large amount of unburned hydrocarbons and Co contained in the inflowing exhaust gas as shown in FIG. 27B. In this way, when there is no longer any $NO_2$ on the surface of the platinum Pt, the $No_2$ is successively released from the absorbent. Therefore, when the air-fuel ratio of the inflowing exhaust gas becomes rich, NOx is released from the NOx absorbent 60 in a short time period. Further, the released NOx is reduced. Therefore, NOx is not discharged into the atmosphere.

Note that in this case, even if the air-fuel ratio of the inflowing exhaust gas is made the stoichiometric air-fuel ratio, NOx is released from the NOx absorbent 60. When making the air-fuel ratio of the inflowing exhaust gas the stoichiometric air-fuel ratio, however, the NOx is only gradually released from the NOx absorbent 60, so somewhat of a long time is required to release all of the NOx absorbed in the NOx absorbent 60.

However, there is a limit to the ability of the NOx absorbent 60 to absorb NOx. It is necessary to release the NOx from the NOx absorbent 60 before the NOx absorbent 60 reaches the limit of its capacity to absorb NOx. Therefore, it is necessary to estimate what degree of NOx has been absorbed in the NOx absorbent 60. Therefore, in this modification, the amount of NOx absorption NA per unit time when combustion is being performed under a lean air-fuel ratio is found in advance in the form of the map shown in FIG. 28A as a function of the requested load L and the engine speed N, the amount of NOx release NB per unit time when combustion is being performed under the stoichiometric air-fuel ratio or a rich air-fuel ratio is found in advance in the form of the map shown in FIG. 28B, and these amounts of NOx absorption NA per unit time are cumulatively added or the amounts of NOxcrelease NB per unit time are subtracted so as to estimate the amount of NOx absorption ΣNOX in the NOx absorbent 60. In this modification, NOx is made to be released from the NOx absorbent 60 when the amount of NOx absorption ΣNOX exceeds a predetermined maximum permissible value Nmax.

Note that the exhaust gas includes SOx. The NOx absorbent 60 absorbs not only NOx, but also SOx. The mechanism of absorption of SOx in the NOx absorbent 60 is believed to be similar to the mechanism of absorption of NOx.

That is, in the same way as with the explanation of the mechanism of absorption of NOx, taking as an example the case of carrying platinum Pt and barium Ba on the carrier, when the air-fuel ratio of the inflowing exhaust gas is lean, oxygen $O_2$ is deposited on the surface of the platinum Pt in the form of $O_2^-$ or $O^{2-}$, the $SO_2$ in the inflowing exhaust gas reacts with the $O_2^-$ or $O^{2-}$ on the surface of the platinum Pt to become $SO_3$. Next, part of the produced $SO_3$ is oxidized on the platinum Pt and absorbed in the absorbent where it is bonded with the barium oxide BaO and dispersed in the absorbent in the form of sulfate ions $SO_4^{2-}$ to produce the stable sulfate $BaSO_4$.

This sulfate $BaSO_4$ however is stable and hard to decompose. Even if the air-fuel ratio of the inflowing exhaust gas is made rich, the sulfate $BaSO_4$ will remain as it is without breaking down. Therefore, the sulfate $BaSO_4$ in the NOx absorbent 60 increases along with the elapse of time. Accordingly, along with the elapse of time, the amount of NOx which can be absorbed by the NOx absorbent 60 falls. Therefore, it is necessary to release the SOx from the NOx absorbent 60 when the amount of SOx absorbed in the NOx absorbent 60 increases.

Figure 29A:
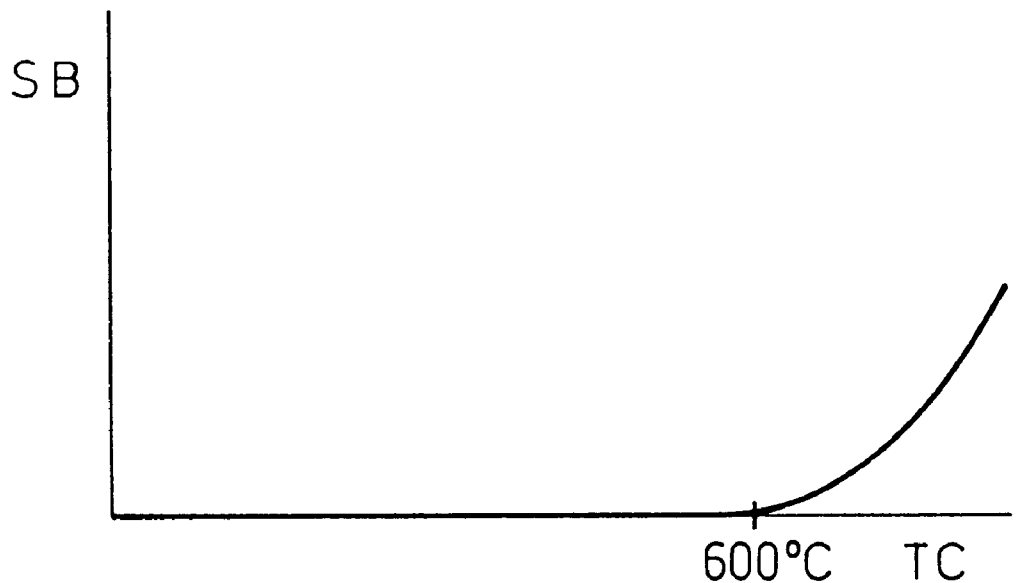
FIG. 29A and FIG. 29B are views of an amount of SOx release SB per unit time etc.

When the temperature of the NOx absorbent 60 becomes high, however, for example, when the temperature of the NOx absorbent 60 reaches over 600° C., the sulfate $BaSO_4$ breaks down. If the air-fuel ratio of the inflowing exhaust gas is made rich at this time, the SOx will be released from the NOx absorbent 60. The amount of SOx release SB per unit time at this time increases the higher the temperature TC of the NOx absorbent 60 as shown in FIG. 29A. Therefore, in this modification, when the amount of SOx absorption ΣSOx exceeds the predetermined maximum permissible value Smax, the temperature of the NOx absorbent 60 is made to rise to over 600° C. and the air-fuel ratio of the inflowing exhaust gas is made rich, whereby SOx is made to be released from the NOx absorbent 60.

On the other hand, as explained above, the brake pressure is increased by the pressure difference between the pressure in the first chamber 72 and the pressure in the second chamber 73 of the brake booster 70, that is, by the pressure difference (PA–PB) of the atmospheric pressure PA and the absolute pressure PB of the first chamber 72. Therefore, to secure a sufficient brake pressure, it becomes necessary to maintain this pressure difference (PA–PB) at least at a certain pressure difference ΔPmin. Therefore, in this modification, when the pressure difference (PA–PB) becomes smaller than the certain pressure difference ΔPmin, the opening degree of the throttle valve 17 is made smaller to increase the negative pressure in the intake duct 14 downstream of the throttle valve 17 and thereby increase the pressure difference (PA–PB). Note that in actuality, when the opening degree of the throttle valve 17 is made smaller, the air-fuel ratio is made the stoichiometric air-fuel ratio. Therefore, the opening degree of the throttle valve 17 is made smaller when the air-fuel ratio becomes lean.

Next, the routine for control of engine operation will be explained with reference to FIG. 30.

Figure 28A:
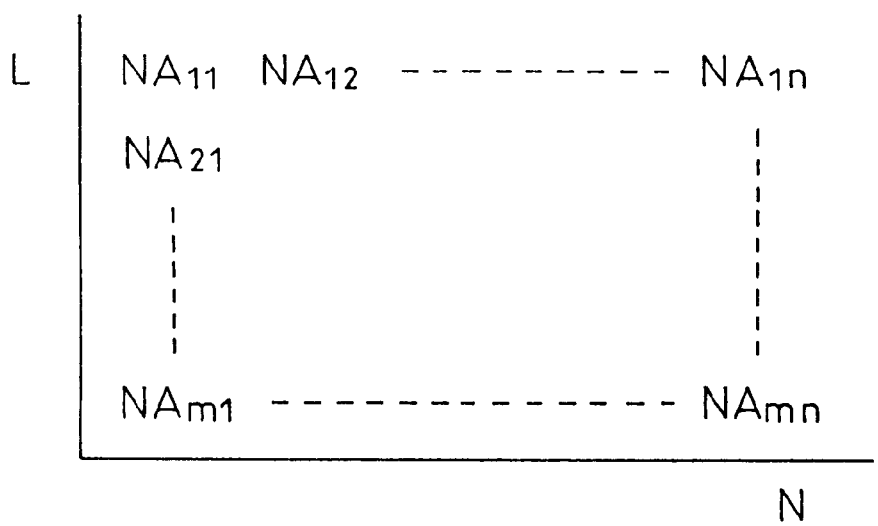
FIG. 28A and FIG. 28B are views of an amount of NOx absorption NA and an amount of NOx release NB per unit time.
Figure 28B:
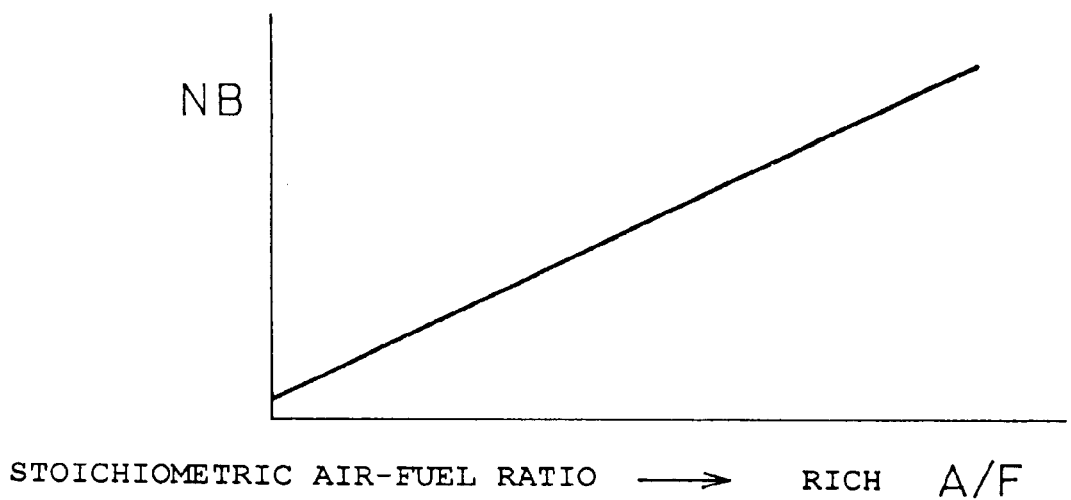
Figure 30:
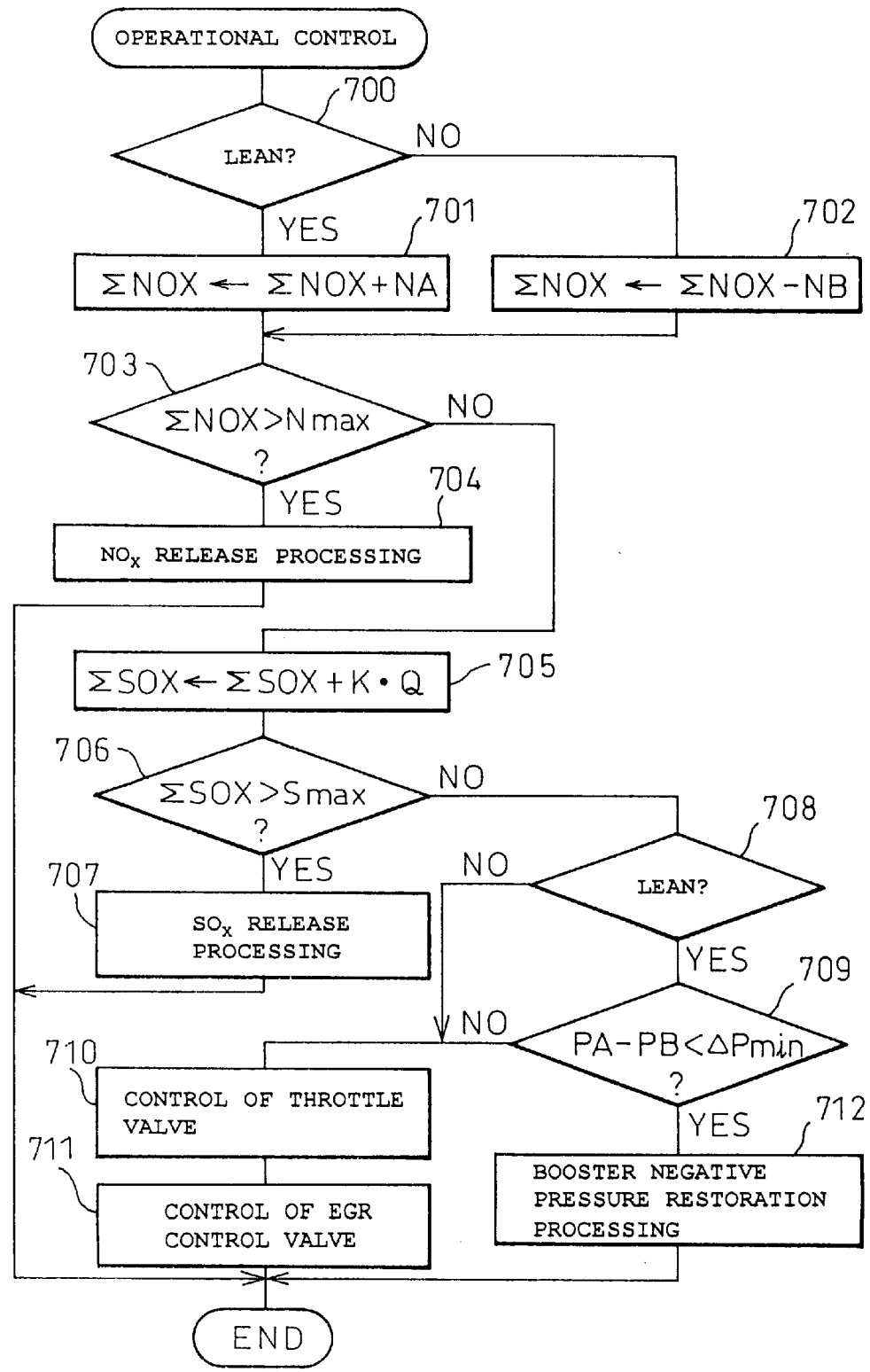
FIG. 30 is a flow chart for control of the operation of an engine.

Referring to FIG. 30, first, at step 700, it is judged if the air-fuel ratio is lean. When the air-fuel ratio is lean, the routine proceeds to step 701, where the amount of NOx absorption NA per unit time calculated from the map shown in FIG. 28A is added to the amount of NOx absorption ΣNOX, then the routine proceeds to step 703. As opposed to this, when the air-fuel ratio is the stoichiometric air-fuel ratio or rich, the routine proceeds to step 702, the amount of NOx release NB per unit time calculated from the relation shown in FIG. 28B is subtracted from the amount of NOx ΣNOX, then the routine proceeds to step 703. At step 703, it is judged if the amount of NOx ΣNOX has exceeded the maximum permissible value Nmax. When ΣNOX≦Nmax, the routine proceeds to step 705.

The fuel contains a certain percentage of sulfur. Therefore, the amount of SOx absorbed in the NOx absorbent 60 is proportional to the amount of injection Q. Therefore, at step 705, the product K·Q of the amount of injection Q and a constant K is added to the amount of SOx absorption ΣSOX. Next, at step 706, it is judged if the amount of SOx absorption ΣSOX has exceeded the maximum permissible value Smax. When ΣSOX≦Smax, the routine proceeds to step 708.

At step 708, it is judged if the air-fuel ratio is lean. When the air-fuel ratio is lean, the routine proceeds to step 709, where it is judged if the pressure difference (PA–PB) between the atmospheric pressure PA detected by the atmospheric pressure sensor 33 (FIG. 1) and the absolute pressure PB in the first chamber 72 detected by the pressure sensor 85 (FIG. 26) is smaller than a certain pressure difference ΔPmin. When it is judged at step 708 that the air-fuel ratio is not lean or when it is judged at step 709 that PA–PB≧ΔPmin, the routine proceeds to step 710, where the opening degree of the throttle valve 17 is made the opening degree in accordance with the operating state of the engine, then at step 711, the opening degree of the EGR control valve 20 is made the opening degree in accordance with the operating state of the engine. At this time, the fuel vapor rate is made the target fuel vapor rate tEVR shown in FIG. 7.

Figure 31:
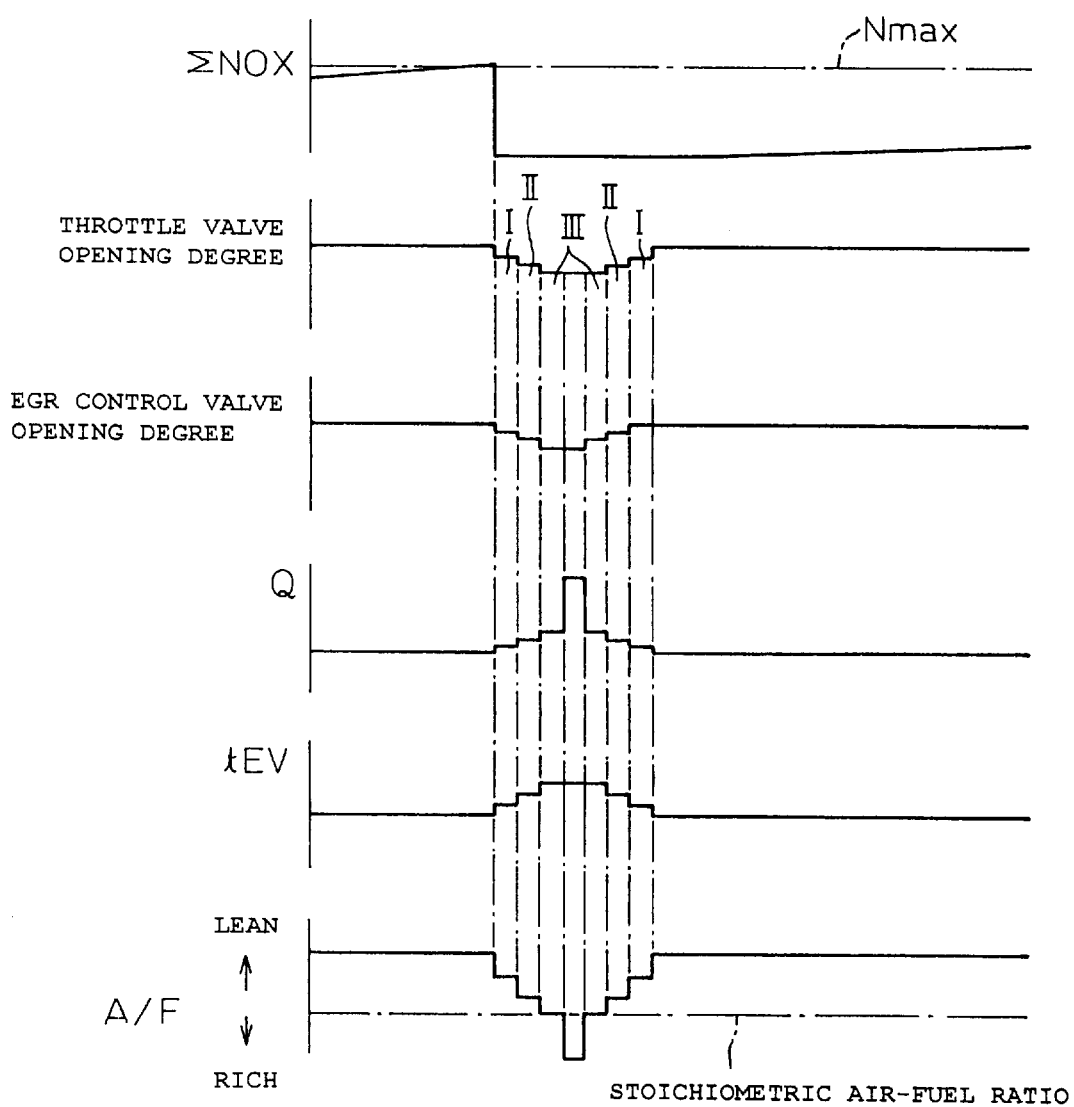
FIG. 31 is a time chart of NOx release control.
Figure 32:
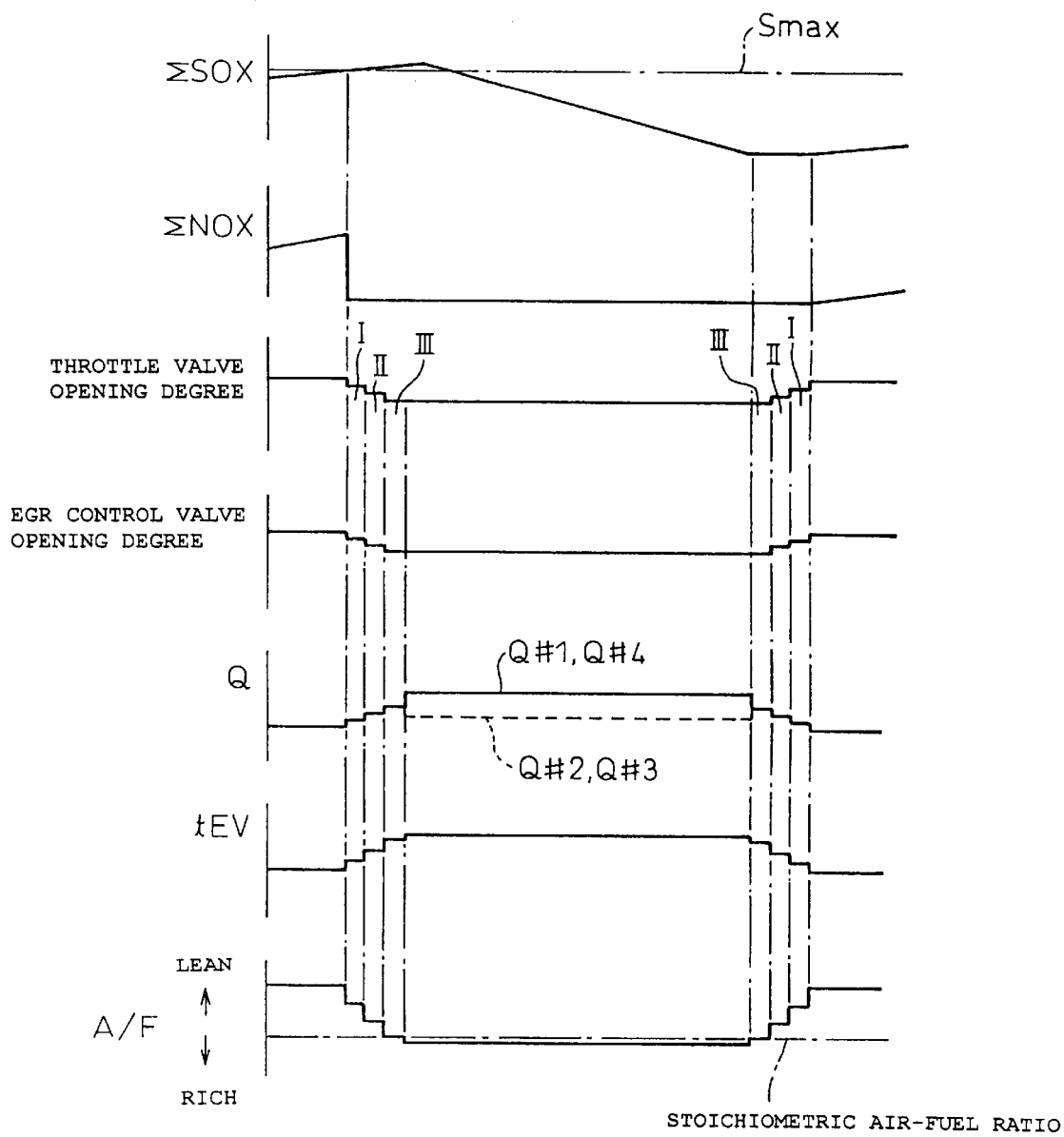
FIG. 32 is a time chart of SOx release control.

On the other hand, when it is judged at step 703 that ΣNOX>Nmax, the routine proceeds to step 704, where processing is performed to release NOx from the NOx absorbent 60. This NOx release processing is shown in FIG. 31. On the other hand, when it is judged at step 706 that ΣSOX>Smax, the routine proceeds to step 707, where processing for release of SOx from the NOx absorbent 60 is performed. This SOx release processing is shown in FIG. 32. On the other hand, when it is judged at step 709 that PA–PB<ΔPmin, the routine proceeds to step 712, where processing is performed to restore the negative pressure of the brake booster 70. This negative pressure restoration processing is shown in FIG. 33.

Figure 33:
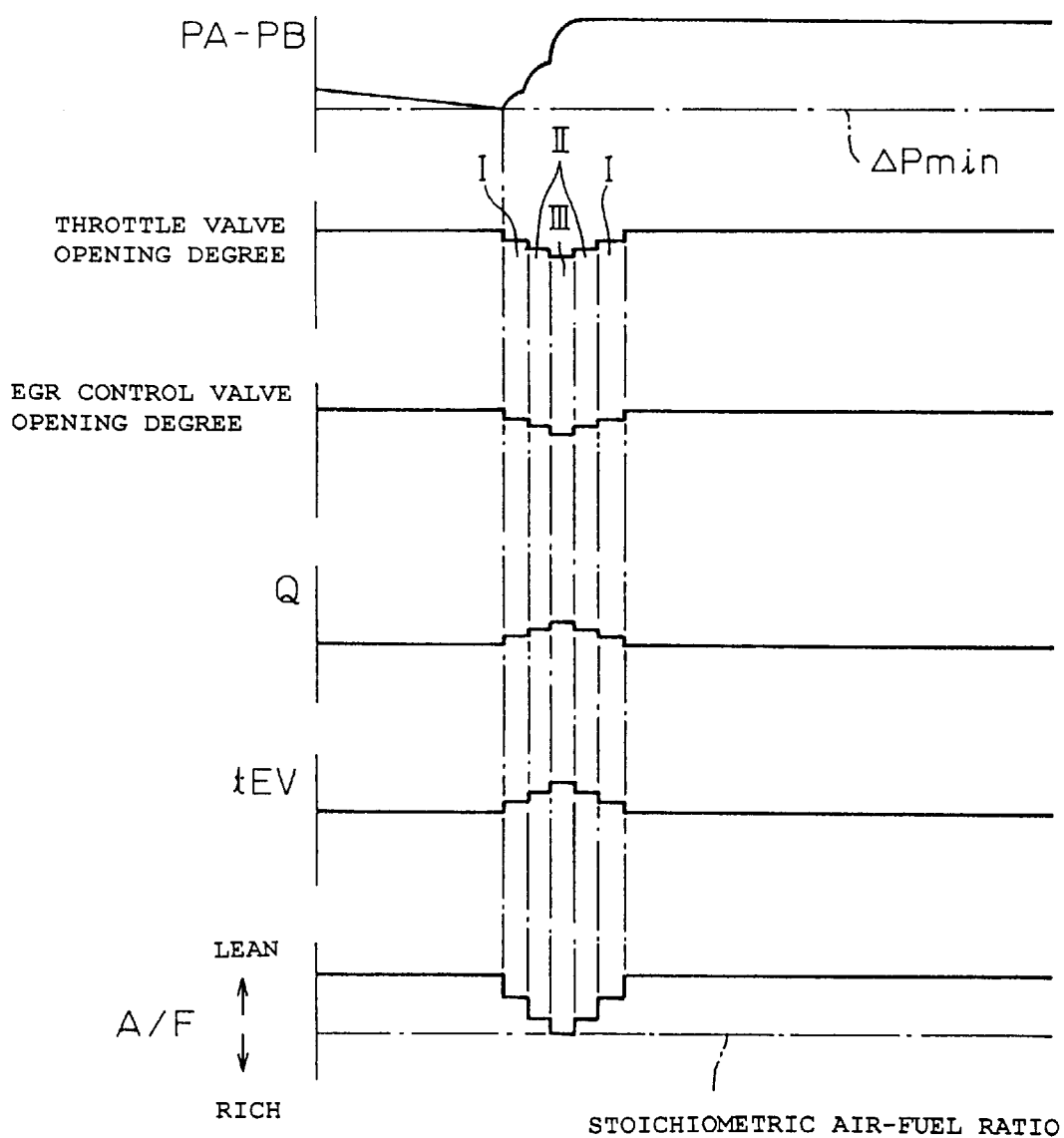
FIG. 33 is a time chart of negative pressure restoration processing of a brake booster.

FIG. 31, FIG. 32, and FIG. 33 respectively show the case of performing NOx release processing, SOx release processing, and negative pressure restoration processing when fuel injection Q2 is performed only at the end of the compression stroke. Note that in FIG. 31, FIG. 32, and FIG.

33, I shows the two-injection operating state where fuel injections Q1 and Q2 are performed divided in two periods of the start of the suction stroke and the end of the compression stroke, II shows a lean air-fuel ratio homogeneous air-fuel mixture operating state where fuel injection Q1 is performed only at the start of the suction stroke and the air-fuel ratio is made lean, and III shows the stoichiometric air-fuel ratio homogeneous air-fuel mixture operating state where fuel injection Q1 is performed only at the start of the suction stroke and the air-fuel ratio is made the stoichiometric air-fuel ratio.

First, an explanation will be given of the control for release of NOx while referring to FIG. 31.

As shown in FIG. 31, when $\Sigma NOX > Nmax$, the operating state successively is changed to the two-injection operating state I, the lean air-fuel ratio homogeneous air-fuel mixture operating state II, and the stoichiometric air-fuel ratio homogeneous air-fuel mixture operating state III, then successively changed to the lean air-fuel ratio homogeneous air-fuel mixture operating state II, the two-injection operating state I, and the initial combustion state. To perform combustion by the two fuel injections Q1 and Q2, it is necessary to make the air-fuel ratio smaller compared with when performing combustion by a single fuel injection Q2 at the end of the compression stroke and therefore necessary to reduce the amount of intake air. Therefore, when control is started for release of NOx, the opening degree of the throttle valve 17 is made to be reduced. Further, at this time, the opening degree of the EGR control valve 20 is made to be reduced so that the EGR rate becomes the target EGR rate.

Similarly, to perform combustion by a homogeneous air-fuel mixture of a lean air-fuel ratio, it is necessary to make the air-fuel ratio smaller than when performing combustion by two fuel injections Q1 and Q2. Therefore, when switching from the two-injection operating state I to the lean air-fuel ratio homogeneous air-fuel mixture operating state II, the opening degree of the throttle valve 17 is made to be further reduced. Further, to perform combustion by a homogeneous air-fuel mixture of the stoichiometric air-fuel ratio, it is necessary to reduce the air-fuel ratio compared with when performing combustion by a homogeneous air-fuel mixture of a lean air-fuel ratio. Therefore, when switching from the lean air-fuel ratio homogeneous air-fuel mixture operating state II to the stoichiometric air-fuel ratio homogeneous air-fuel mixture operating state III, the opening degree of the throttle valve 17 is made to be further reduced.

On the other hand, when the opening degree of the throttle valve 17 is made to be reduced in this way, the pumping loss increases, so the engine output falls. Therefore, to prevent the engine output from falling in this way, the total amount of injection Q is made to gradually increase along with the reduction of the opening degree of the throttle valve 17.

On the other hand, when the total amount of injection Q is made to increase, the final target fuel vapor rate tEV is also made to gradually increase to secure a good ignition by the spark plug 7. That is, when performing processing for release of NOx as shown in FIG. 31, the final target fuel vapor rate tEV is first made to gradually rise, then is made to gradually fall.

When the processing for release of NOx is started and the operating state becomes the stoichiometric air-fuel ratio homogeneous air-fuel mixture operating state III, the amount of injection Q is made to temporarily increase, whereby the air-fuel ratio A/F is temporarily made rich. At this time, NOx is released from the NOx absorbent 60. Note that it is also possible to make the target fuel vapor rate tEV temporarily increase when the amount of injection Q is made to temporarily increase. As shown in FIG. 31, when the processing for release of NOx is started, the amount of NOx absorption $\Sigma NOX$ is made zero.

Note that when performing two injections Q1 and Q2 and $\Sigma NOX > Nmax$, the operating state is switched to the lean air-fuel ratio homogeneous air-fuel mixture operating state II, while when a homogeneous air-fuel mixture of a lean air-fuel ratio is made to burn and $\Sigma NOX > Nmax$, the operating state is switched to the stoichiometric air-fuel ratio homogeneous air-fuel mixture operating state III.

Next, an explanation will be given of the control for release of SOx while referring to FIG. 32.

As shown in FIG. 32, when $\Sigma SOX > Smax$, in this case as well, the operating state is successively switched to the two-injection operating state I, the lean air-fuel ratio homogeneous air-fuel mixture operating state II, and the stoichiometric air-fuel ratio homogeneous air-fuel mixture operating state III. At this time, in the same way as in the case of processing for release of NOx, the opening degree of the throttle valve 17 is made to be gradually reduced, the opening degree of the EGR control valve 20 is made to be gradually reduced, the total amount of injection Q is made to gradually increase, and the target fuel vapor rate tEV is made to gradually increase.

Next, the amounts of injection Q#1 and Q#4 to the no. 1 cylinder #2 and the no. 4 cylinder #4 (shown by the solid lines in FIG. 32) are made to increase and the amounts of injection Q#2 and Q#3 to the no. 2 cylinder #2 and no. 3 cylinder #3 (shown by broken lines in FIG. 32) are made to decrease so that the air-fuel ratios of two cylinders of every other position in the firing order, for example, the no. 1 cylinder #1 and the no. 4 cylinder #4, become rich, the air-fuel ratios of the remaining no. 2 cylinder #2 and no. 3 cylinder #3 of every other position in the firing order become lean, and the mean air-fuel ratio of the exhaust gas flowing into the NOx absorbent 60 becomes rich.

That is, specifically speaking, first, the total amount of injection Q for making the air-fuel ratio of the exhaust gas flowing into the NOx absorbent 60 the target rich air-fuel ratio is calculated. Next, the target fuel vapor rate tEV for that amount of injection Q is calculated. The mean value Qm of the total amount of injection is calculated based on this target fuel vapor rate tEV:

$$Qm = Q \cdot (1 - tEV)$$

Next, the amounts of injection Q#1 and Q#4 of the no. 1 cylinder #1 and the no. 4 cylinder #4 and the amounts of injection Q#2 and Q#3 of the no. 2 cylinder #2 and the no. 3 cylinder #3 are calculated based on the following formulas:

$$Q\#1 = Q\#4 = FAF \cdot (Qm + \alpha)$$

$$Q\#2 = Q\#3 = FAF \cdot (Qm + \alpha)$$

Here, FAF shows a feedback correction coefficient controlled by an output signal of the air-fuel sensor 61 (FIG. 26), while a shows a predetermined setting.

That is, when it is judged based on the output signal of the air-fuel ratio sensor 61 that the air-fuel ratio of the exhaust gas flowing into the NOx absorbent 60 is larger than the target rich air-fuel ratio, the feedback correction coefficient FAF is made to increase, while when it is judged that the air-fuel ratio of the exhaust gas flowing into the NOx absorbent 60 is smaller than the target rich air-fuel ratio, the feedback correction coefficient FAF is made to decrease, whereby the air-fuel ratio of the exhaust gas flowing into the NOx absorbent 60 is controlled to the target air-fuel ratio. At this time, the air-fuel ratios in the no. 1 cylinder #1 and the no. 4 cylinder #4 become rich and the air-fuel ratios in the no. 2 cylinder #2 and the no. 3 cylinder #3 become lean.

When the air-fuel ratios in the no. 1 cylinder #1 and the no. 4 cylinder #4 are made rich and the air-fuel ratios in the no. 2 cylinder #2 and the no. 3 cylinder #3 are made lean in this way, exhaust gas containing a large amount of unburned hydrocarbons and CO is discharged in the first exhaust manifold 18b and exhaust gas containing a large amount of oxygen is discharged into the second exhaust manifold 18b. Next, the exhaust gas containing a large amount of unburned hydrocarbons and CO and the exhaust gas containing a large amount of oxygen flow into the NOx absorbent 60. In the NOx absorbent 60, the large amounts of unburned hydrocarbons and CO are made to oxidize by the large amount of oxygen. As a result, the temperature of the NOx absorbent 60 is made to rapidly rise by the heat of the oxidation reaction.

Figure 29B:
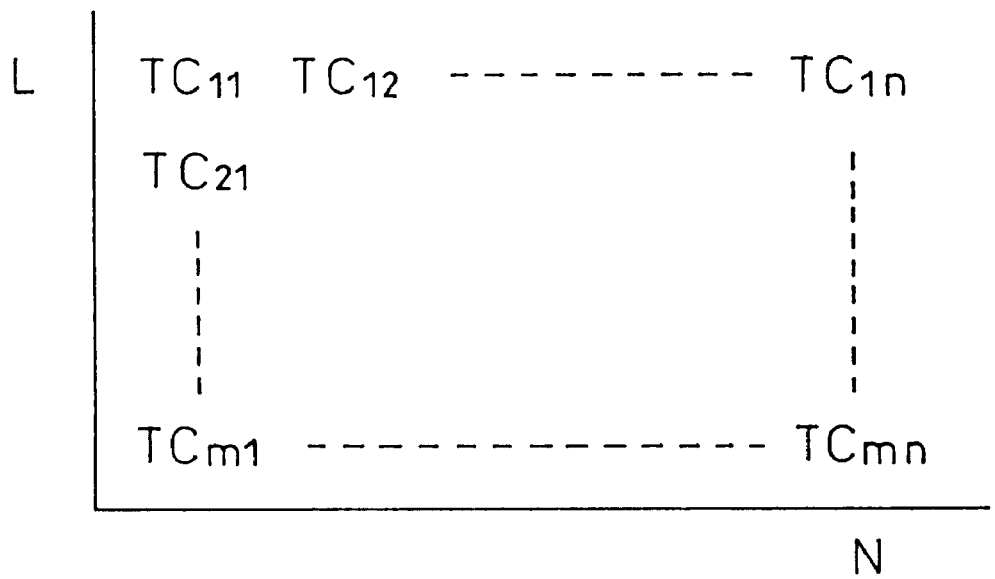

On the other hand, the air-fuel ratio of the exhaust gas flowing into the NOx absorbent 60 is maintained at the target rich air-fuel ratio. Therefore, when the temperature of the NOx absorbent 60 exceeds for example 600° C., the action for release of SOx from the NOx absorbent 60 is started. When the action for release of SOx is started, the amount of SOx release SB per unit time shown in FIG. 29A is successively subtracted from the amount of SOx absorption ΣSOx, therefore the amount of SOx absorption ΣSOx gradually declines. Note that as shown in FIG. 29A, the amount of SOx release SB per unit time is a function of the temperature TC of the NOx absorbent 60. This temperature TC is stored in advance in the ROM 42 in the form of a map as a function of the amount of depression L of the accelerator pedal 34 and the engine speed N as shown in FIG. 29B. On the other hand, as shown in FIG. 32, the amount of NOx absorption ΣNOX is made zero when the processing for release of SOx is started.

As shown in FIG. 32, when the amount of SOx absorption ΣSOx becomes zero, the state is switched to the stoichiometric air-fuel ratio homogeneous air-fuel mixture operating state III, then successively switched to the lean air-fuel ratio homogeneous air-fuel mixture operating state II, the two-injection operating state I, and the initial combustion state. At this time, in the same way as the case of processing for release of NOx, the opening degree of the throttle valve 17 is made to gradually increase, the opening degree of the EGR control valve 20 is also made to gradually increase, the total amount of injection Q is made to gradually decrease, and the target fuel vapor rate tEV is made to gradually decrease.

Note that when performing two injections Q1 and Q2 and ΣSOX>Smax, the operating state is switched to the lean air-fuel ratio homogeneous air-fuel mixture operating state II, when a homogeneous air-fuel mixture of a lean air-fuel ratio is being burned and ΣSOX>Smax, the operating state is switched to the stoichiometric air-fuel ratio homogeneous air-fuel mixture operating state III, and when a homogeneous air-fuel mixture of the stoichiometric air-fuel ratio or a rich air-fuel ratio is being burned and ΣSOX>Smax, as shown in FIG. 32, the amounts of injection Q#1 and Q#4 of the no. 1 cylinder #1 and the no. 4 cylinder #4 are made to increase and the amounts of injection Q#2 and Q#3 of the no. 2 cylinder #2 and no. 3 cylinder #3 are made to decrease.

Next, an explanation will be given of the processing for restoration of negative pressure of the brake booster 70 while referring to FIG. 33.

As shown in FIG. 33, when PA−PB<ΔPmin, the operating state is successively switched to the two-injection operating state I, the lean air-fuel ratio homogeneous air-fuel mixture operating state II, and the stoichiometric air-fuel ratio homogeneous air-fuel mixture operating state III. At this time, in the same way as the case of processing for release of NOx, the opening degree of the throttle valve 17 is made to gradually decrease, the opening degree of the EGR control valve 20 is also made to gradually decrease, the total amount of injection Q is made to gradually increase, and the target fuel vapor rate tEV is made to gradually increase.

When the opening degree of the throttle valve 17 and the opening degree of the EGR control valve 20 are made to decrease in this way, the absolute pressure in the intake duct 14 downstream of the throttle valve 17 becomes smaller and therefore the pressure difference PA−PB rapidly increases as shown in FIG. 33. That is, the absolute pressure in the brake booster 70 is made to rapidly fall.

As shown in FIG. 33, immediately after the operating state becomes the stoichiometric air-fuel ratio homogeneous air-fuel mixture operating state III, the operating state is switched to the lean air-fuel ratio homogeneous air-fuel mixture operating state II, then is successively switched to the two-injection operating state I and the initial combustion state. At this time as well, in the same way as the case of the processing for release of NOx, the opening degree of the throttle valve 17 is made to gradually increase, the opening degree of the EGR control valve 20 is also made to gradually increase, the total amount of injection Q is made to gradually decrease, and the target fuel vapor rate tEV is made to gradually decrease.

Next, an explanation will be given of a fifth embodiment designed for control of the amount of flow of purge gas PG so that the purge gas rate PGR (l/g) showing the ratio of the amount of flow of purge gas PG (l/sec) to the basic amount of injection per unit time (g/sec) becomes the target purge gas rate. In this embodiment, as the internal combustion engine, use is made of the internal combustion engine shown in FIG. 22. When controlling the amount of flow of purge gas PG, the relations shown in FIG. 23A and FIG. 23B are used.

When controlling the amount of flow of purge gas so that the purge gas rate PGR becomes the target purge gas rate in this way as well, it is possible to make the amount of purge gas increase in proportion to the amount of injection. That is, it is also possible to maintain the purge gas rate PGR continuously constant. When designed to form an air-fuel mixture in a limited region inside the combustion chamber 5, however, due to similar reasons as the reasons explained before with reference to FIGS. 6A and 6B, it is preferable to make the purge gas rate PGR higher the greater the basic amount of injection Q.

Therefore, in the fifth embodiment, the target purge gas rate tPGR (l/g) showing the ratio of the amount of flow of purge gas PG (l/sec) with respect to the basic amount of injection per unit time (g/sec) is made higher along with an increase of the basic amount of injection Q. That is, in FIG. 34, a, b, and c are in the relation of a<b<c. Therefore, as understood from FIG. 34, the target purge gas rate tPGR is made higher the greater the basic amount of injection Q.

Figure 34:
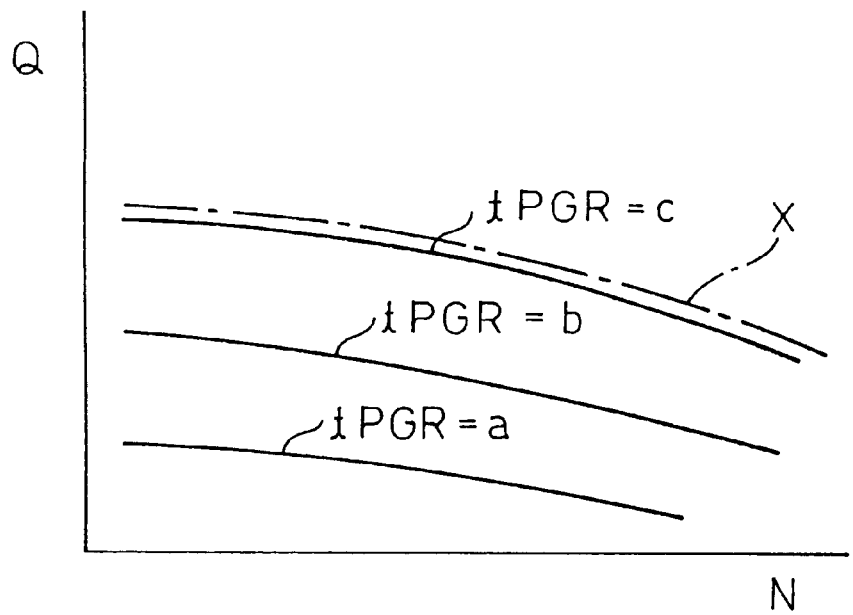
FIG. 34 is a view of a target purge gas rate tPGR.

Explaining this in more detail, in FIG. 34, the abscissa shows the engine speed N, while the broken line X shows the boundary between the region where the mean air-fuel ratio A/F is lean and the region where the mean air-fuel ratio A/F is the stoichiometric air-fuel ratio. In the region where the mean air-fuel ratio A/F is lean, that is, in the region with an amount of injection Q less than the boundary X, the target purge gas rate tPGR is made to gradually increase up to c along with an increase in the amount of injection Q, while in the region with an amount of injection Q larger than the boundary X, the target purge gas rate tPGR is made the constant value c. The target purge gas rate shown in FIG. 34 is stored in advance in the ROM 42 in the form of a map as a function of the basic amount of injection Q and the engine speed N.

Figure 35:
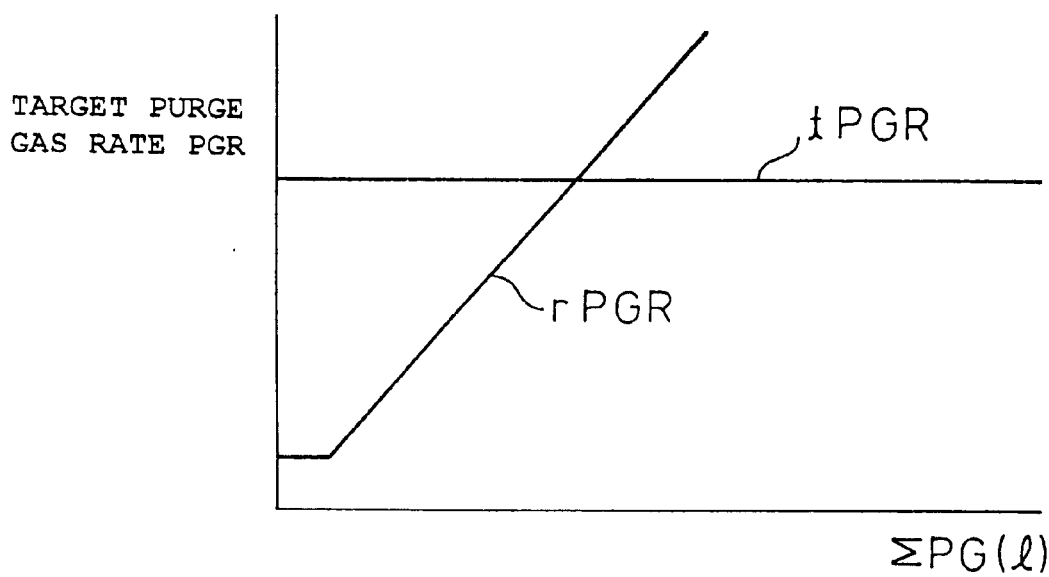
FIG. 35 is a view of target purge gas rates rPGR and tPGR.

Note that the target purge gas rate tPGR shown in FIG. 34 shows the target purge gas rate a little after the purge action is started. The target purge gas rate rPGR immediately after the purge action is started, as shown in FIG. 35, is made to gradually increase. Note that in FIG. 35, the abscissa $\Sigma PG(l)$ shows the cumulative value of the amount of flow of purge gas purged in the surge tank 13 after the purge action is started. In the fifth embodiment as well, the smaller of rPGR and tPGR shown in FIG. 35 is made the target purge gas rate PGR. Therefore, it is understood that when the purge action is started, the target purge gas rate PGR is made to gradually increase along with rPGR until reaching tPGR.

Next, the method of finding the duty ratio DUTY of the purge control valve 28 necessary for making the purge gas rate the target purge gas rate will be explained.

As explained above, when multiplying the opening ratio of the purge control valve 28, that is, the DUTY/100, with the total amount of flow of purge gas per unit time PG100 (l/sec), the result of multiplication PG100·DUTY/100 expresses the amount of flow of purge gas per unit time (l/sec) when the duty ratio of the purge control valve 28 is DUTY as shown in the following formula:

$$PG(l/sec)=PG100(l/sec)\cdot DUTY/100$$

Therefore, the duty ratio DUTY when the amount of flow of purge gas is PG (l/sec) is expressed as follows:

$$DUTY=100\cdot PG/PG100$$

On the other hand, since the basic amount of injection per unit time, where the engine speed is N, is expressed as Q·N/60 (g/sec), the purge gas rate is expressed by the following formula:

$$\text{Purge gas rate}=PG(l/sec)/(Q\cdot N/60(g/sec))$$

Therefore, if expressing the duty ratio DUTY by the purge gas rate, the following is obtained:

$$DUTY=100\cdot\text{purge gas rate}\cdot Q\cdot(N/60)/PG100$$

Therefore, the duty ratio DUTY necessary for making the purge gas rate the target purge gas rate PGR is expressed by the following formula:

$$DUTY=100\cdot PGR\cdot Q\cdot(N/60)/PG100$$

If the duty ratio DUTY of the purge control valve 28 is made the duty ratio DUTY calculated from the above formula, the purge gas rate becomes the target purge gas rate PGR.

On the other hand, if the concentration of fuel vapor in the purge gas is made PV (g/l), the amount of fuel vapor (g/sec) in the purge gas is expressed by the following formula:

$$\text{Amount of fuel vapor (g/sec)}=PG(l/sec)\cdot PV(g/l)$$

Here, if the target purge gas rate PGR is determined, the amount of flow of purge gas PG is determined, so by finding the concentration of purge gas PV (g/l) in the purge gas, the amount of purge gas (g/sec) is found.

In the fifth embodiment, the concentration of fuel vapor PV (g/l) in the purge gas is estimated based on the atmospheric temperature. That is, when the purge action is started, the amount of fuel vapor adsorbed at the activated carbon 21 gradually falls, therefore, as shown in FIG. 23A, the concentration of fuel vapor PV in the purge gas decreases the more the cumulative value $\Sigma PG$ of the amount of flow of purge gas increases. Therefore, in the fifth embodiment as well, the relation shown in FIG. 23A is found in advance by experiments and the concentration of fuel vapor PV is estimated based on the relation shown in FIG. 23A.

Further, when the atmospheric temperature becomes high, the evaporative action of the fuel in the fuel tank 26 becomes more active and as a result the increase $\Delta PV$ (g/l) of the concentration of fuel vapor per unit time becomes larger the higher the atmospheric temperature Ta. Therefore, in the fifth embodiment as well, the relation shown in FIG. 23B is found in advance by experiments, the increase $\Delta PV$ in the concentration of fuel vapor per unit time is estimated based on the relation shown in FIG. 23B, and the concentration of fuel vapor PV is estimated considering this increase $\Delta PV$ as well.

On the other hand, when the amount of fuel vapor (g/sec) is found, the fuel vapor rate EVR showing the ratio of the amount of fuel vapor with respect to the basic amount of injection is found by the following formula:

$$\begin{aligned}EVR &= \text{amount of fuel vapor (g/sec)}/ \\ &\quad \text{amount of injection Q per unit time}\cdot \\ &\quad N/60\text{ (g/sec)} \\ &= PG\cdot PV/(Q\cdot N/60)\end{aligned}$$

As explained above, the amount of fuel tQ to be injected is made the value of the basic amount of injection Q minus the amount of fuel vapor. In this case, the amount of injection to be reduced becomes Q·EVR. Therefore, the amount of fuel to be injected is expressed by the following formula:

$$tQ=Q\cdot(1-EVR)$$

Now, as mentioned above, the target purge gas rate PGR is made the smaller value of rPGR and tPGR shown in FIG. 35. In this case, as the target purge gas rate PGR, it is also possible to use as is the smaller value of rPGR and tPGR shown in FIG. 35. When designed however to form an air-fuel mixture in a limited region in the combustion chamber 5, if the purge gas is purged, the combustion will become unstable and the output torque of the engine will easily fluctuate. Therefore, it can be said to be desirable to determine the target purge gas rate PGR so that the fluctuation of the output torque of the engine does not become large.

Therefore, in the fifth embodiment as well, the target purge gas rate PGR is made to gradually increase toward rPGR or tPGR so long as the fluctuation of the output torque of the engine does not exceed a predetermined amount of fluctuation, then the target purge gas rate PGR is maintained at rPGR or tPGR so long as the fluctuation of the output torque of the engine does not exceed the predetermined amount of fluctuation. In this case, if the fluctuation of the output torque of the engine becomes larger than the predetermined amount of fluctuation, the target purge gas rate PGR is made to decrease.

Next, an explanation will be given of the routine for control of the purge action with reference to FIG. 36 and FIG. 37.

Figure 36:
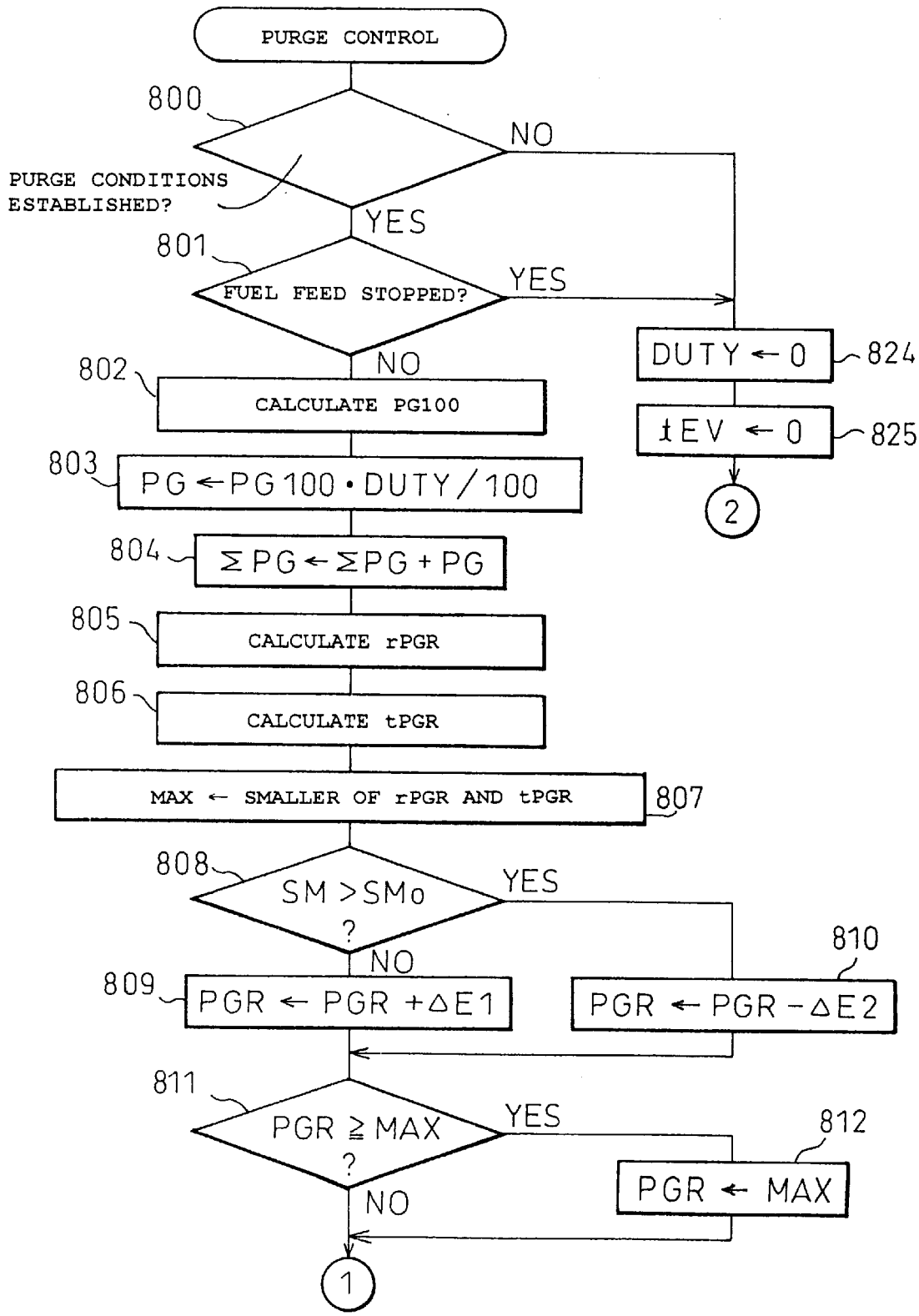
FIG. 36 and FIG. 37 are flow charts for execution of purge control.
Figure 37:
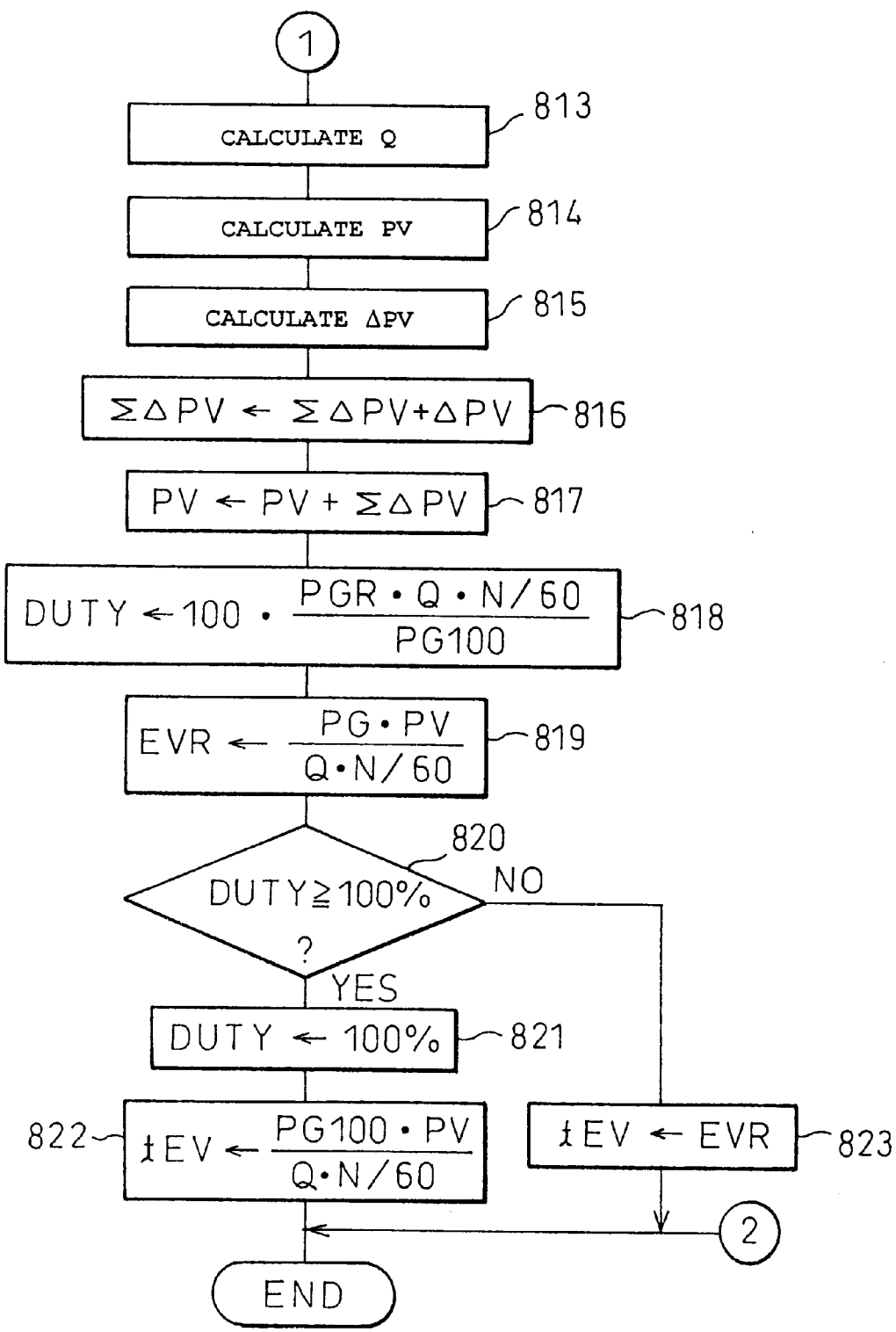
Figure 38:
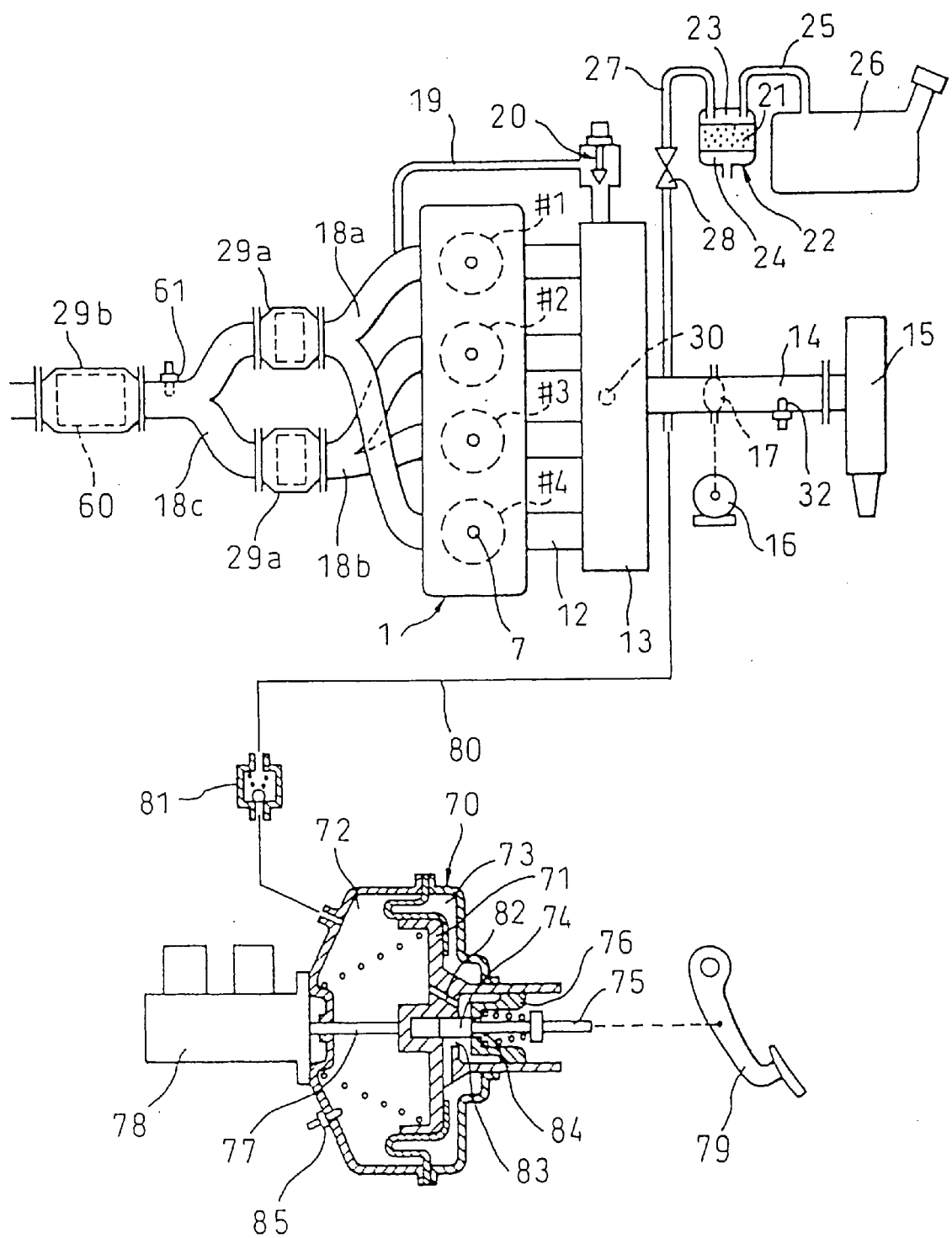
FIG. 38 is an overall view of a modification of an internal combustion engine.

Referring to FIG. 36 and FIG. 37, first, at step 800, it is judged if the purge conditions have been established. For example, when the engine coolant water temperature is at least 80° C. and 30 seconds have elapsed after engine startup, it is judged that the purge conditions have been established. When the purge conditions have been established, the routine proceeds to step 801, where it is judged if the feed of fuel has been stopped. When the feed of fuel has not been stopped, the routine proceeds to step 802.

At step 802, the full open purge gas flow rate PG100 is calculated from the relation shown in FIG. 9 based on the atmospheric pressure PA detected by the atmospheric pressure sensor 33 and the absolute pressure PM detected by the pressure sensor 30. Next, at step 803, the amount of flow of purge gas PG per unit time is calculated from the following formula using the current duty ratio DUTY:

$$PG=PG100 \cdot DUTY/100$$

Next, at step 804, the amount of flow of purge gas PG is added to the cumulative value $\Sigma PG$ of the amount of flow of purge gas. Next, at step 805, the target fuel vapor rate rEVR is calculated from the relation shown in FIG. 35 based on the cumulative value $\Sigma PG$ of the amount of flow of purge gas. Next, at step 806, the target fuel vapor rate tEVR is calculated from the relation shown in FIG. 34. Next, at step 807, the smaller of rPGR and tPGR is made the maximum permissible value MAX of the target purge gas rate.

Next, at step 808, it is judged if the amount of torque fluctuation SM is larger than a predetermined amount of fluctuation $SM_O$. When $SM \leq SM_O$, the routine proceeds to step 809, where a predetermined value $\Delta E1$ is added to the target purge gas rate PGR. As opposed to this, when $SM > SM_O$, the routine proceeds to step 810, where a predetermined value $\Delta E2$ is subtracted from the target purge gas rate PGR. Next, at step 811, it is judged if the target purge gas rate PGR is larger than the maximum permissible value MAX. When $PGR \geq MAX$, the routine proceeds to step 812, where the maximum permissible value MAX is made the target purge gas rate PGR.

That is, when $SM > SM_O$, PGR is made smaller. As opposed to this, when $SM \leq SM_O$, PGR is made to increase. So long as $SM \leq SM_O$, PGR is made MAX.

Next, at step 813, the basic amount of injection Q is calculated from the maps shown in FIGS. 3A and 3B. As explained above, this basic amount of injection Q is equal to Q2 in the region of $L < L_1$ in FIG. 2, is the sum of Q1 and Q2 in the region of $L_1 \leq L < L_2$, and is equal to Q1 in the region of $L \leq L_2$. Next, at step 814, the increase $\Delta PV$ of the concentration of fuel vapor is calculated from the relation shown in FIG. 23B. Next, at step 816, the increase $\Delta PV$ is added to the cumulative value $\Sigma \Delta PV$ of the increase of the concentration of the fuel vapor. Next, at step 817, the cumulative value $\Sigma \Delta PV$ is added to the concentration of fuel vapor PV and the result of the addition is made the final concentration of fuel vapor PV.

Next, at step 818, the duty ratio DUTY necessary for making the purge gas rate the target purge gas rate PGR is calculated based on the following formula:

$$DUTY=100 \cdot (PGR \cdot Q \cdot N/60)/PG100$$

Next, at step 819, the fuel vapor rate EVR is calculated from the following formula using the concentration of fuel vapor PV:

$$EVR=PG \cdot PV/(Q \cdot N/60)$$

Next, at step 820, it is judged if the duty ratio DUTY is more than 100%. When DUTY<100%, the routine proceeds to step 823, where EVR is made the fuel vapor rate tEV. As opposed to this, when DUTY$\geq$100%, the routine proceeds to step 821, where the duty ratio DUTY is made 100%, then the routine proceeds to step 822, where the target fuel vapor rate tEV is calculated based on the following formula:

$$tEV=PG100 \cdot PV/(Q \cdot N)/60)$$

That is, PG100·PV expresses the amount of fuel vapor purged when the DUTY=100%, so the fuel vapor rate tEV is expressed as in the above formula.

On the other hand, when it is judged at step 800 that the purge conditions are not established or when it is judged at step 801 that the feed of fuel has stopped, the routine proceeds to step 824, where the duty ratio DUTY is made zero, then at step 825 the final fuel vapor rate tEV is made zero. At this time, the purge action is stopped.

FIG. 38 to FIG. 42 show a modification of the fifth embodiment while referring to FIG. 38 to FIG. 42. The difference between the internal combustion engine shown in FIG. 38 and the internal combustion engine shown in FIG. 26 is only that in the internal combustion engine shown in FIG. 38 a temperature sensor 32 is arranged in the intake duct 14 and no air-fuel ratio sensor 32 is provided in the conduit 27. The rest of the configuration is the same. Therefore, the explanation relating to the structure of the internal combustion engine shown in FIG. 38 will be omitted.

Next, the routine for control of engine operation will be explained with reference to FIG. 39.

Figure 39:
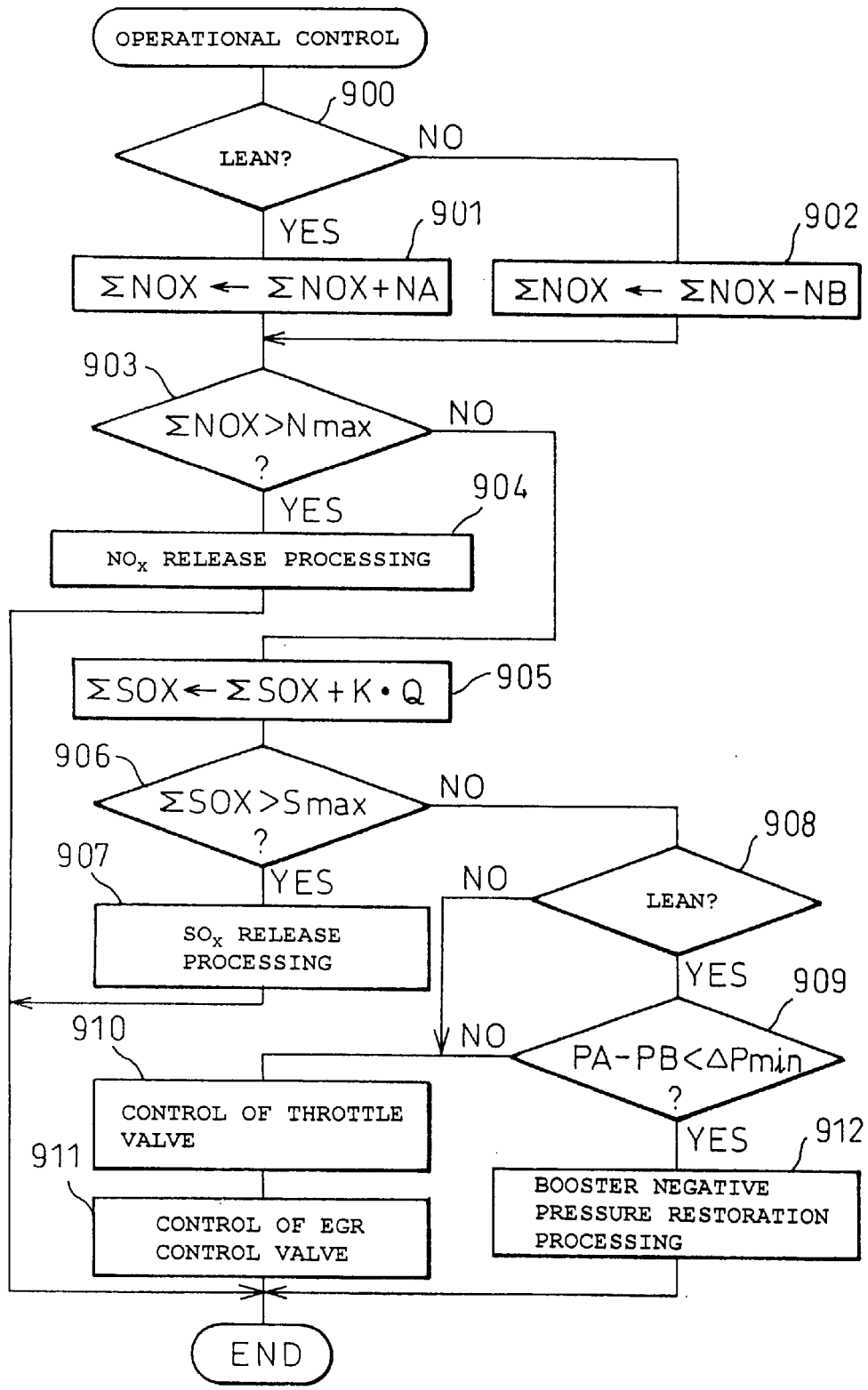
FIG. 39 is a flow chart for control of the operation of an engine.

Referring to FIG. 39, first, at step 900, it is judged if the air-fuel ratio is lean. When the air-fuel ratio is lean, the routine proceeds to step 901, where the amount of NOx absorption NA per unit time calculated from the map shown in FIG. 28A is added to the amount of NOx absorption $\Sigma NOX$, then the routine proceeds to step 903. As opposed to this, when the air-fuel ratio is the stoichiometric air-fuel ratio or rich, the routine proceeds to step 902, the amount of NOx release NB per unit time calculated from the relation shown in FIG. 28B is subtracted from the amount of NOx $\Sigma NOX$, then the routine proceeds to step 903. At step 903, it is judged if the amount of NOx $\Sigma NOX$ has exceeded the maximum permissible value Nmax. When $\Sigma NOX \leq Nmax$, the routine proceeds to step 905.

As explained above, the fuel contains a certain percentage of sulfur. Therefore, the amount of SOx absorbed in the NOx absorbent 60 is proportional to the amount of injection Q. Therefore, at step 905, the product K·Q of the amount of injection Q and a constant K is added to the amount of SOx absorption $\Sigma SOX$. Next, at step 906, it is judged if the amount of SOx absorption $\Sigma SOX$ has exceeded the maximum permissible value Smax. When $\Sigma SOX \leq Smax$, the routine proceeds to step 908.

At step 908, it is judged if the air-fuel ratio is lean. When the air-fuel ratio is lean, the routine proceeds to step 909, where it is judged if the pressure difference (PA−PB) between the atmospheric pressure PA detected by the atmospheric pressure sensor 33 and the absolute pressure PB in the first chamber 72 detected by the pressure sensor 85 is smaller than a certain pressure difference $\Delta Pmin$. When it is judged at step 908 that the air-fuel ratio is not lean or when it is judged at step 909 that PA−PB$\geq \Delta Pmin$, the routine proceeds to step 910, where the opening degree of the throttle valve 17 is made the opening degree in accordance with the operating state of the engine, then at step 911, the opening degree of the EGR control valve 20 is made the opening degree in accordance with the operating state of the engine. At this time, the purge gas rate is made the target purge gas rate tPGR shown in FIG. 34.

Figure 40:
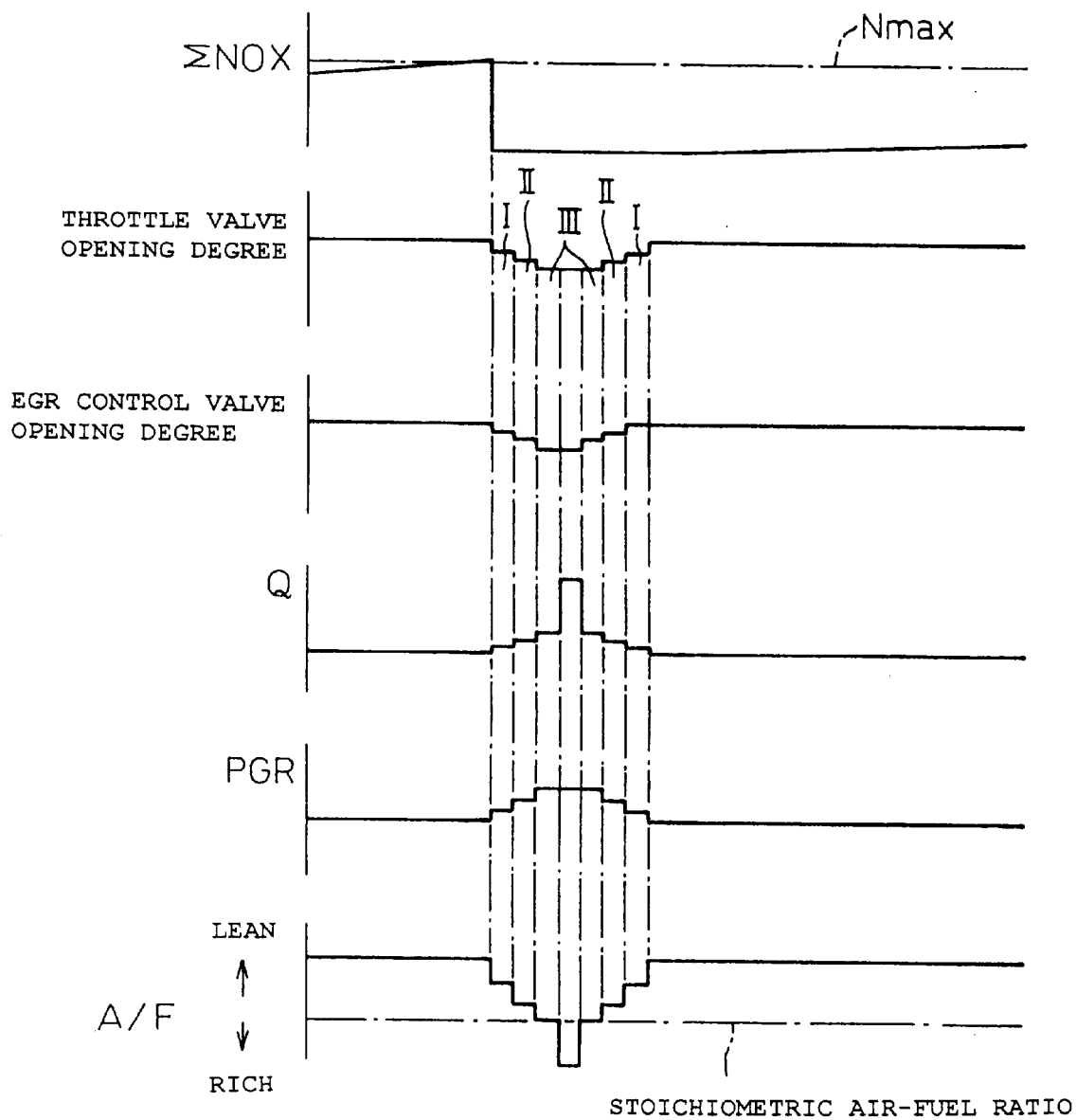
FIG. 40 is a time chart of NOx release control.
Figure 41:
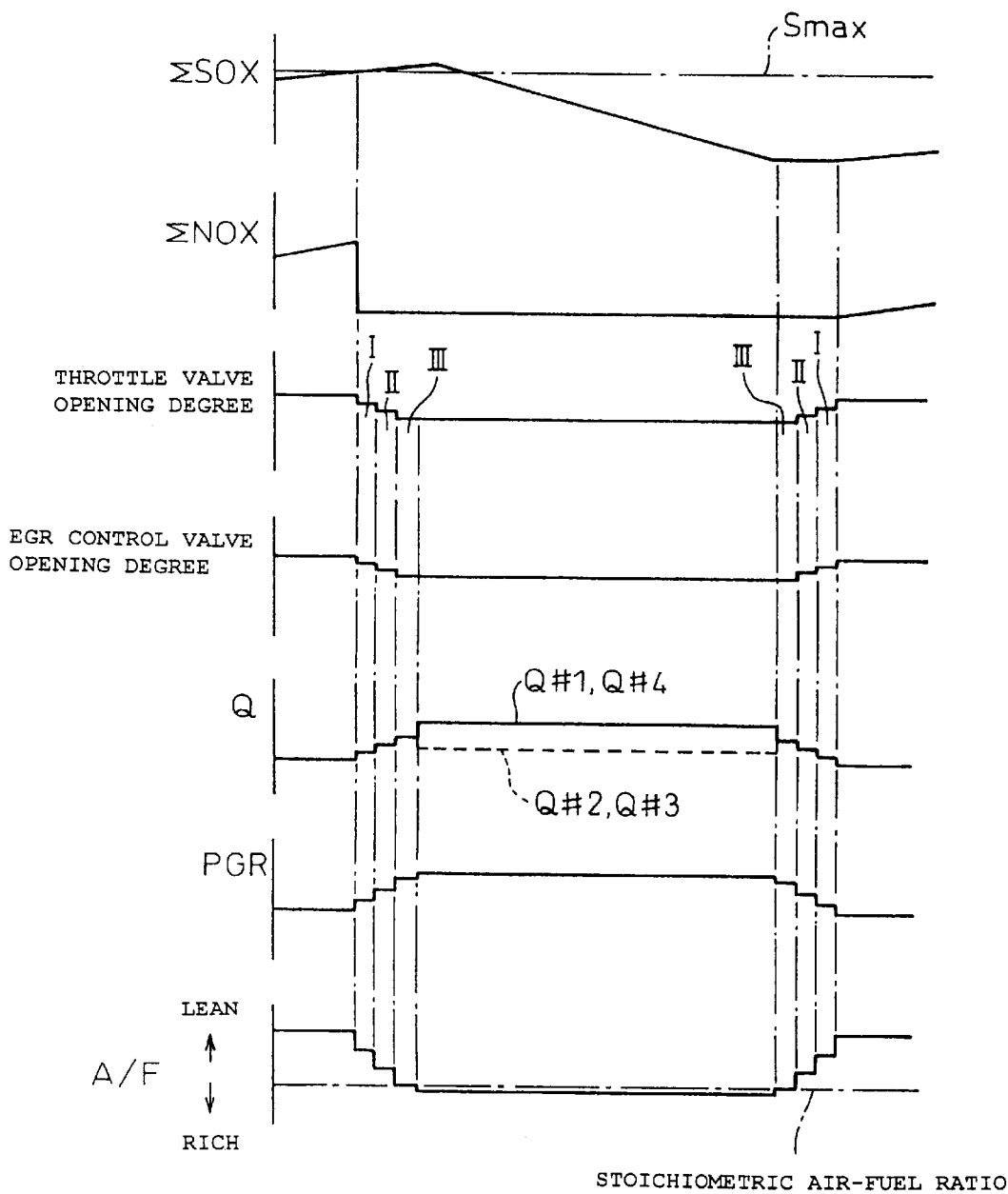
FIG. 41 is a time chart of SOx release control.

On the other hand, when it is judged at step 903 that ΣNOX>Nmax, the routine proceeds to step 904, where processing is performed to release NOx from the NOx absorbent 60. This NOx release processing is shown in FIG. 40. On the other hand, when it is judged at step 906 that ΣSOX>Smax, the routine proceeds to step 907, where processing for release of SOx from the NOx absorbent 60 is performed. This SOx release processing is shown in FIG. 41. On the other hand, when it is judged at step 909 that PA−PB<ΔPmin, the routine proceeds to step 912, where processing is performed to restore the negative pressure of the brake booster 70. This negative pressure restoration processing is shown in FIG. 42.

Figure 42:
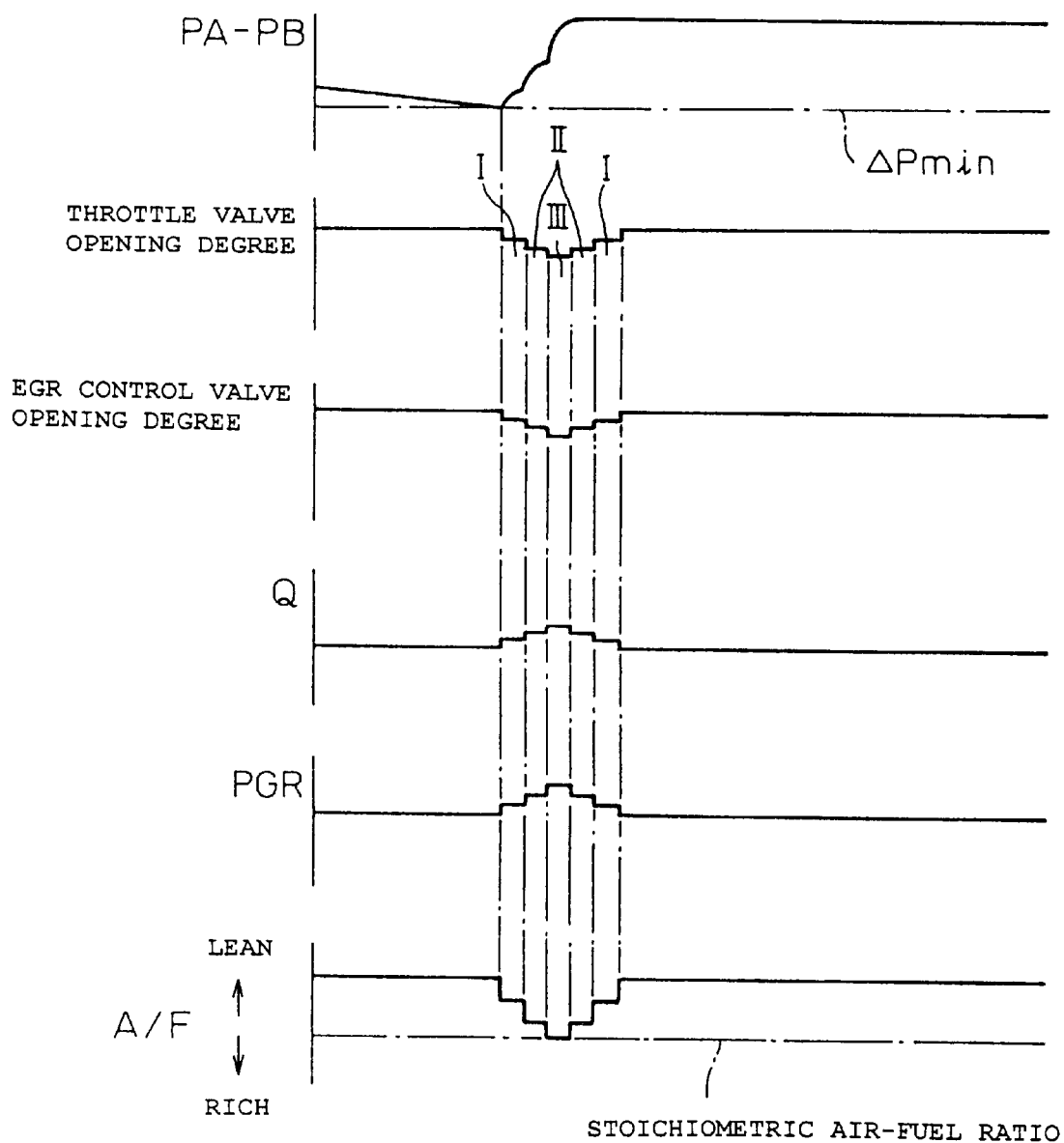
FIG. 42 is a time chart of negative pressure restoration processing of a brake booster.

FIG. 40, FIG. 41, and FIG. 42 respectively show the case of performing NOx release processing, SOx release processing, and negative pressure restoration processing when fuel injection Q2 is performed only at the end of the compression stroke. Note that in FIG. 40, FIG. 41, and FIG. 42, I shows the two-injection operating state where fuel injection Q1 and Q2 are performed divided in two periods of the start of the suction stroke and the end of the compression stroke, II shows a lean air-fuel ratio homogeneous air-fuel mixture operating state where fuel injection Q1 is performed only at the start of the suction stroke and the air-fuel ratio is made lean, and III shows the stoichiometric air-fuel ratio homogeneous air-fuel mixture operating state where fuel injection Q1 is performed only at the start of the suction stroke and the air-fuel ratio is made the stoichiometric air-fuel ratio.

First, an explanation will be given of the control for release of NOx while referring to FIG. 40.

As shown in FIG. 40, when ΣNOX>Nmax, the operating state successively is changed to the two-injection operating state I, the lean air-fuel ratio homogeneous air-fuel mixture operating state II, and the stoichiometric air-fuel ratio homogeneous air-fuel mixture operating state III, then successively changed to the lean air-fuel ratio homogeneous air-fuel mixture operating state II, the two-injection operating state I, and the initial combustion state. To perform combustion by the two fuel injections Q1 and Q2, it is necessary to make the air-fuel ratio smaller compared with when performing combustion by a single fuel injection Q2 at the end of the compression stroke and therefore necessary to reduce the amount of intake air. Therefore, when control is started for release of NOx, the opening degree of the throttle valve 17 is made to be reduced. Further, at this time, the opening degree of the EGR control valve 20 is made to be reduced so that the EGR rate becomes the target EGR rate.

Similarly, to perform combustion by a homogeneous air-fuel mixture of a lean air-fuel ratio, it is necessary to make the air-fuel ratio smaller than when performing combustion by two fuel injections Q1 and Q2. Therefore, when switching from the two-injection operating state I to the lean air-fuel ratio homogeneous air-fuel mixture operating state II, the opening degree of the throttle valve 17 is made to be further reduced. Further, to perform combustion by a homogeneous air-fuel mixture of the stoichiometric air-fuel ratio, it is necessary to reduce the air-fuel ratio compared with when performing combustion by a homogeneous air-fuel mixture of a lean air-fuel ratio. Therefore, when switching from the lean air-fuel ratio homogeneous air-fuel mixture operating state II to the stoichiometric air-fuel ratio homogeneous air-fuel mixture operating state III, the opening degree of the throttle valve 17 is made to be further reduced.

On the other hand, when the opening degree of the throttle valve 17 is made to be reduced in this way, the pumping loss increases, so the engine output falls. Therefore, to prevent the engine output from falling in this way, the total amount of injection Q is made to gradually increase along with the reduction of the opening degree of the throttle valve 17.

On the other hand, when the total amount of injection Q is made to increase, the final target purge gas rate PGR is also made to gradually increase to secure a good ignition by the spark plug 7. That is, when performing processing for release of NOx as shown in FIG. 40, the final target purge gas rate PGR is first made to gradually rise, then is made to gradually fall.

When the processing for release of NOx is started and the operating state becomes the stoichiometric air-fuel ratio homogeneous air-fuel mixture operating state III, the amount of injection Q is made to temporarily increase, whereby the air-fuel ratio A/F is temporarily made rich. At this time, NOx is released from the NOx absorbent 60. Note that it is also possible to make the target purge gas rate PGR temporarily increase when the amount of injection Q is made to temporarily increase. As shown in FIG. 40, when the processing for release of NOx is started, the amount of NOx absorption ΣNOx is made zero.

Note that when performing two injections Q1 and Q2 and ΣNOX>Nmax, the operating state is switched to the lean air-fuel ratio homogeneous air-fuel mixture operating state II, while when a homogeneous air-fuel mixture of a lean air-fuel ratio is made to burn and ΣNOx>Nmax, the operating state is switched to the stoichiometric air-fuel ratio homogeneous air-fuel mixture operating state III.

Next, an explanation will be given of the control for release of SOx while referring to FIG. 41.

As shown in FIG. 41, when ΣSOX>Smax, in this case as well, the operating state is successively switched to the two-injection operating state I, the lean air-fuel ratio homogeneous air-fuel mixture operating state II, and the stoichiometric air-fuel ratio homogeneous air-fuel mixture operating state III. At this time, in the same way as in the case of processing for release of NOx, the opening degree of the throttle valve 17 is made to gradually reduced, the opening degree of the EGR control valve 20 is made to gradually reduced, the total amount of injection Q is made to gradually increase, and the target purge gas rate PGR is made to gradually increase.

Next, the amounts of injection Q#1 and Q#4 to the no. 1 cylinder #2 and the no. 4 cylinder #4 (shown by the solid lines in FIG. 41) are made to increase and the amounts of injection Q#2 and Q#3 to the no. 2 cylinder #2 and no. 3 cylinder #3 (shown by the broken lines in FIG. 41) are made to decrease so that the air-fuel ratios of two cylinders of every other position in the firing order, for example, the no. 1 cylinder #1 and the no. 4 cylinder #4, become rich, the air-fuel ratios of the remaining no. 2 cylinder #2 and no. 3 cylinder #3 of every other position in the firing order become lean, and the mean air-fuel ratio of the exhaust gas flowing into the NOx absorbent 60 becomes rich.

That is, specifically speaking, first, the total amount of injection Q for making the air-fuel ratio of the exhaust gas flowing into the NOx absorbent 60 the target rich air-fuel ratio is calculated. Next, the fuel vapor rate tEV is calculated based on the concentration of fuel vapor PV. The mean value Qm of the total amount of injection is calculated based on this target fuel vapor rate tEV:

$$Qm = Q \cdot (1 - tEV)$$

Next, the amounts of injection Q#1 and Q#4 of the no. 1 cylinder #1 and the no. 4 cylinder #4 and the amounts of injection Q#2 and Q#3 of the no. 2 cylinder #2 and the no.

3 cylinder #3 are calculated based on the following formulas:

$$Q\#1=Q\#4=FAF\cdot(Qm+\alpha)$$

$$Q\#2=Q\#3=FAF\cdot(Qm+\alpha)$$

Here, FAF shows a feedback correction coefficient controlled by an output signal of the air-fuel sensor 61, while a shows a predetermined setting.

That is, when it is judged based on the output signal of the air-fuel ratio sensor 61 that the air-fuel ratio of the exhaust gas flowing into the NOx absorbent 60 is larger than the target rich air-fuel ratio, the feedback correction coefficient FAF is made to increase, while when it is judged that the air-fuel ratio of the exhaust gas flowing into the NOx absorbent 60 is smaller than the target rich air-fuel ratio, the feedback correction coefficient FAF is made to decrease, whereby the air-fuel ratio of the exhaust gas flowing into the NOx absorbent 60 is controlled to the target air-fuel ratio. At this time, the air-fuel ratios in the no. 1 cylinder #1 and the no. 4 cylinder #4 become rich and the air-fuel ratios in the no. 2 cylinder #2 and the no. 3 cylinder #3 become lean.

When the air-fuel ratios in the no. 1 cylinder #1 and the no. 4 cylinder #4 are made rich and the air-fuel ratios in the no. 2 cylinder #2 and the no. 3 cylinder #3 are made lean in this way, exhaust gas containing a large amount of unburned hydrocarbons and CO is discharged in the first exhaust manifold 18b and exhaust gas containing a large amount of oxygen is discharged into the second exhaust manifold 18b. Next, the exhaust gas containing a large amount of unburned hydrocarbons and CO and the exhaust gas containing a large amount of oxygen flow into the NOx absorbent 60. In the NOx absorbent 60, the large amounts of unburned hydrocarbons and CO are made to oxidize by the large amount of oxygen. As a result, the temperature of the NOx absorbent 60 is made to rapidly rise by the heat of the oxidation reaction.

On the other hand, the air-fuel ratio of the exhaust gas flowing into the NOx absorbent 60 is maintained at the target rich air-fuel ratio. Therefore, when the temperature of the NOx absorbent 60 exceeds for example 600° C., the action for release of SOx from the NOx absorbent 60 is started. When the action for release of SOx is started, the amount of release SB of SOx per unit time shown in FIG. 29A is successively subtracted from the amount of SOx absorption $\Sigma SOX$, therefore the amount of SOx absorption $\Sigma SOx$ gradually declines. Note that as shown in FIG. 29A, the amount of SOx release SB per unit time is a function of the temperature TC of the NOx absorbent 60. This temperature TC is stored in advance in the ROM 42 in the form of a map as a function of the amount of depression L of the accelerator pedal 34 and the engine speed N as shown in FIG. 29B. On the other hand, as shown in FIG. 41, the amount of NOx absorption $\Sigma NOX$ is made zero when the processing for release of SOx is started.

As shown in FIG. 41, when the amount of SOx absorption $\Sigma SOX$ becomes zero, the state is switched to the stoichiometric air-fuel ratio homogeneous air-fuel mixture operating state III, then successively switched to the lean air-fuel ratio homogeneous air-fuel mixture operating state II, the two-injection operating state I, and the initial combustion state. At this time, in the same way as the case of processing for release of NOx, the opening degree of the throttle valve 17 is made to gradually increase, the opening degree of the EGR control valve 20 is also made to gradually increase, the total amount of injection Q is made to gradually decrease, and the target purge gas rate PGR is made to gradually decrease.

Note that when performing two injections Q1 and Q2 and $\Sigma SOX>Smax$, the operating state is switched to the lean air-fuel ratio homogeneous air-fuel mixture operating state II, when a homogeneous air-fuel mixture of a lean air-fuel ratio is being burned and $\Sigma SOX>Smax$, the operating state is switched to the stoichiometric air-fuel ratio homogeneous air-fuel mixture operating state III, and when a homogeneous air-fuel mixture of the stoichiometric air-fuel ratio or a rich air-fuel ratio is being burned and $\Sigma SOX>Smax$, as shown in FIG. 41, the amounts of injection Q#1 and Q#4 of the no. 1 cylinder #1 and the no. 4 cylinder #4 are made to increase and the amounts of injection Q#2 and Q#3 of the no. 2 cylinder #2 and no. 3 cylinder #3 are made to decrease.

Next, an explanation will be given of the processing for restoration of negative pressure of the brake booster 70 while referring to FIG. 42.

As shown in FIG. 42, when PA−PB<ΔPmin, the operating state is successively switched to the two-injection operating state I, the lean air-fuel ratio homogeneous air-fuel mixture operating state II, and the stoichiometric air-fuel ratio homogeneous air-fuel mixture operating state III. At this time, in the same way as the case of processing for release of NOx, the opening degree of the throttle valve 17 is made to gradually decrease, the opening degree of the EGR control valve 20 is also made to gradually decrease, the total amount of injection Q is made to gradually increase, and the target purge gas rate PGR is made to gradually increase.

When the opening degree of the throttle valve 17 and the opening degree of the EGR control valve 20 are made to decrease in this way, the absolute pressure in the intake duct 14 downstream of the throttle valve 17 becomes smaller and therefore the pressure difference PA−PB rapidly increases as shown in FIG. 42. That is, the absolute pressure in the brake booster 70 is made to rapidly fall.

As shown in FIG. 42, immediately after the operating state becomes the stoichiometric air-fuel ratio homogeneous air-fuel mixture operating state III, the operating state is switched to the lean air-fuel ratio homogeneous air-fuel mixture operating state II, then is successively switched to the two-injection operating state I and the initial combustion state. At this time as well, in the same way as the case of the processing for release of NOx, the opening degree of the throttle valve 17 is made to gradually increase, the opening degree of the EGR control valve 20 is also made to gradually increase, the total amount of injection Q is made to gradually decrease, and the target purge gas rate PGR is made to gradually decrease.

Note that while the explanation was given with reference to the case of application of the present invention to a stratified combustion type internal combustion engine, the present invention may of course also be applied to an internal combustion engine designed for combustion of a homogeneous air-fuel mixture of a lean air-fuel ratio or combustion of a homogeneous air-fuel mixture of a stoichiometric air-fuel ratio rather than stratified combustion.

As explained above, according to the present invention, it is possible to secure excellent engine operation even if feeding purge gas.

What is claimed is:

1. An evaporated fuel treatment device of an internal combustion engine provided with a purge passage for purging fuel vapor generated in a fuel tank into an intake passage; a purge control valve for controlling the amount of purge gas to be purged from the purge passage to the inside of the intake passage; an injection calculating means for calculating an amount of fuel injection; a setting means for setting a target value of a fuel vapor rate showing a ratio of the amount of fuel vapor in the purge gas to the amount of fuel injection; and a control means for controlling at least one of the amount of purge gas and the amount of fuel injection so that the fuel vapor rate become the target value.

2. An evaporated fuel treatment device of an internal combustion engine as set forth in claim 1, wherein an air-fuel mixture is formed in a limited region in a combustion chamber and that air-fuel mixture is made to ignite by a spark plug.

3. An evaporated fuel treatment device of an internal combustion engine as set forth in claim 1, wherein the target value of the fuel vapor rate is made to change in accordance with an operating state of the engine.

4. An evaporated fuel treatment device of an internal combustion engine as set forth in claim 3, wherein the target value of the fuel vapor rate is made higher the greater the amount of fuel injection.

5. An evaporated fuel treatment device of an internal combustion engine as set forth in claim 3, wherein the operating state of the engine comprises a first operating state where an air-fuel mixture is formed in a limited region in a combustion chamber and a second operating state where the air-fuel mixture is formed in the combustion chamber as a whole and wherein the target value of the fuel vapor rate is made higher in the second operating state than in the first operating state.

6. An evaporated fuel treatment device of an internal combustion engine as set forth in claim 1, wherein the target value of the fuel vapor rate is made a fixed value.

7. An evaporated fuel treatment device of an internal combustion engine as set forth in claim 1, wherein the device is further provided with an output fluctuation detecting means for detecting an output fluctuation of the engine and wherein said control means makes the fuel vapor rate gradually increase toward the target value when the output fluctuation of the engine is smaller than a predetermined amount of fluctuation and makes the fuel vapor rate gradually decrease when the output fluctuation of the engine is larger than the predetermined amount of fluctuation.

8. An evaporated fuel treatment device of an internal combustion engine as set forth in claim 1, further provided with a fuel vapor calculating means for calculating an amount of fuel vapor in the purge gas.

9. An evaporated fuel treatment device of an internal combustion engine as set forth in claim 8, wherein a target opening degree of the purge control valve necessary for making the fuel vapor rate the target value is calculated from the amount of fuel vapor in the purge gas calculated by the fuel vapor calculating means and wherein the control means controls the opening degree of the purge control valve to that target opening degree.

10. An evaporated fuel treatment device of an internal combustion engine as set forth in claim 9, wherein a fuel vapor concentration sensor is arranged in the purge passage and the amount of fuel vapor in the purge gas is calculated based on an output signal of the fuel vapor concentration sensor.

11. An evaporated fuel treatment device of an internal combustion engine as set forth in claim 9, wherein a fuel vapor concentration sensor is arranged in the engine intake passage and the amount of fuel vapor in the purge gas is calculated based on an output signal of the fuel vapor concentration sensor.

12. An evaporated fuel treatment device of an internal combustion engine as set forth in claim 9, wherein a fuel vapor concentration sensor is arranged in the engine exhaust passage and the amount of fuel vapor in the purge gas is calculated based on an output signal of the fuel vapor concentration sensor.

13. An evaporated fuel treatment device of an internal combustion engine as set forth in claim 1, further provided with a fuel vapor estimating means for estimating an amount of fuel vapor in the purge gas.

14. An evaporated fuel treatment device of an internal combustion engine as set forth in claim 13, wherein a target opening degree of the purge control valve necessary for making the fuel vapor rate the target value is calculated from the amount of fuel vapor in the purge gas estimated by the fuel vapor estimating means and the control means controls the opening degree of the purge control valve to the target opening degree.

15. An evaporated fuel treatment device of an internal combustion engine as set forth in claim 1, wherein the device is further provided with a storage means for storing a basic fuel amount of injection in accordance with a requested load and the amount of fuel to be injected is calculated by subtracting the amount of fuel vapor in the purge gas from the basic fuel amount of injection.

16. An evaporated fuel treatment device of an internal combustion engine as set forth in claim 1, wherein an NOx absorbent for absorbing NOx when the air-fuel ratio of the inflowing exhaust gas is lean and releasing the absorbed NOx when the air-fuel ratio of the inflowing exhaust gas becomes the stoichiometric air-fuel ratio or rich is arranged in an engine exhaust passage and the air-fuel ratio of the exhaust gas flowing into the NOx absorbent is made the stoichiometric air-fuel ratio or rich when NOx is to be released from the NOx absorbent.

17. An evaporated fuel treatment device of an internal combustion engine as set forth in claim 16, wherein the target value of the fuel vapor rate is made to rise at the time of processing for release of NOx from the NOx absorbent.

18. An evaporated fuel treatment device of an internal combustion engine as set forth in claim 16, wherein the air-fuel ratio of the exhaust gas flowing into the NOx absorbent is made rich when SOx is to be released from the NOx absorbent.

19. An evaporated fuel treatment device of an internal combustion engine as set forth in claim 18, wherein the target value of the fuel vapor rate is made to rise at the time of processing for release of SOx from the NOx absorbent.

20. An evaporated fuel treatment device of an internal combustion engine as set forth in claim 1, wherein a throttle valve is arranged in engine intake passage, a brake booster into which negative pressure generated in the intake passage downstream of the throttle valve is led and by which the braking force is increased by the negative pressure is provided, and the opening degree of the throttle valve is made smaller when the negative pressure led into the brake booster becomes smaller.

21. An evaporated fuel treatment device of an internal combustion engine as set forth in claim 20, wherein the target value of the fuel vapor rate is made to rise when the opening degree of the throttle valve is made smaller when the negative pressure led into the brake booster becomes smaller.

22. An evaporated fuel treatment device of an internal combustion engine provided with a purge passage for purging fuel vapor generated in a fuel tank into an intake passage; a purge control valve for controlling the amount of purge gas to be purged from the purge passage to the inside of the intake passage; an injection calculating means for calculating an amount of fuel injection; a setting means for setting a target value of a purge gas rate showing a ratio of the amount of purge gas to the amount of fuel injection; and a control means for controlling at least one of the amount of purge gas and the amount of fuel injection so that the purge gas rate become the target value.

23. An evaporated fuel treatment device of an internal combustion engine as set forth in claim 22, wherein an air-fuel mixture is formed in a limited region in a combustion chamber and that air-fuel mixture is made to ignite by a spark plug.

24. An evaporated fuel treatment device of an internal combustion engine as set forth in claim 22, wherein the target value of the fuel vapor rate is made to change in accordance with an operating state of the engine.

25. An evaporated fuel treatment device of an internal combustion engine as set forth in claim 24, wherein the target value of the fuel vapor rate is made higher the greater the amount of fuel injection.

26. An evaporated fuel treatment device of an internal combustion engine as set forth in claim 24, wherein the operating state of the engine comprises a first operating state where an air-fuel mixture is formed in a limited region in a combustion chamber and a second operating state where the air-fuel mixture is formed in the combustion chamber as a whole and wherein the target value of the fuel vapor rate is made higher in the second operating state than in the first operating state.

27. An evaporated fuel treatment device of an internal combustion engine as set forth in claim 22, wherein the target value of the fuel vapor rate is made a fixed value.

28. An evaporated fuel treatment device of an internal combustion engine as set forth in claim 22, wherein the device is further provided with an output fluctuation detecting means for detecting an output fluctuation of the engine and wherein said control means makes the fuel vapor rate gradually increase toward the target value when the output fluctuation of the engine is smaller than a predetermined amount of fluctuation and makes the fuel vapor rate gradually decrease when the output fluctuation of the engine is larger than the predetermined amount of fluctuation.

29. An evaporated fuel treatment device of an internal combustion engine as set forth in claim 22, further provided with a fuel vapor estimating means for estimating an amount of fuel vapor in the purge gas and a storage means for storing a basic fuel amount of injection in accordance with a requested load and the amount of fuel to be injected is calculated by subtracting the amount of fuel vapor in the purge gas from the basic fuel amount of injection.

30. An evaporated fuel treatment device of an internal combustion engine as set forth in claim 22, wherein an NOx absorbent for absorbing NOx when the air-fuel ratio of the inflowing exhaust gas is lean and releasing the absorbed NOx when the air-fuel ratio of the inflowing exhaust gas becomes the stoichiometric air-fuel ratio or rich is arranged in an engine exhaust passage and the air-fuel ratio of the exhaust gas flowing into the NOx absorbent is made the stoichiometric air-fuel ratio or rich when NOx is to be released from the NOx absorbent.

31. An evaporated fuel treatment device of an internal combustion engine as set forth in claim 30, wherein the target value of the fuel vapor rate is made to rise at the time of processing for release of NOx from the NOx absorbent.

32. An evaporated fuel treatment device of an internal combustion engine as set forth in claim 30, wherein the air-fuel ratio of the exhaust gas flowing into the NOx absorbent is made rich when SOx is to be released from the NOx absorbent.

33. An evaporated fuel treatment device of an internal combustion engine as set forth in claim 32, wherein the target value of the purge gas rate is made to rise at the time of processing for release of SOx from the NOx absorbent.

34. An evaporated fuel treatment device of an internal combustion engine as set forth in claim 22, wherein a throttle valve is arranged in engine intake passage, a brake booster into which negative pressure generated in the intake passage downstream of the throttle valve is led and by which the braking force is increased by the negative pressure is provided, and the opening degree of the throttle valve is made smaller when the negative pressure led into the brake booster becomes smaller.

35. An evaporated fuel treatment device of an internal combustion engine as set forth in claim 34, wherein the target value of the purge gas rate is made to rise when the opening degree of the throttle valve is made smaller when the negative pressure led into the brake booster becomes smaller.

* * * * *